US011455050B2

(12) United States Patent
Mori et al.

(10) Patent No.: US 11,455,050 B2
(45) Date of Patent: *Sep. 27, 2022

(54) DISPLAY DEVICE, DISPLAY MODULE, AND ELECTRONIC DEVICE

(71) Applicant: Semiconductor Energy Laboratory Co., Ltd., Kanagawa-ken (JP)

(72) Inventors: Hidenori Mori, Tochigi (JP); Takahiro Fukutome, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/733,538

(22) Filed: Jan. 3, 2020

(65) Prior Publication Data

US 2020/0150808 A1 May 14, 2020

Related U.S. Application Data

(63) Continuation of application No. 15/472,490, filed on Mar. 29, 2017, now Pat. No. 10,528,165.

(30) Foreign Application Priority Data

Apr. 4, 2016 (JP) ................................ 2016-074956
Apr. 25, 2016 (JP) ................................ 2016-087359

(51) Int. Cl.
*G06F 3/041* (2006.01)
*G06F 3/044* (2006.01)
*G02F 1/1335* (2006.01)

(52) U.S. Cl.
CPC .......... *G06F 3/0412* (2013.01); *G06F 3/0446* (2019.05); *G02F 1/133553* (2013.01); *G06F 3/04166* (2019.05); *G09G 2300/0456* (2013.01)

(58) Field of Classification Search
CPC .. G09G 2300/0456–046; G06F 3/0412; G06F 3/0416; G06F 3/044; G02F 1/133553
See application file for complete search history.

(56) References Cited

U.S. PATENT DOCUMENTS 6,801,266 B1 10/2004 Tsujimura et al.
6,816,209 B2 11/2004 Tsujimura et al.
(Continued)

FOREIGN PATENT DOCUMENTS

CN          001577451 A    2/2005
CN          101025890 A    8/2007
(Continued)

OTHER PUBLICATIONS

Chinese Office Action (Application No. 201710195990.2) dated Aug. 25, 2020.
(Continued)

*Primary Examiner* — Hang Lin
(74) *Attorney, Agent, or Firm* — Husch Blackwell LLP

(57) ABSTRACT

A display device with improved display quality and reduced power consumption is provided. The display device includes a gate driver, a display portion, and a selection signal output circuit. The display portion includes pixel circuits and scan lines. Each of the pixel circuits includes a display element. The gate driver is electrically connected to the scan lines. The first scan lines are electrically connected to the pixel circuits. The scan lines are each configured to receive a first scan signal. The selection signal output circuit is configured to output a first selection signal. The first selection signal is configured to supply the first scan signal to a selected scan line. The display element is configured to update display by the first scan signal. In the pixel circuits, one display element displays an image updated with a different update frequency from another display element.

20 Claims, 40 Drawing Sheets

(56) References Cited

U.S. PATENT DOCUMENTS

| | | |
|---|---|---|
| 7,248,235 B2 | 7/2007 | Fujii et al. |
| 7,471,267 B2 | 12/2008 | Shin et al. |
| 7,760,166 B2 | 7/2010 | Uchino et al. |
| 8,094,107 B2 | 1/2012 | Nishimura et al. |
| 8,149,190 B2 | 4/2012 | Mizukoshi et al. |
| 8,670,004 B2 | 3/2014 | Vieri et al. |
| 8,760,377 B2 | 6/2014 | Mori et al. |
| 9,070,339 B2 | 6/2015 | Mori et al. |
| 9,165,505 B2 | 10/2015 | Miyazaki |
| 9,818,345 B2 | 11/2017 | Shim et al. |
| 9,934,755 B2 | 4/2018 | Roh et al. |
| 2002/0011978 A1 | 1/2002 | Yamazaki et al. |
| 2003/0107688 A1 | 6/2003 | Yamagishi |
| 2003/0160748 A1 | 8/2003 | Kimura |
| 2003/0193457 A1 | 10/2003 | Wang et al. |
| 2004/0105041 A1 | 6/2004 | Tsujimura et al. |
| 2005/0264228 A1* | 12/2005 | Kim .................. G09G 3/325 315/169.3 |
| 2006/0072047 A1 | 4/2006 | Sekiguchi |
| 2007/0069214 A1 | 3/2007 | Lee |
| 2007/0075935 A1 | 4/2007 | Mesmer et al. |
| 2008/0123000 A1 | 5/2008 | Lin et al. |
| 2009/0040161 A1 | 2/2009 | Baek et al. |
| 2009/0146913 A1 | 6/2009 | Tanabe |
| 2009/0231241 A1 | 9/2009 | Abe |
| 2010/0118220 A1 | 5/2010 | Jang et al. |
| 2010/0207967 A1 | 8/2010 | Baek et al. |
| 2010/0231614 A1* | 9/2010 | Vieri .................. G09G 3/3677 345/690 |
| 2011/0090207 A1 | 4/2011 | Yamazaki et al. |
| 2011/0157254 A1* | 6/2011 | Yamazaki ............ G09G 3/3659 349/113 |
| 2011/0199404 A1 | 8/2011 | Umezaki et al. |
| 2012/0033151 A1 | 2/2012 | Toyotaka et al. |
| 2014/0118378 A1 | 5/2014 | Koyama et al. |
| 2015/0138214 A1* | 5/2015 | Roh .................. G06F 1/1647 345/520 |
| 2015/0228217 A1* | 8/2015 | Perdices-Gonzalez .................. G09G 3/348 345/5 |
| 2016/0042708 A1 | 2/2016 | Wang et al. |
| 2017/0092177 A1 | 3/2017 | Kobayashi et al. |

FOREIGN PATENT DOCUMENTS

| | | |
|---|---|---|
| CN | 101140730 A | 3/2008 |
| CN | 101944340 A | 1/2011 |
| CN | 102356422 A | 2/2012 |
| JP | 2003-157026 A | 5/2003 |
| JP | 2003-241733 A | 8/2003 |
| JP | 2007-129504 A | 5/2007 |
| JP | 2008-225381 A | 9/2008 |
| JP | 2009-510527 | 3/2009 |
| JP | 2010-181452 A | 8/2010 |
| JP | 2012-521017 | 9/2012 |
| KR | 2001-0015091 A | 2/2001 |
| KR | 2004-0074658 A | 8/2004 |
| KR | 2011-0125273 A | 11/2011 |
| KR | 2015-0057954 A | 5/2015 |
| WO | WO-2007/041150 A1 | 4/2007 |
| WO | WO 2010/107458 A1 | 9/2010 |
| WO | WO 2015/072809 A2 | 5/2015 |

OTHER PUBLICATIONS

Chinese Office Action (Application No. 202110769027.7) dated May 18, 2022.

* cited by examiner

720C

702

FIG. 27A
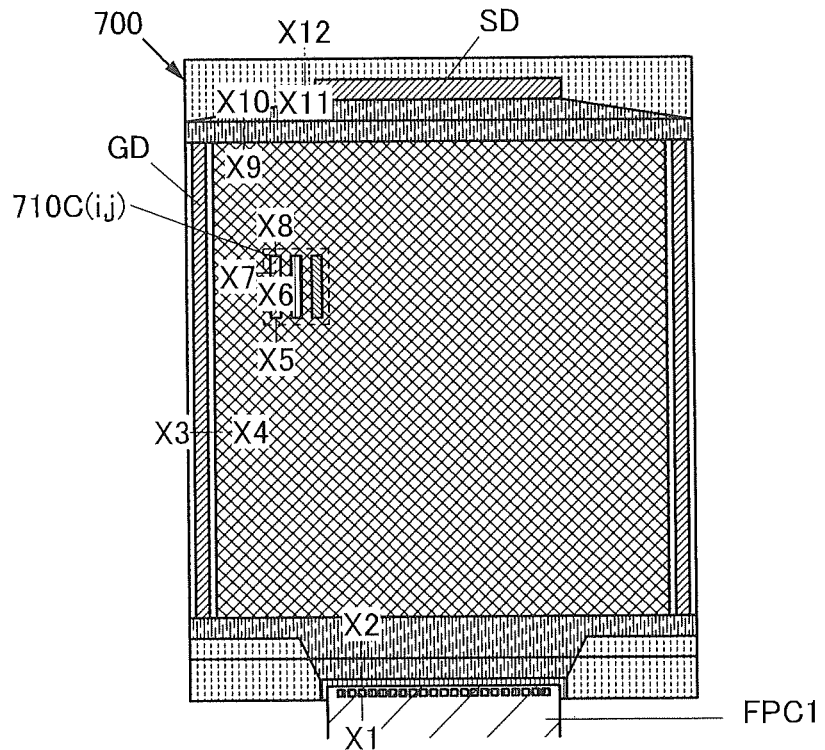
FIG. 27B1
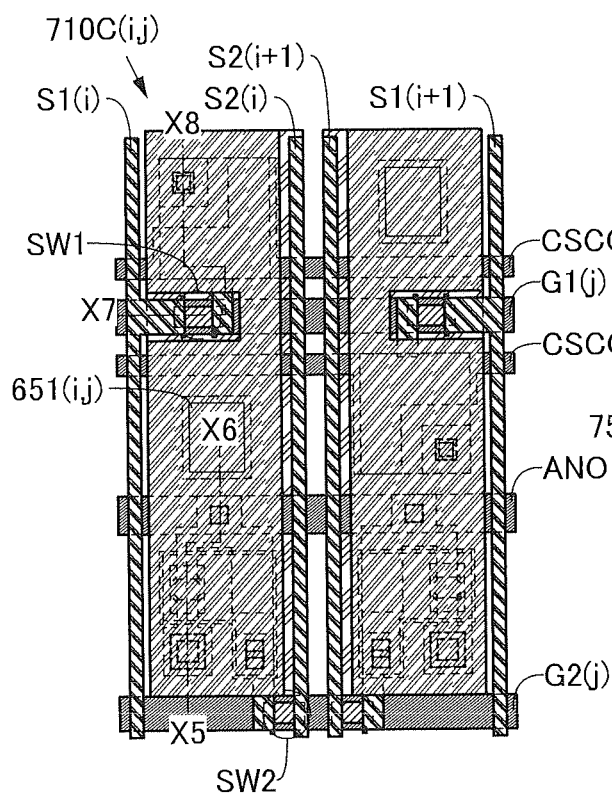
FIG. 27B2
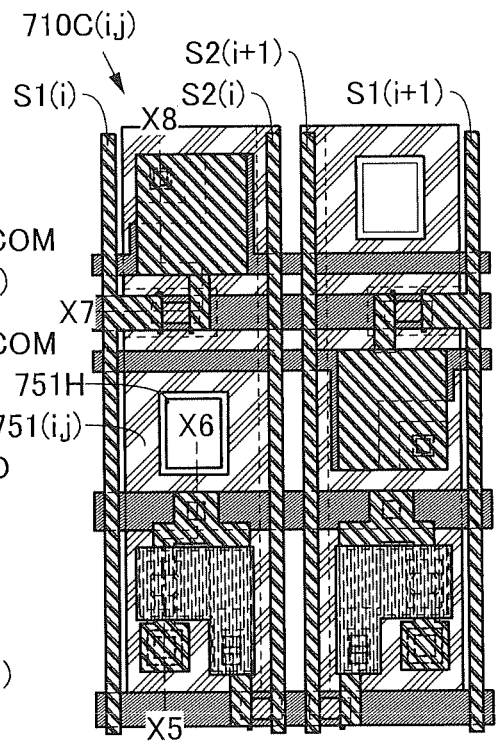

FIG. 28A1
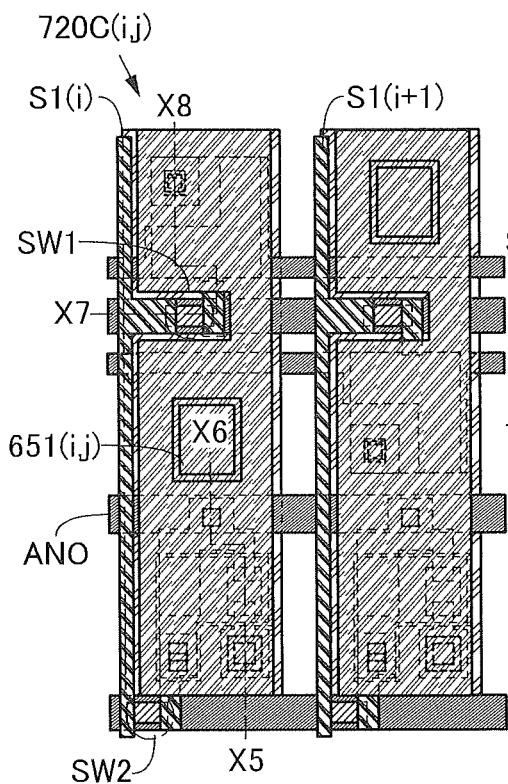
FIG. 28A2
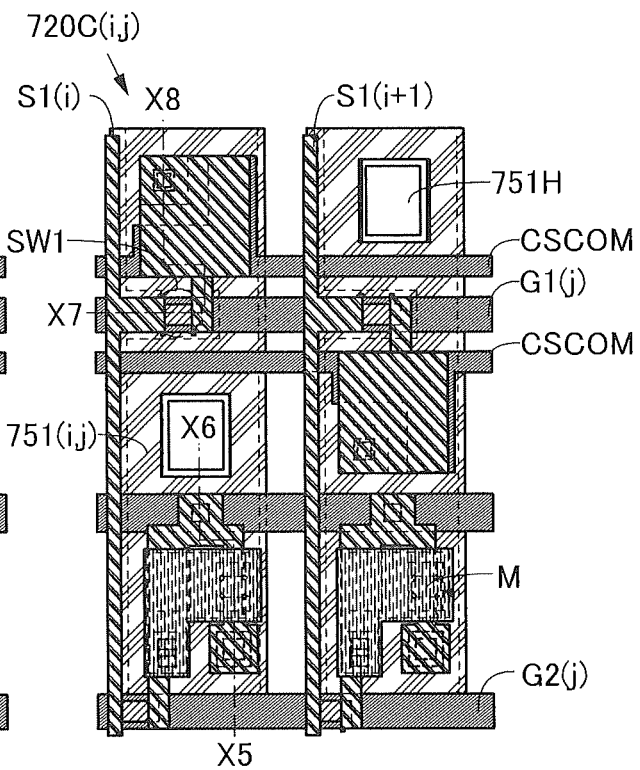
FIG. 28B1
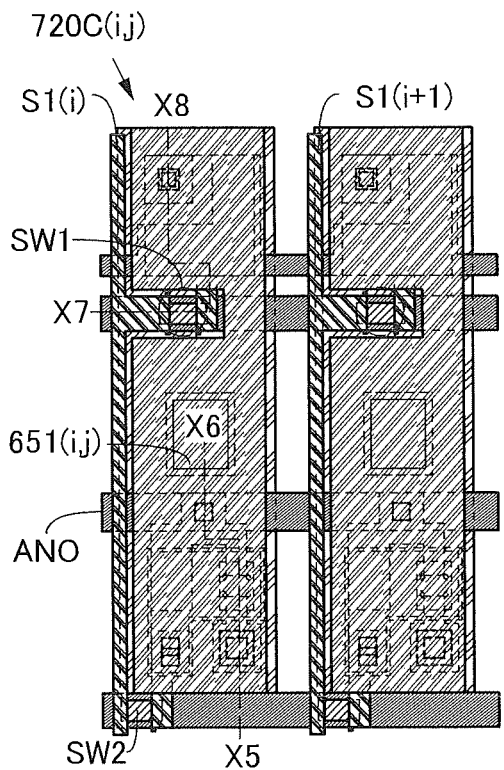
FIG. 28B2
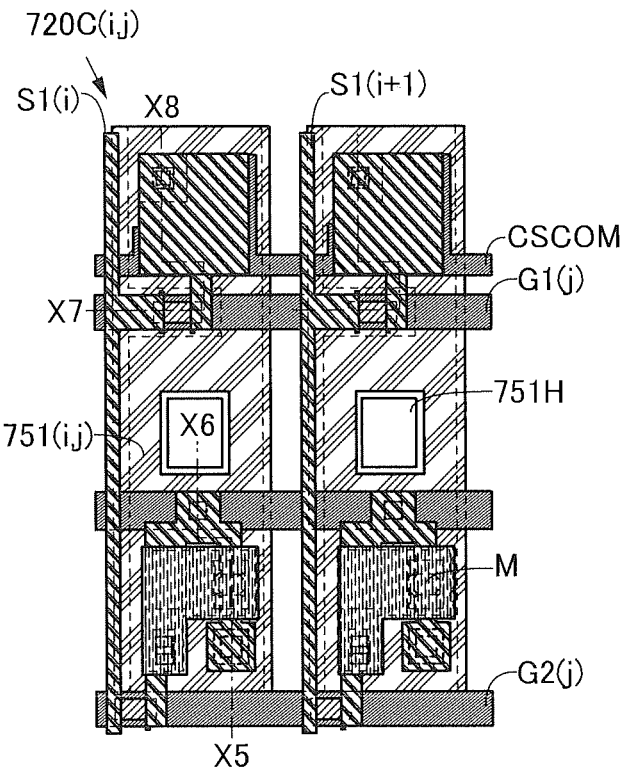

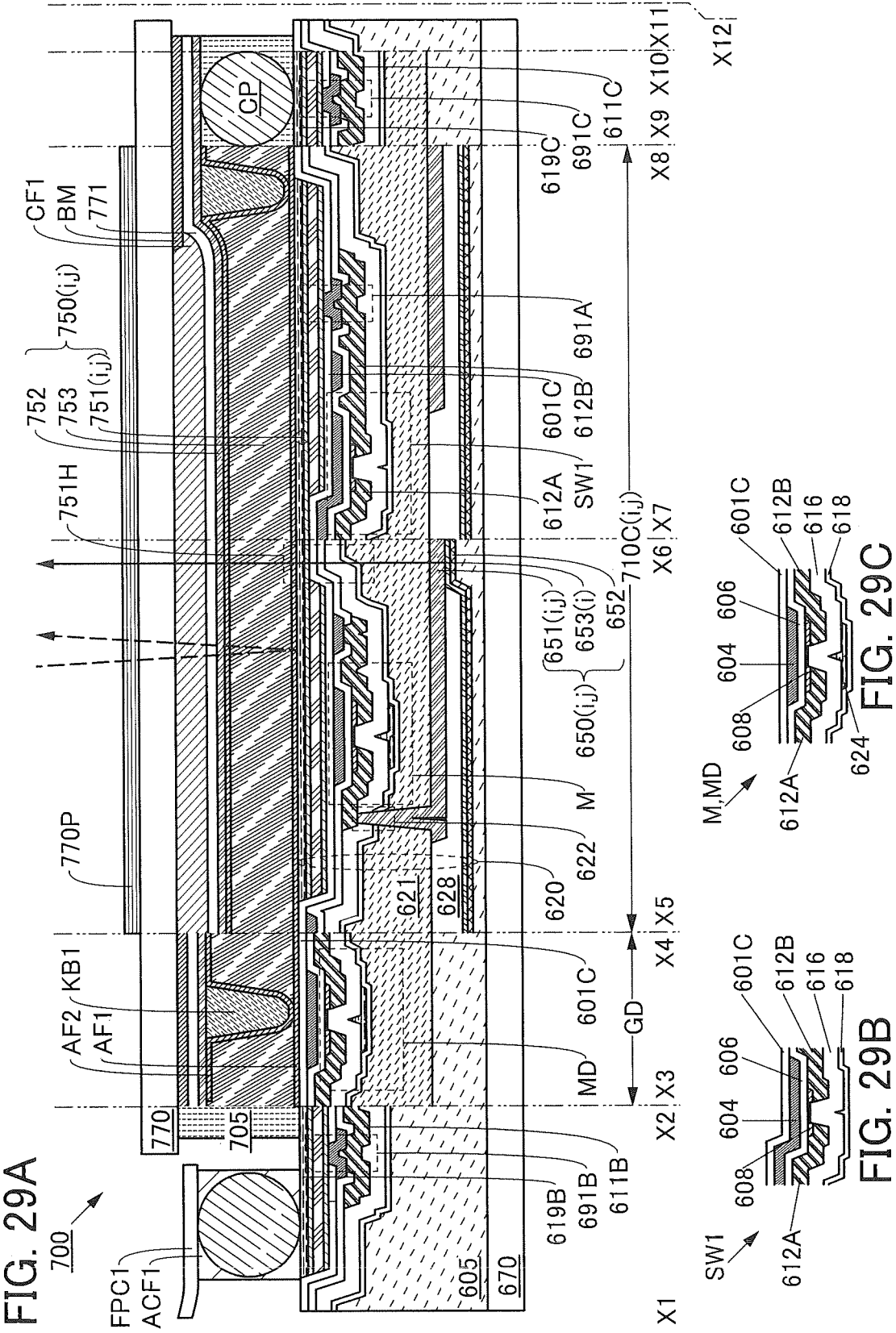

FIG. 30A1
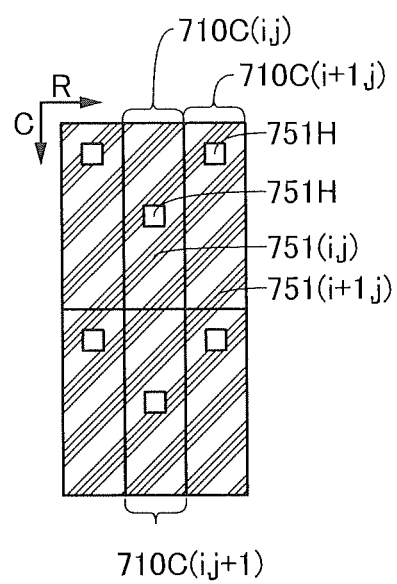
FIG. 30A2
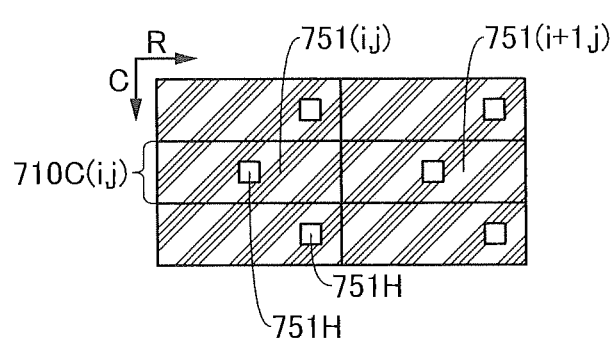
FIG. 30B1
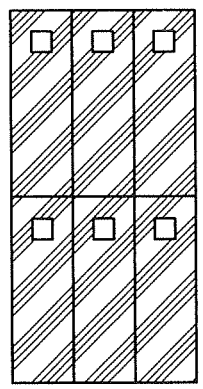
FIG. 30B2
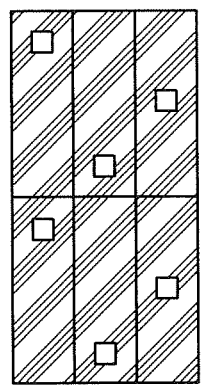
FIG. 30B3
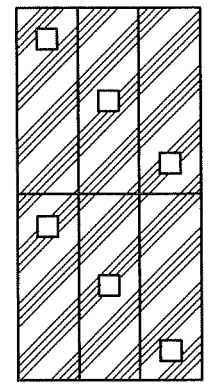

FIG. 33A
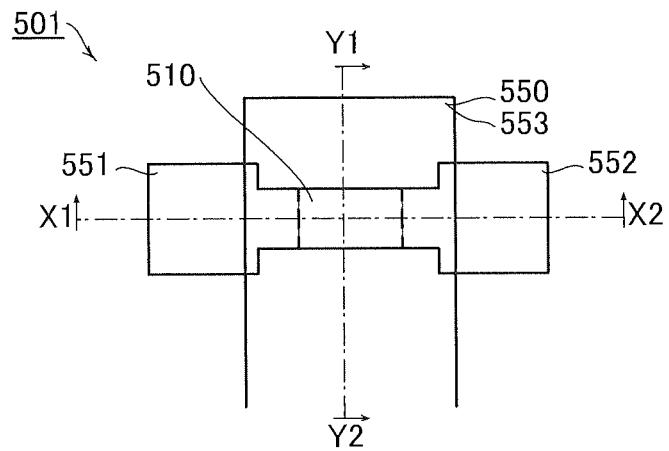
FIG. 33B
FIG. 33C
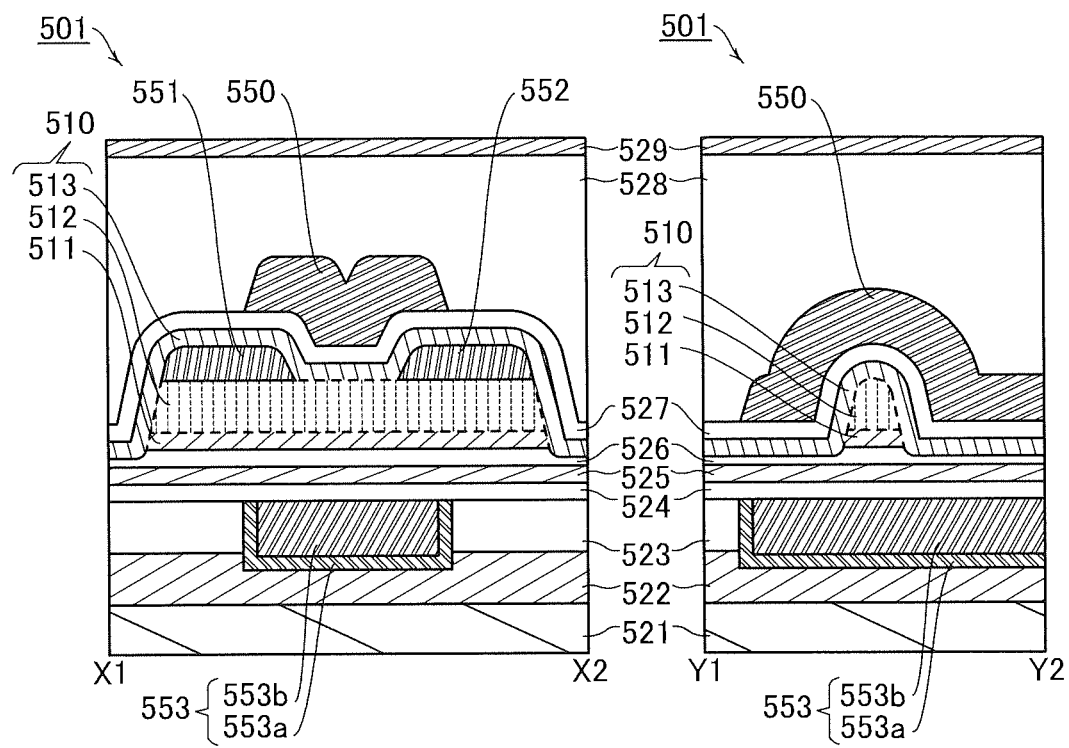

FIG. 38A
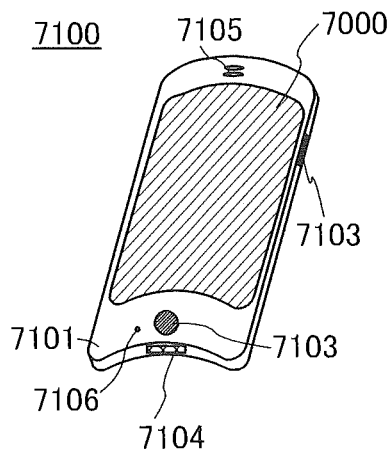
FIG. 38B
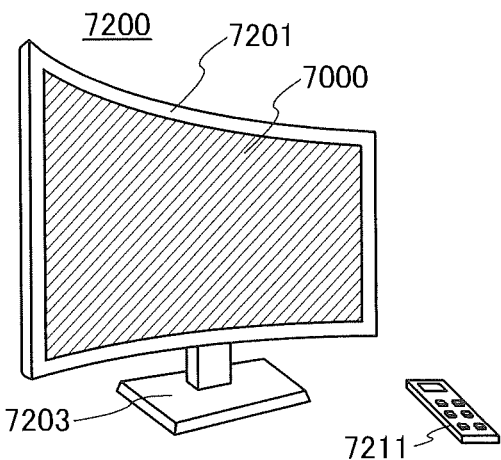
FIG. 38C1
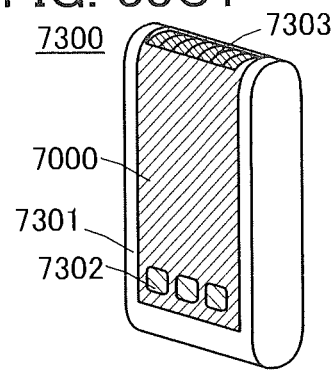
FIG. 38D
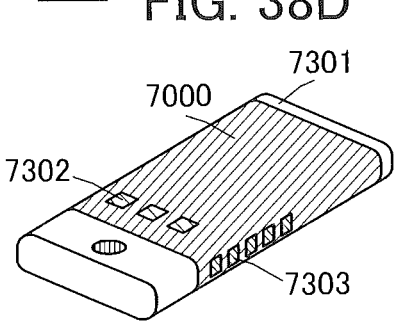
FIG. 38E
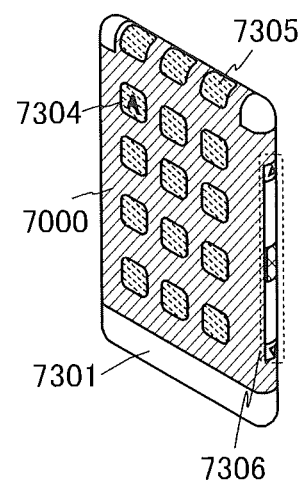
FIG. 38C2
FIG. 38F
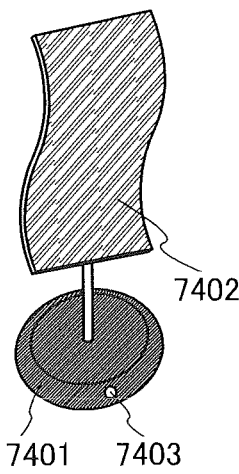
FIG. 38G
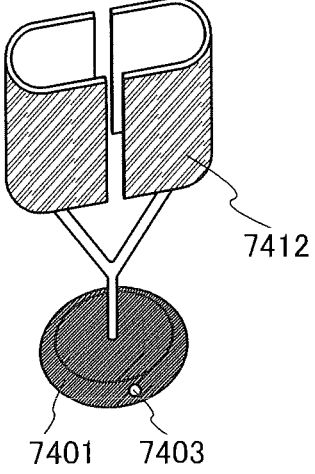
FIG. 38H
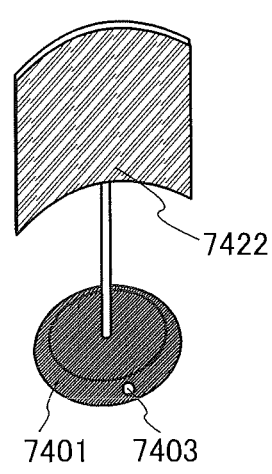

FIG. 39A1
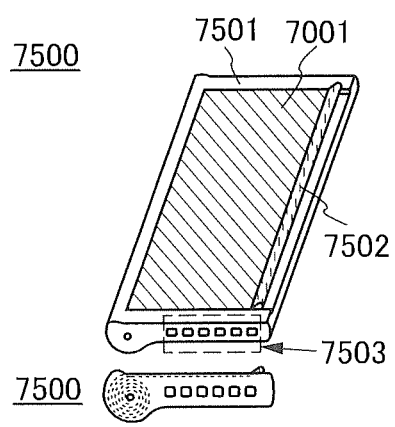
FIG. 39B
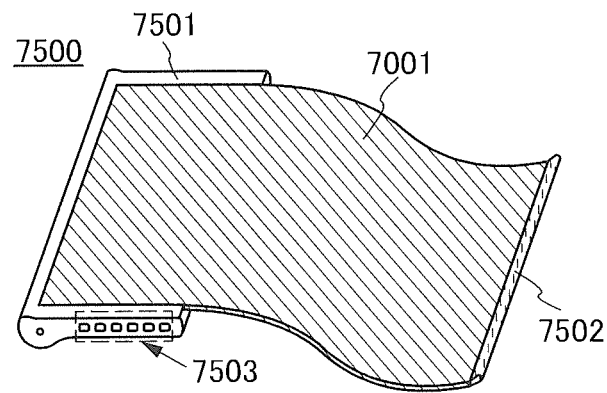
FIG. 39A2
FIG. 39C
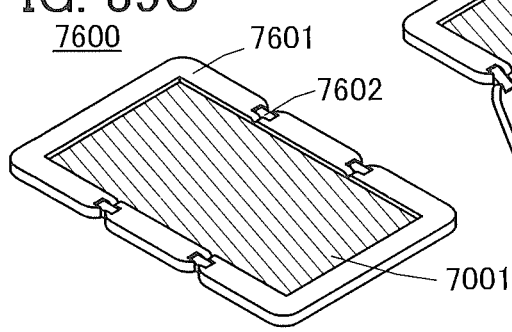
FIG. 39D
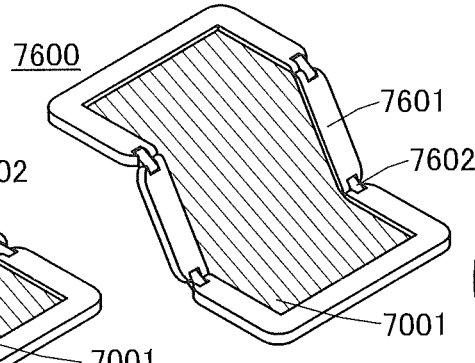
FIG. 39E
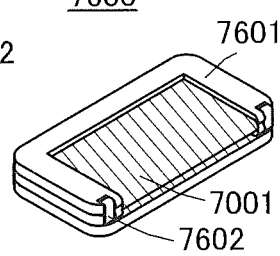
FIG. 39F
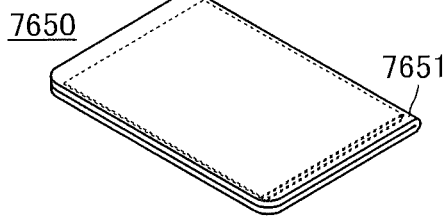
FIG. 39G
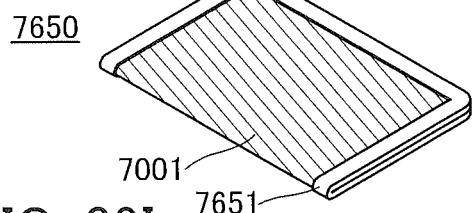
FIG. 39H
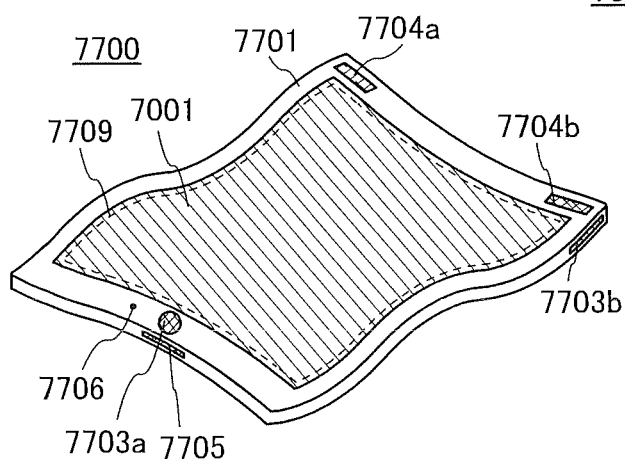
FIG. 39I
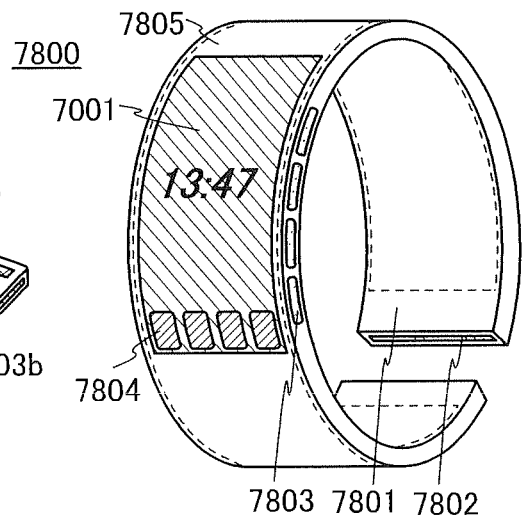

DISPLAY DEVICE, DISPLAY MODULE, AND ELECTRONIC DEVICE

This application is a continuation of copending U.S. application Ser. No. 15/472,490, filed on Mar. 29, 2017 which is incorporated herein by reference.

BACKGROUND OF THE INVENTION

1. Field of the Invention

One embodiment of the present invention relates to a display device, a display module, and an electronic device.

Note that one embodiment of the present invention is not limited to the above technical field. The technical field of one embodiment of the invention disclosed in this specification and the like relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, and a manufacturing method thereof.

2. Description of the Related Art

Mobile devices such as smartphones or tablets have become increasingly popular. The mobile devices need to display images suitable for the brightness of a use environment (i.e., an outdoor environment or an indoor environment).

A display device which displays an image by utilizing reflected light in bright enough light, such as natural light or light from an indoor lighting device, and displays an image by utilizing a light-emitting element in an environment without enough brightness is disclosed.

For example, Patent Documents 1 to 3 disclose hybrid display devices in each of which a pixel circuit for controlling a liquid crystal element and a pixel circuit for controlling a light-emitting element are provided in one pixel.

REFERENCE

Patent Document

[Patent Document 1] United States Patent Application Publication No. 2003/0107688
[Patent Document 2] PCT International Publication No. WO2007/041150
[Patent Document 3] Japanese Published Patent Application No. 2008-225381

SUMMARY OF THE INVENTION

A reflective liquid crystal display device employs a display method that utilizes external light. Because the reflective liquid crystal display device does not require a backlight, it consumes low power; however, it can display images favorably only in a place under bright external light. A light-emitting display device, which includes a self-luminous electroluminescence (EL) element, can display images favorably in a dark place; however, its visibility is low in a bright place. The hybrid display devices disclosed in Patent Documents 1 to 3 take advantages of a reflective liquid crystal display device and a light-emitting display device and can be used regardless of the brightness of a place where they are used.

The optical response speed of a liquid crystal element is different from that of a light-emitting element. Thus, a desired display quality suitable for the displayed content is hard to obtain. Furthermore, because grayscale signals are sequentially updated, power consumption is hard to reduce.

In consideration of the aforementioned problems, an object of one embodiment of the present invention is to provide a novel display device or the like in which a method for selecting a pixel circuit in accordance with the displayed content is optimized by a novel circuit for driving the display device. Another object of one embodiment of the present invention is to provide a display device or the like whose display quality is improved by updating a grayscale signal of a display element in accordance with the displayed content. Another object of one embodiment of the present invention is to provide a display device or the like with a novel structure, in which power consumption is reduced by updating a grayscale signal of a display element in accordance with the displayed content.

Note that the objects of one embodiment of the present invention are not limited to the above objects. The objects described above do not disturb the existence of other objects. The other objects are the ones that are not described above and will be described below. The other objects will be apparent from and can be derived from the description of the specification, the drawings, and the like by those skilled in the art. One embodiment of the present invention is to solve at least one of the aforementioned objects and the other objects.

One embodiment of the present invention is a display device which includes a gate driver, a display portion, and a selection signal output circuit. In the display device, the display portion includes a first region and a second region. The first region and the second region each include a pixel circuit and a scan line. The pixel circuit includes a display element. The gate driver is electrically connected to the scan line. The scan line is electrically connected to the pixel circuit. The scan line is configured to receive a first scan signal. The selection signal output circuit is configured to output a first selection signal for selecting a scan line to which the first scan signal is supplied. The first selection signal is configured to supply the first scan signal to the selected scan line. The display element is configured to update display by the first scan signal. A frequency of updating display of the display element in the first region is different from a frequency of updating display of the display element in the second region.

In the display device of one embodiment of the present invention, the display element preferably includes a liquid crystal element.

In the display device of one embodiment of the present invention, the display element preferably includes a self-luminous element.

One embodiment of the present invention is a display device which includes a gate driver, a display portion, and a selection signal output circuit. In the display device, the display portion includes a pixel circuit, a first scan line, and a second scan line. The pixel circuit includes a first display element and a second display element. The first scan line is configured to receive a first scan signal. The second scan line is configured to receive a second scan signal. The gate driver includes a shift register circuit and a selection circuit. The shift register circuit is configured to output an output signal. The selection signal output circuit is configured to output a first selection signal and a second selection signal. The selection circuit is configured to generate the first scan signal and the second scan signal on the basis of the output signal, the first selection signal, and the second selection signal.

In the display device of one embodiment of the present invention, the display portion preferably includes a first signal line and a second signal line. The first signal line is preferably configured to receive a first grayscale signal, and the second signal line is preferably configured to receive a second grayscale signal. A voltage amplitude of the first scan signal is preferably larger than that of the first grayscale signal. The selection circuit preferably generates the second scan signal on the basis of the output signal and the second selection signal. A voltage amplitude of the second scan signal is preferably larger than that of the second grayscale signal. The first scan signal preferably has a different voltage amplitude from the second scan signal.

In the display device of one embodiment of the present invention, the selection signal output circuit is preferably configured to switch its output between the first selection signal and the second selection signal.

One embodiment of the present invention is a display device which includes a signal line, a first scan line, a second scan line, and a pixel circuit. In the display device, the pixel circuit includes a first circuit and a second circuit. The first circuit includes a first display element. The second circuit includes a second display element. The signal line is configured to supply a first grayscale signal to the first circuit. The signal line is configured to supply a second grayscale signal to the second circuit. The first display element is configured to exhibit a first grayscale level. The second display element is configured to exhibit a second grayscale level. The first scan line is configured to output a first voltage and a second voltage which is lower than the first voltage. The second scan line is configured to output a third voltage and a fourth voltage which is lower than the third voltage. A maximum voltage generated by the first grayscale signal is lower than the first voltage. A minimum voltage generated by the first grayscale signal is higher than the second voltage. A maximum voltage generated by the second grayscale signal is lower than the third voltage. A minimum voltage generated by the second grayscale signal is higher than the fourth voltage. The maximum voltage generated by the first grayscale signal is higher than the maximum voltage generated by the second grayscale signal. The minimum voltage generated by the first grayscale signal is lower than the minimum voltage generated by the second grayscale signal.

The display device of one embodiment of the present invention preferably includes the signal line, a first power supply line, and a pixel circuit. The first circuit preferably includes the first display element, a first transistor, and a first capacitor. The second circuit preferably includes the second display element, a second transistor, a third transistor, and a fourth transistor. The first display element preferably includes a first pixel electrode and a first counter electrode. The second display element preferably includes a second pixel electrode and a second counter electrode. The □□gnal line is preferably electrically connected to one of a source and a drain of the first transistor. The other of the source and the drain of the first transistor is preferably electrically connected to the first pixel electrode. The other of the source and the drain of the first transistor is preferably electrically connected to one electrode of the first capacitor. The other electrode of the first capacitor is preferably electrically connected to the first power supply line. The first scan line is preferably electrically connected to a gate of the first transistor. The signal line is preferably electrically connected to one of a source and a drain of the second transistor. The other of the source and the drain of the second transistor is preferably electrically connected to a gate of the third transistor. One of a source and a drain of the third transistor is preferably electrically connected to the second pixel electrode. One of the source and the drain of the third transistor is preferably electrically connected to one of a source and a drain of the fourth transistor. The second scan line is preferably electrically connected to a gate of the second transistor. The first power supply line is preferably electrically connected to the other of the source and the drain of the fourth transistor. A voltage supplied to the first power supply line is preferably supplied to the second pixel electrode through the fourth transistor in a period when the first grayscale signal is supplied to the one electrode of the first capacitor through the first transistor.

In the above-described embodiment, the first display element preferably includes a liquid crystal element, and the second display element preferably includes a self-luminous element.

In the display device of one embodiment of the present invention, the pixel circuit preferably includes the transistors, and the transistors preferably include an oxide semiconductor in their channel formation regions.

One embodiment of the present invention can provide a novel display device or the like in which a method for selecting a pixel circuit in accordance with the displayed content is optimized by a novel circuit for driving the display device. Furthermore, one embodiment of the present invention can provide a display device or the like whose display quality is improved by updating a grayscale signal of a display element in accordance with the displayed content. Moreover, one embodiment of the present invention can provide a display device or the like with a novel structure, in which power consumption is reduced by updating a grayscale signal of a display element in accordance with the displayed content.

Note that the effects of one embodiment of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention is to have at least one of the aforementioned effects and the other effects. Accordingly, one embodiment of the present invention does not have the aforementioned effects in some cases.

BRIEF DESCRIPTION OF THE DRAWINGS

In the accompanying drawings:

FIGS. 27A, 27B1, and 27B2 illustrate a structure of a display panel according to an embodiment;

FIGS. 28A1, 28A2, 28B1, and 28B2 illustrate structures of a pixel according to an embodiment;

FIGS. 29A to 29C illustrate a structure of a display panel according to an embodiment;

FIGS. 30A1, 30A2, 30B1, 30B2, and 30B3 are drawings for explaining openings of a pixel circuit according to an embodiment;

FIGS. 33A to 33C are a top view and cross-sectional views illustrating a structure example of an OS transistor;

FIGS. 38A, 38B, 38C1, 38C2, 38D, 38E, 38F, 38G, and 38H illustrate examples of an electronic device and a lighting device;

FIGS. 39A1, 39A2, 39B, 39C, 39D, 39E, 39F, 39G, 39H, and 39I illustrate examples of an electronic device.

DETAILED DESCRIPTION OF THE INVENTION

Figure 1:
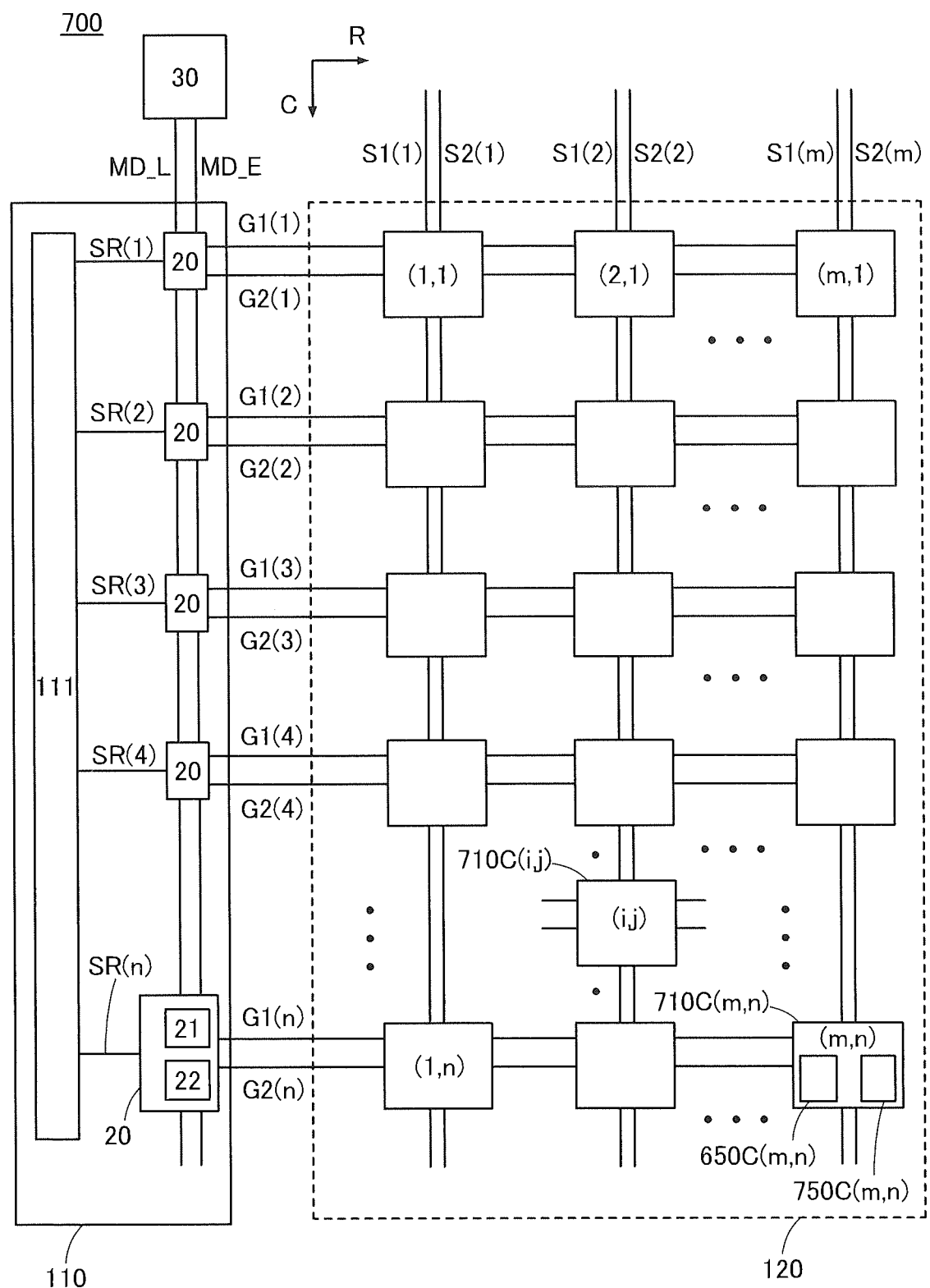
FIG. 1 illustrates a structure of a display device.

Hereinafter, embodiments will be described with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, embodiments of the present invention are not limited to such a scale. Note that the drawings are schematic views showing ideal examples, and embodiments of the present invention are not limited to shapes or values shown in the drawings.

Note that in this specification, ordinal numbers such as "first", "second", and "third" are used in order to avoid confusion among components, and the terms do not limit the components numerically.

Note that in this specification, terms for describing arrangement, such as "over" "above", "under", and "below", are used for convenience in describing a positional relation between components with reference to drawings. Further, the positional relation between components is changed as appropriate in accordance with a direction in which the components are described. Thus, the positional relation is not limited to that described with a term used in this specification and can be explained with another term as appropriate depending on the situation.

In this specification and the like, a transistor is an element having at least three terminals of a gate, a drain, and a source. In addition, the transistor has a channel region between a drain (a drain terminal, a drain region, or a drain electrode) and a source (a source terminal, a source region, or a source electrode), and current can flow through the channel region between the source region and the drain region. Note that in this specification and the like, a channel region refers to a region through which current mainly flows.

Further, functions of a source and a drain might be switched when transistors having different polarities are employed or a direction of current flow is changed in circuit operation, for example. Therefore, the terms "source" and "drain" can be switched in this specification and the like.

Note that in this specification and the like, the expression "electrically connected" includes the case where components are connected through an "object having any electric function". There is no particular limitation on an "object having any electric function" as long as electric signals can be transmitted and received between components that are connected through the object. Examples of an "object having any electric function" are a switching element such as a transistor, a resistor, an inductor, a capacitor, and elements with a variety of functions as well as an electrode and a wiring.

In this specification and the like, the term "parallel" means that the angle formed between two straight lines is greater than or equal to −10° and less than or equal to 10°, and accordingly also covers the case where the angle is greater than or equal to −5° and less than or equal to 5°. The term "perpendicular" means that the angle formed between two straight lines is greater than or equal to 80° and less than or equal to 100°, and accordingly also covers the case where the angle is greater than or equal to 85° and less than or equal to 95°.

In this specification and the like, the terms "film" and "layer" can be interchanged with each other. For example, the term "conductive layer" can be changed into the term "conductive film" in some cases. Also, the term "insulating film" can be changed into the term "insulating layer" in some cases.

Unless otherwise specified, the off-state current in this specification and the like refers to a drain current of a transistor in the off state (also referred to as non-conduction state and cutoff state). Unless otherwise specified, the off state of an n-channel transistor means that a voltage ($V_{gs}$) between its gate and source is lower than the threshold voltage ($V_{th}$), and the off state of a p-channel transistor means that the gate-source voltage $V_{gs}$ is higher than the threshold voltage $V_{th}$. For example, the off-state current of an n-channel transistor sometimes refers to a drain current that flows when the gate-source voltage $V_{gs}$ is lower than the threshold voltage $V_{th}$.

The off-state current of a transistor depends on $V_{gs}$ in some cases. Thus, "the off-state current of a transistor is lower than or equal to I" may mean "there is $V_{gs}$ with which the off-state current of the transistor becomes lower than or equal to I". Furthermore, "the off-state current of a transistor" means "the off-state current in an off state at predetermined $V_{gs}$", "the off-state current in an off state at $V_{gs}$ in a predetermined range", "the off-state current in an off state at $V_{gs}$ with which sufficiently reduced off-state current is obtained", or the like.

As an example, the assumption is made of an n-channel transistor where the threshold voltage $V_{th}$ is 0.5 V and the drain current is $1\times10^{-9}$ A at $V_{gs}$ of 0.5 V, $1\times10^{-13}$ A at $V_{gs}$ of 0.1 V, $1\times10^{-19}$ A at $V_{gs}$ of −0.5 V, and $1\times10^{-22}$ A at $V_{gs}$ of −0.8 V. The drain current of the transistor is $1\times10^{-19}$ A or lower at $V_{gs}$ of −0.5 V or at $V_{gs}$ in the range of −0.8 V to −0.5 V; therefore, it can be said that the off-state current of the transistor is $1\times10^{-19}$ A or lower. Since there is $V_{gs}$ at which the drain current of the transistor is $1\times10^{-22}$ A or lower, it may be said that the off-state current of the transistor is $1\times10^{-22}$ A or lower.

In this specification and the like, the off-state current of a transistor with a channel width W is sometimes represented by a current value in relation to the channel width W or by a current value per given channel width (e.g., 1 μm). In the latter case, the off-state current may be expressed in the unit with the dimension of current per length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability required in a semiconductor device or the like including the transistor is ensured or a temperature at which the semiconductor device or the like including the transistor is used (e.g., temperature in the range of 5° C. to 35° C.). The description "an off-state current of a transistor is lower than or equal to I" may refer to a situation where there is $V_{gs}$ at which the off-state current of a transistor is lower than or equal to I at room temperature, 60° C., 85° C., 95° C., 125° C., a temperature at which the reliability required in a semiconductor device or the like including the transistor is ensured, or a temperature at which the semiconductor device or the like including the transistor is used (e.g., temperature in the range of 5° C. to 35° C.).

The off-state current of a transistor depends on voltage $V_{ds}$ between its drain and source in some cases. Unless otherwise specified, the off-state current in this specification may be an off-state current at $V_{ds}$ of 0.1 V, 0.8 V, 1 V, 1.2 V, 1.8 V, 2.5 V, 3 V, 3.3 V, 10 V, 12 V, 16 V, or 20 V. Alternatively, the off-state current might be an off-state current at Vas at which the required reliability of a semiconductor device or the like including the transistor is ensured or $V_{ds}$ at which the semiconductor device or the like including the transistor is used. The description "an off-state current of a transistor is lower than or equal to I" may refer to a situation where there is $V_{gs}$ at which the off-state current of a transistor is lower than or equal to I at $V_{ds}$ of 0.1 V, 0.8 V, 1 V, 1.2 V, 1.8 V, 2.5 V, 3 V, 3.3 V, 10 V, 12 V, 16 V, or 20 V, $V_{ds}$ at which the required reliability of a semiconductor device or the like including the transistor is ensured, or $V_{ds}$ at which the semiconductor device or the like including the transistor is used.

In the above description of off-state current, a drain may be replaced with a source. That is, the off-state current sometimes refers to a current that flows through a source of a transistor in the off state.

In this specification and the like, the term "leakage current" sometimes expresses the same meaning as off-state current. In this specification and the like, the off-state current sometimes refers to a current that flows between a source and a drain when a transistor is off, for example.

Embodiment 1

In this embodiment, a display device in which a selection circuit included in a gate driver circuit is configured to generate a scan signal for selecting a pixel circuit including a first display element or a pixel circuit including a second display element will be described with reference to FIG. 1, FIG. 2, FIGS. 3A to 3C, FIGS. 4A and 4B, FIGS. 5A and 5B, and FIGS. 6A and 6B.

FIG. 1 is a block diagram illustrating a structure of a display device 700. The display device 700 includes a gate driver 110, a selection signal output circuit 30, and a display portion 120. The gate driver 110 includes a shift register circuit 111 and a selection circuit 20. The selection circuit 20 includes a determination circuit 21 and a determination circuit 22. The display portion 120 includes pixel circuits 710C(1, 1) to 710C(m, n). The pixel circuit 710C(m, n) includes a pixel circuit 750C(m, n) including a first display element and a pixel circuit 650C(m, n) including a second display element. Note that m and n are integers of 1 or more.

The display portion 120 described in this embodiment includes the pixel circuits 710C(1, 1) to 710C(m, n), first scan lines G1, second scan lines G2, first signal lines S1, and second signal lines S2.

Figure 2:
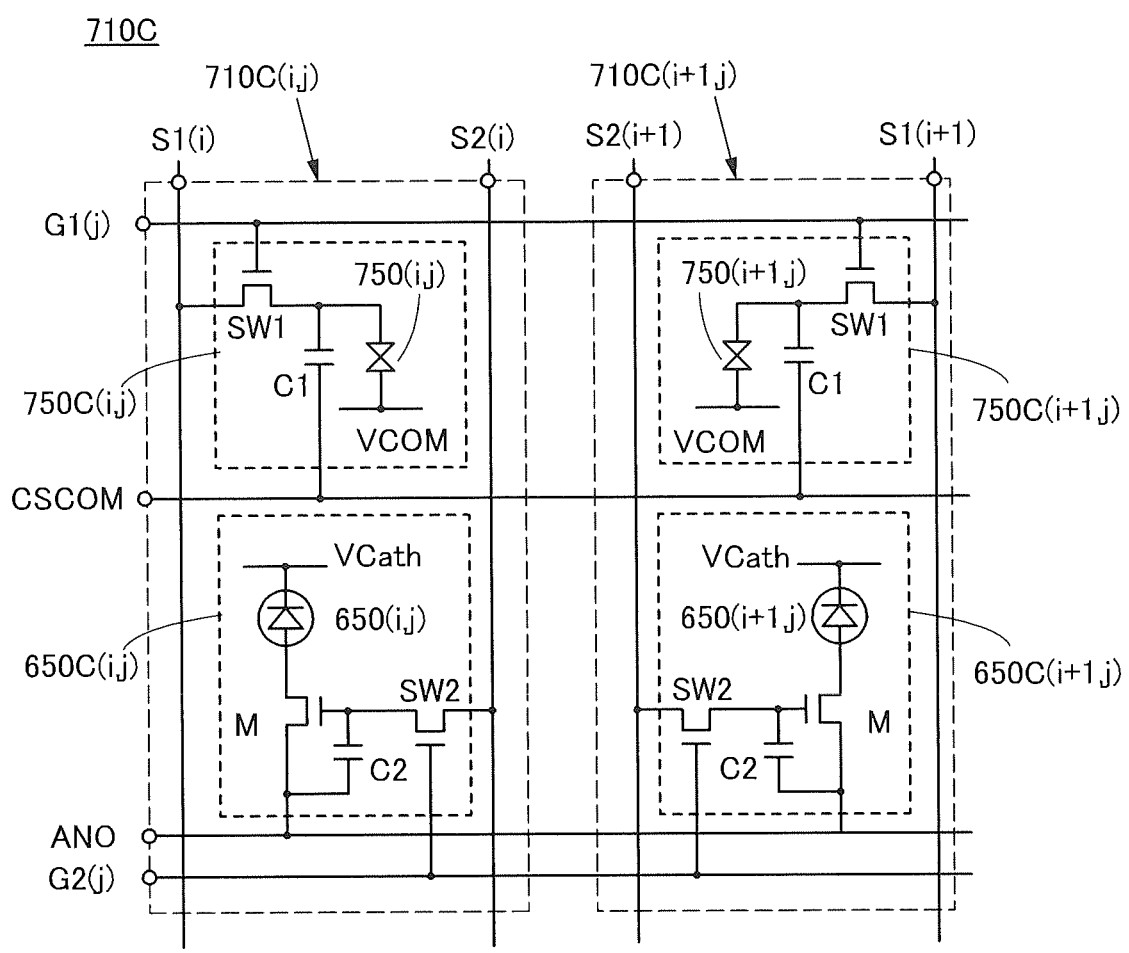
FIG. 2 illustrates a structure of pixels.

FIG. 2 illustrates a structure of pixel circuits 710C. One pixel in the display portion 120 of the display device 700 illustrated in FIG. 1 is described as the pixel circuit 710C(i, j). Note that i is an integer greater than or equal to 1 and less than or equal to m, and j is an integer greater than or equal to 1 and less than or equal to n.

The pixel circuit 710C(i, j) includes a pixel circuit 750C(i, j) which includes a first display element 750(i, j). For example, the first display element 750(i, j) is preferably a liquid crystal element which is driven by an alternating current in order to prevent burn-in.

The pixel circuit 710C(i, j) includes a pixel circuit 650C(i, j) which includes a second display element 650(i, j). For example, the second display element 650(i, j) is preferably a light-emitting element which is driven by a direct current.

The pixel circuit 750C(i, j) and the pixel circuit 650C(i, j) are the minimum unit for exhibiting a grayscale level, and the grayscale level is controlled by a grayscale signal which is a voltage or a current.

The pixel circuit 750C(i, j) includes a transistor SW1, a capacitor C1, and the first display element 750(i, j).

A gate of the transistor SW1 of the pixel circuit 750C(i, j) is electrically connected to the first scan line G1(j). One of a source and a drain of the transistor SW1 is electrically connected to the first signal line S1(i).

The other of the source and the drain of the transistor SW1 is electrically connected to one electrode of the capacitor C1 and one electrode of the first display element 750(i, j). A reference voltage of the capacitor C1 is supplied to the other electrode of the capacitor C1 through a CSCOM terminal. A common voltage is supplied to the other electrode of the first display element 750(i, j) through a VCOM terminal.

The pixel circuit 650C(i, j) includes a transistor SW2, a transistor M, a capacitor C2, and the second display element 650(i, j).

A gate of the transistor SW2 of the pixel circuit 650C(i, j) is electrically connected to the second scan line G2(j). One of a source and a drain of the transistor SW2 is electrically connected to the second signal line S2(i).

The other of the source and the drain of the transistor SW2 is electrically connected to one electrode of the capacitor C2 and a gate of the transistor M. An anode voltage is supplied to a drain of the transistor M through an ANO terminal. The drain of the transistor M is connected to the other electrode of the capacitor C2. A source of the transistor M is electrically connected to one electrode of the second display element 650(i, j). A cathode voltage is supplied to the other electrode of the second display element 650(i, j) through a VCath terminal. Although the other electrode of the capacitor C2 is electrically connected to the drain of the transistor M in the illustrated example, it may be electrically connected to the source of the transistor M or may be electrically connected to a terminal to which another voltage is supplied.

Note that the circuit structure of the pixel circuit 710C(i, j) in one embodiment of the present invention is not limited to that illustrated in FIG. 2. Examples of the circuit structure of the pixel circuit 710C(i, j) which are different from that illustrated in FIG. 2 are illustrated in FIGS. 3A to 3C.

Figure 3A:
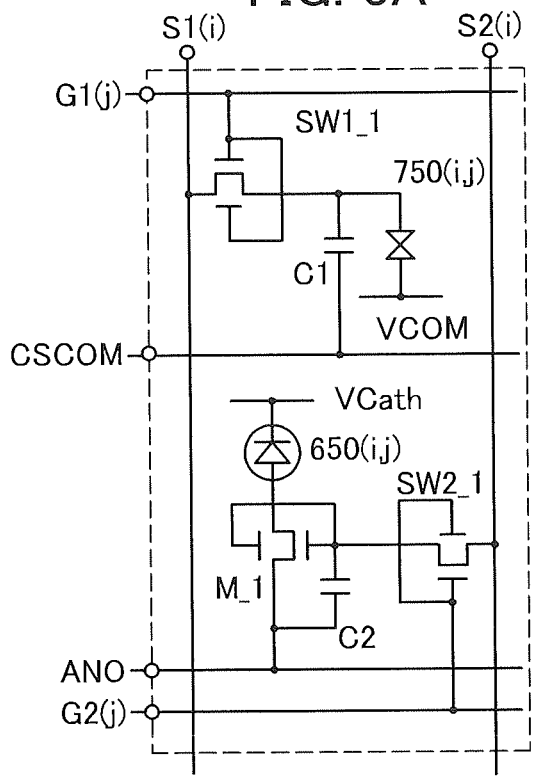
FIGS. 3A to 3C each illustrate a structure of a pixel.
Figure 3B:
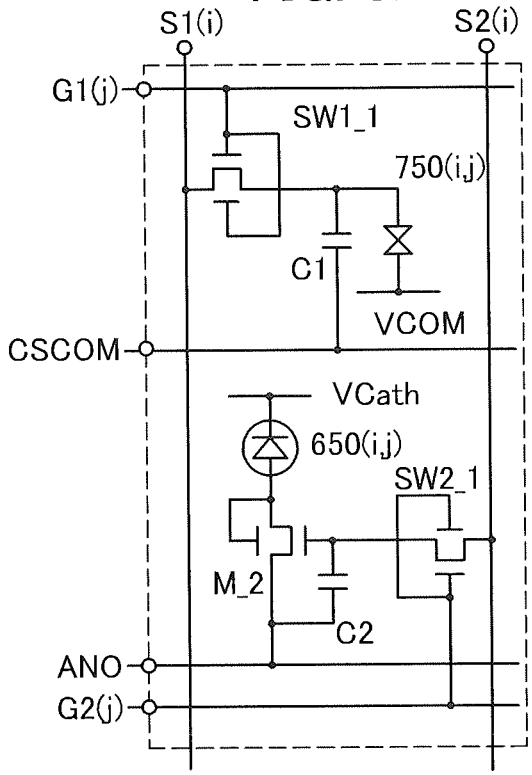
Figure 3C:
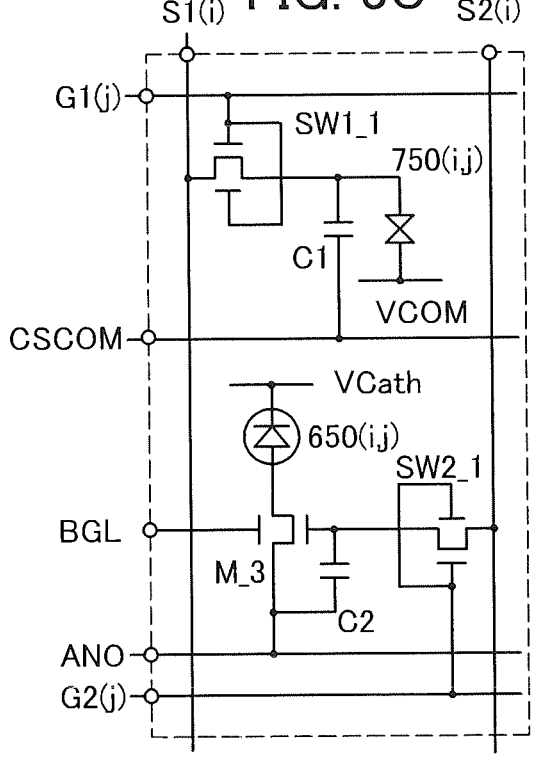

FIGS. 3A to 3C each illustrate a pixel in which transistors have backgates. Except for the transistor structure, the circuits in FIGS. 3A to 3C are similar to that illustrated in FIG. 2.

The circuit in FIG. 3A is different from that in FIG. 2 in the following points. In FIG. 3A, transistors included in the pixel circuit 710C(i, j) have backgates. A gate of a transistor SW1_1 is connected to a backgate of the transistor SW1_1. Gates of a transistor SW2_1 and a transistor M_1 are similarly electrically connected to backgates thereof. The same voltage as a gate voltage of the transistor SW1_1 is supplied to the backgate of the transistor SW1_1. The same applies to the transistor SW2_1 and the transistor M_1.

The circuit in FIG. 3B is different from that in FIG. 3A in the following points. In FIG. 3B, a backgate of a transistor M_2 is connected to a source of the transistor M_2. The same voltage as a source voltage of the transistor M_2 is supplied to the backgate of the transistor M_2.

The circuit in FIG. 3C is different from that in FIG. 3A in the following points. In FIG. 3C, a backgate of a transistor M_3 is connected to a BGL terminal. A voltage can be supplied to the backgate from the BGL terminal.

Note that the circuit structure of the pixel circuit 710C(i, j) in one embodiment of the present invention is not limited to those in FIGS. 3A to 3C. Other terminals can be electrically connected to the backgates, or other combinations of connection can be employed.

In the transistors, an oxide semiconductor film where a channel region is formed may be electrically surrounded by electric fields from the gate electrode (first gate electrode) and the backgate electrode (second gate electrode). This device structure is referred to as a surrounded channel (s-channel) structure.

Figure 4A:
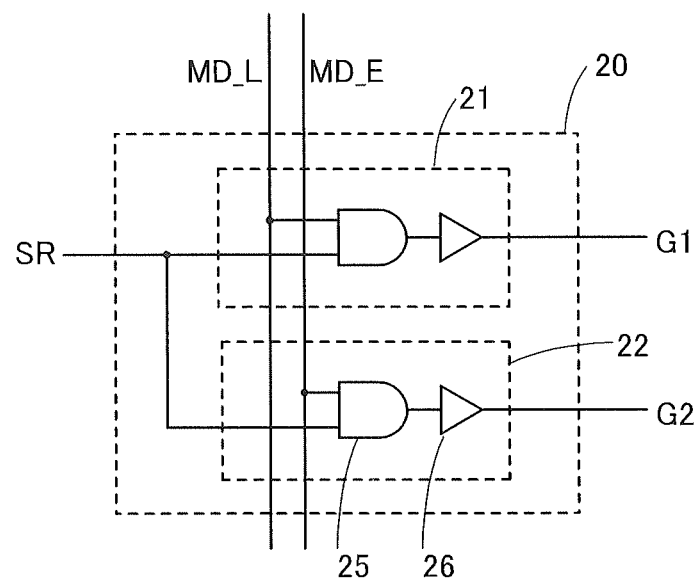
FIG. 4A is a block diagram of a selection circuit.

FIG. 4A illustrates a structure of the selection circuit 20. The selection circuit 20 includes the determination circuit 21 and the determination circuit 22. The determination circuit 21 and the determination circuit 22 each include a circuit 25 which determines conditions of input signals and a buffer circuit 26.

An output signal SR from the shift register circuit 111, which is a signal for selecting the selection circuit 20, is input to one input terminal of the circuit 25. A selection signal MD_L from the selection signal output circuit 30 is input to the other input terminal of the circuit 25 in the determination circuit 21. A selection signal MD_E from the selection signal output circuit 30 is input to the other input terminal of the circuit 25 in the determination circuit 22.

Figure 4B:
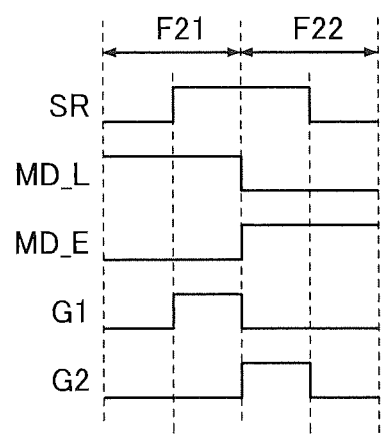
FIG. 4B is a timing chart of the selection circuit illustrated in FIG. 4A.

A timing chart F21 in FIG. 4B shows an operation of the determination circuit 21 included in the selection circuit 20. When the output signal SR from the shift register circuit 111 and the selection signal MD_L are High, a High signal is output to the first scan line G1. In the other input conditions, a Low signal is output to the first scan line G1.

A timing chart F22 in FIG. 4B shows an operation of the determination circuit 22 included in the selection circuit 20. When the output signal SR from the shift register circuit 111 and the selection signal MD_E are High, a High signal is output to the second scan line G2. In the other input conditions, a Low signal is output to the second scan line G2.

The buffer circuit 26 in the determination circuit 21 outputs a signal having a larger voltage amplitude than a grayscale signal of the first display element 750 to the first scan line G1.

The buffer circuit 26 in the determination circuit 22 outputs a signal having a larger voltage amplitude than a grayscale signal of the second display element 650 to the second scan line G2.

Because the voltage amplitude of the grayscale signal of the first display element 750 is different from that of the grayscale signal of the second display element 650, the output voltage in the first scan line G1 and the output voltage in the second scan line G2 have different amplitudes.

Note that the circuit structure of the selection circuit 20 in one embodiment of the present invention is not limited to that illustrated in FIG. 4A as long as operation conditions of FIG. 4B are satisfied.

Figure 5A:
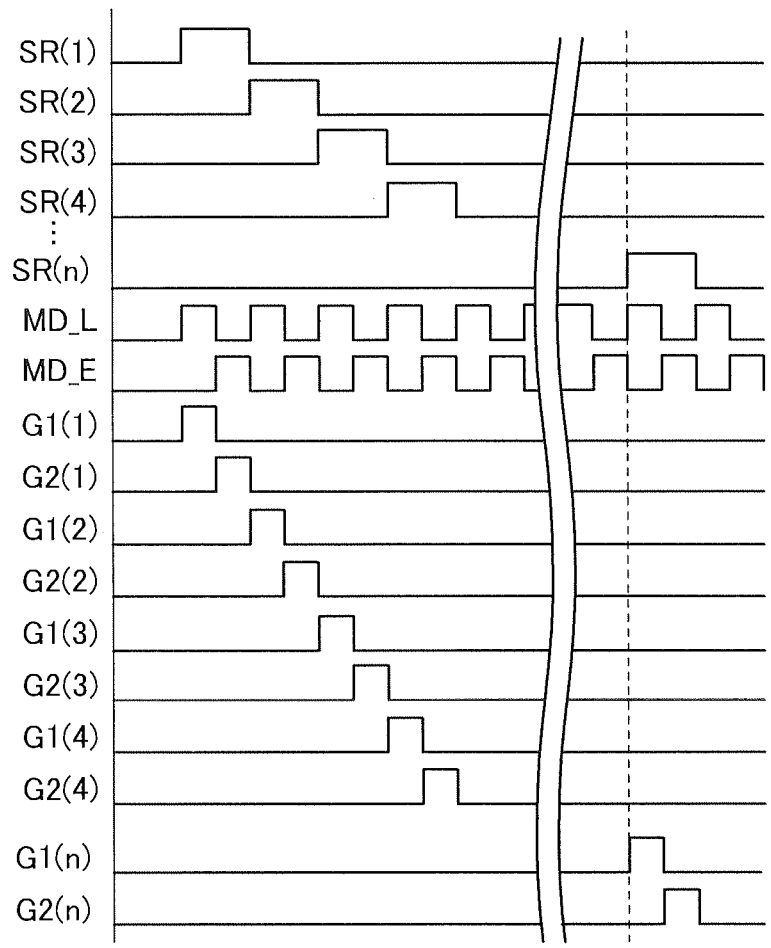
FIG. 5A is a timing chart of the display device illustrated in FIG. 1.

FIG. 5A shows a timing chart of an operation of the display device 700 in FIG. 1. The gate driver 110 in FIG. 1 sequentially outputs the output signals SR(1) to SR(n) from the shift register circuit 111.

A scan signal output to the first scan line G1(j) is generated using the output signal SR(j) from the shift register circuit 111 and the selection signal MD_L from the selection signal output circuit 30 by the determination circuit 21 of the selection circuit 20.

A scan signal output to the second scan line G2(j) is generated using the output signal SR(j) from the shift register circuit 111 and the selection signal MD_E from the selection signal output circuit 30 by the determination circuit 22 of the selection circuit 20.

An operation of the shift register circuit 111 in a period when the output signal SR(1) is High will be described with reference to a timing chart in FIG. 5A.

While the selection signal MD_L is High in the period when the output signal SR(1) is High, the scan signal in the first scan line G1(1) is High, so that grayscale signals can be written into the pixel circuits 750C(i, 1) through the first signal lines S1(1) to S1(m) electrically connected to the pixel circuits 750C(i, 1).

While the selection signal MD_E is High in the period when the output signal SR(1) is High, the scan signal in the second scan line G2(1) is High, so that grayscale signals can be written into the pixel circuits 650C(i, 1) through the second signal lines S2(1) to S2(m) electrically connected to the pixel circuits 650C(i, 1).

Figure 5B:
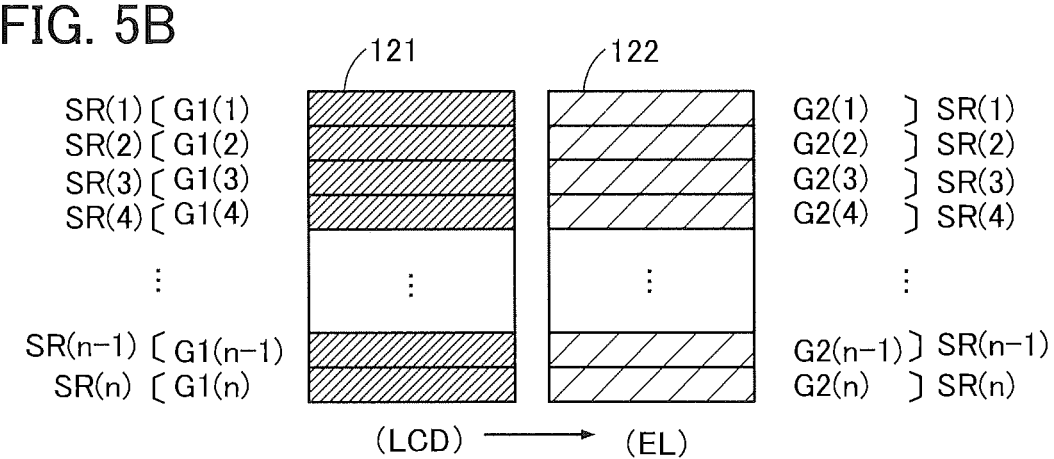
FIG. 5B is a drawing for explaining an operation.

FIG. 5B schematically shows a driving state of the display portion 120. A display region obtained by the pixel circuit 750C(i, j) is referred to as a liquid crystal display region 121, and a display region obtained by the pixel circuit 650C(i, j) is referred to as a light-emitting display region 122.

In FIG. 5B, the displayed content in the liquid crystal display region 121 is updated by the scan signal which is output to the first scan line G1(j) using the output signal SR(j), the selection signal MD_L, the selection signal MD_E, and the selection circuit 20. Furthermore, the displayed content in the light-emitting display region 122 is updated by the scan signal output to the second scan line G2(j). Thus, the display update order accords with the timing chart in FIG. 5A.

An example in which the output signal SR(1) from the shift register circuit 111 in FIG. 1 is High is described below. When the selection signal MD_L is High, the scan signal supplied to the first scan line G1(1) by the selection circuit 20 is High. The displayed content is updated by grayscale signals supplied to the pixel circuits 750C(1, 1) to 750C(m, 1).

When the selection signal MD_E is High in a period when the output signal SR(1) is High, the scan signal supplied to the second scan line G2(1) by the selection circuit 20 is High. The displayed content is updated by grayscale signals supplied to the pixel circuits 650C(1, 1) to 650C(m, 1).

In FIG. 5A, while the output signal SR(1) is High, the selection signal MD_L first becomes High, and then the selection signal MD_E becomes High. In FIG. 5B, the display in the liquid crystal display region 121 is first updated when the selection signal MD_L is High. Then, the display in the light-emitting display region 122 is updated when the selection signal MD_E is High.

The selection of the first scan line G1(1) or the second scan line G2(1) can be controlled by the gate driver including the shift register circuit 111 and the selection circuit 20.

In the example illustrated in FIG. 1, because the selection signal MD_L and the selection signal MD_E are used, n-channel transistors are included in the determination circuit 21 and the determination circuit 22. The determination circuit 21 and the determination circuit 22 can each be formed using a complementary MOS switch (CMOS switch, analog switch). By using a complementary MOS switch, selection conditions can be determined by a positive logic or negative logic; accordingly, the number of selection signals can be reduced.

Figure 6A:
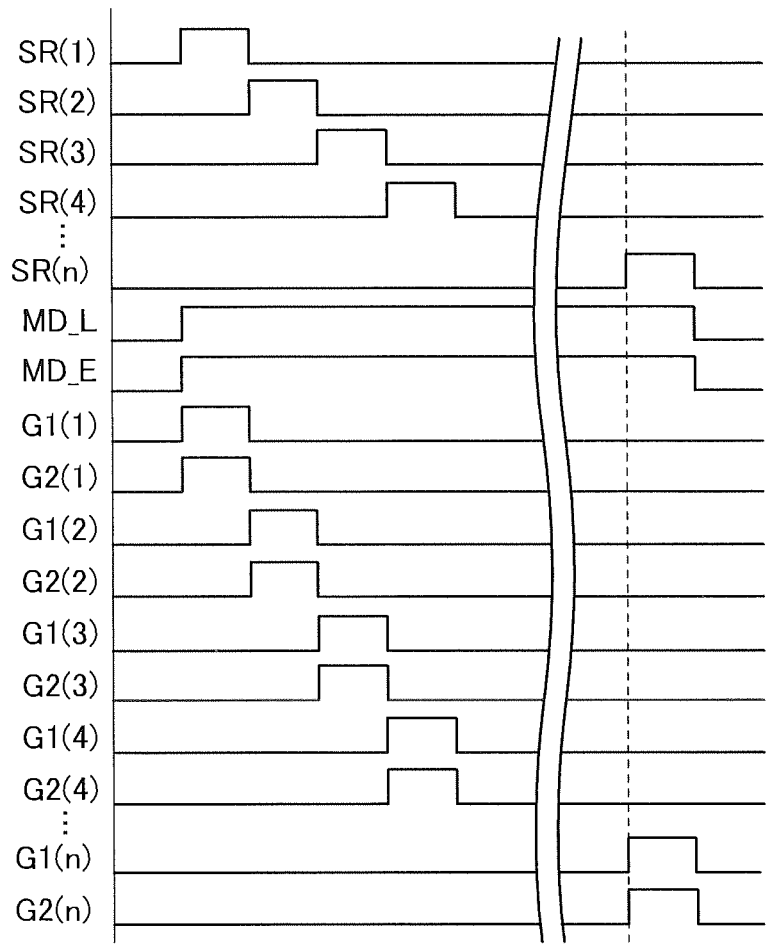
FIG. 6A is a timing chart of the display device illustrated in FIG. 1.

The display device 700 illustrated in FIG. 1 is made to operate with the timing different from that of FIG. 5A, using a timing chart in FIG. 6A. An operation of the shift register circuit 111 in a period when the output signal SR(1) is High is described below.

When the selection signal MD_L is High in a period when the output signal SR(1) is High, the scan signal in the first scan line G1(1) is High, so that grayscale signals can be written into the pixel circuits 750C(i, 1) through the first signal lines S1(1) to S1(m).

When the selection signal MD_E is High in a period when the output signal SR(1) is High, the scan signal in the second scan line G2(1) is High, so that grayscale signals can be written into the pixel circuits 650C(i, 1) through the second signal lines S2(1) to S2(m).

Figure 6B:
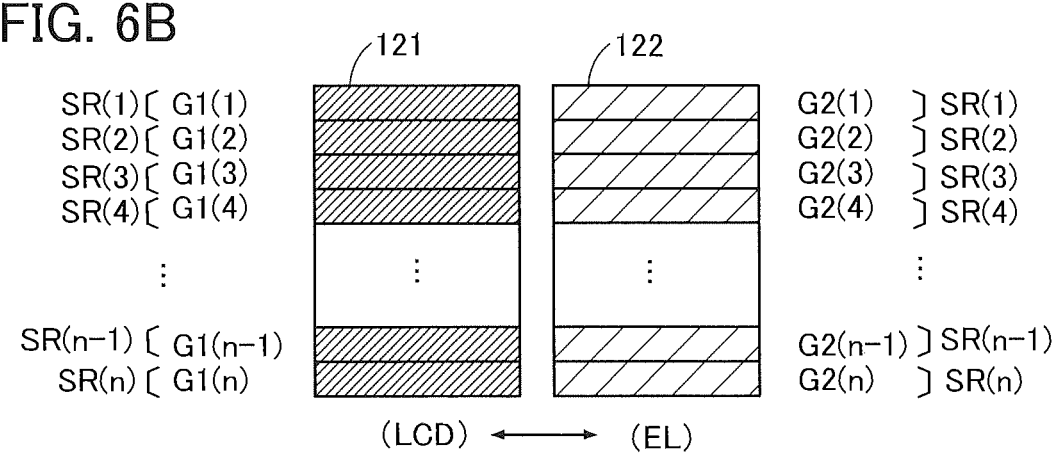
FIG. 6B is a drawing for explaining an operation.

FIG. 6B schematically shows a driving state of the display portion 120. The displayed content in the liquid crystal display region 121 is updated when the scan signal in the first scan line G1(j) is brought to be High by the output signal SR(j), the selection signal MD_L, and the selection signal MD_E. Furthermore, the displayed content in the light-emitting display region 122 is updated when the scan signal in the second scan line G2(j) is brought to be High. Thus, the display update order accords with the timing chart in FIG. 6A.

An example in which the output signal SR(1) from the shift register circuit 111 in FIG. 1 is High is described below. When the selection signal MD_L is High, the scan signal supplied to the first scan line G1(1) by the selection circuit 20 is High. The displayed content is updated by grayscale signals supplied to the pixel circuits 750C(1, 1) to 750C(m, 1).

When the selection signal MD_E is High in a period when the output signal SR(1) is High, the scan signal supplied to the second scan line G2(1) by the selection circuit 20 is High. The displayed content is updated by grayscale signals supplied to the pixel circuits 650C(1, 1) to 650C(m, 1).

In FIG. 6A, unlike in FIG. 5A, the selection signal MD_L and the selection signal MD_E are High at the same time while the output signal SR(1) is High. In FIG. 6B, the display in the liquid crystal display region 121 and the display in the light-emitting display region 122 are updated at the same time because the selection signal MD_L and the selection signal MD_E are High at the same time.

In FIG. 5A, the grayscale signal to the pixel circuit 750C(i, j) and the grayscale signal to the pixel circuit 650C(i, j) are updated at different times in the pixel circuit 710C(i, j). While in FIG. 6A, the scan signal in the first scan line G1(j) and the scan signal in the second scan line G2(j) are High at the same time as the output signal SR(j) from the shift register circuit 111, to update the grayscale signals to the pixel circuit 750C(i, j) and the pixel circuit 650C(i, j). The writing period can be longer in FIG. 6A than in FIG. 5A.

The selection of the first scan line G1(j) which is electrically connected to the gate of the transistor SW1 included in the pixel circuit 750C(i, j) or the second scan line G2(j) which is electrically connected to the gate of the transistor SW2 included in the pixel circuit 650C(i, j) can be controlled by the gate driver including the shift register circuit 111 and the selection circuit 20.

The structures, methods, driving timing described in this embodiment can be combined as appropriate with any of those described in the other embodiments.

Embodiment 2

In this embodiment, a method for separately controlling odd-numbered rows and even-numbered rows of the gate driver in a high-definition display device including the pixel circuits 710C will be described with reference to FIG. 7, FIGS. 8A and 8B, and FIGS. 9A and 9B.

Figure 7:
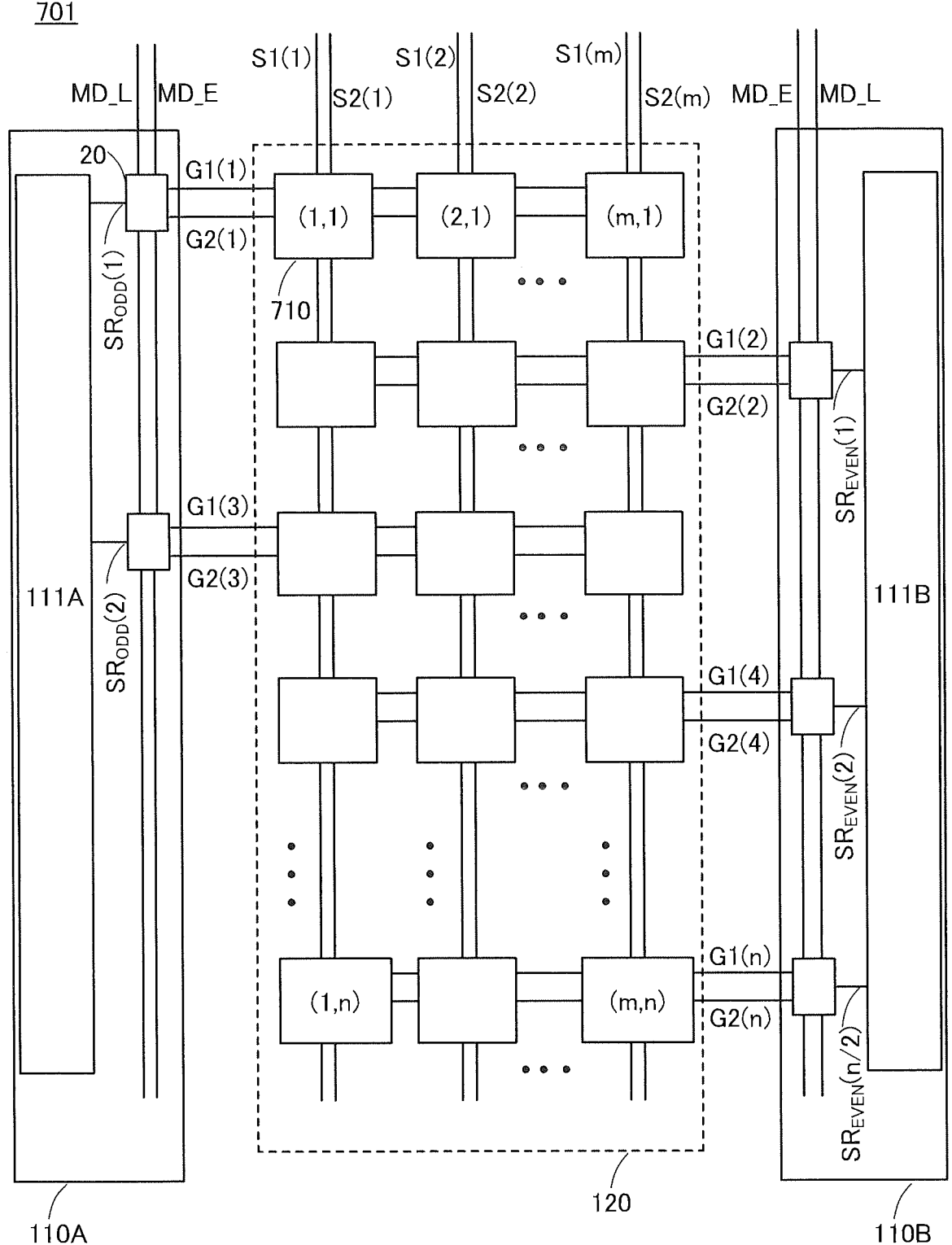
FIG. 7 illustrates a structure of a display device.

FIG. 7 is a block diagram illustrating a structure of a display device 701. FIG. 7 is different from FIG. 1 in that the gate driver 110 is divided into a gate driver 110A which controls the scan lines in the odd-numbered rows and a gate driver 110B which controls the scan lines in the even-numbered rows.

In the display device 701 illustrated in FIG. 7, the shift register circuit 111A and the shift register circuit 111B included in the gate driver 110A and the gate driver 110B generate an output signal $SR_{ODD}$ and an output signal $SR_{EVEN}$ with different timings from those of the output signals SR output from the shift register circuit 111 included in the gate driver 110 illustrated in FIG. 1.

The structure of the gate driver is divided into a part for controlling odd-numbered rows and a part for controlling even-numbered rows in the display device 701 in FIG. 7. This reduces the number of stages in one gate driver and the circuit area to half. In this case, the size of the buffer circuit 26 in the selection circuit 20 which drives the scan signals in the first scan lines G1 and the second scan lines G2 can be increased, so that the current supply capability can be improved.

Figure 8A:
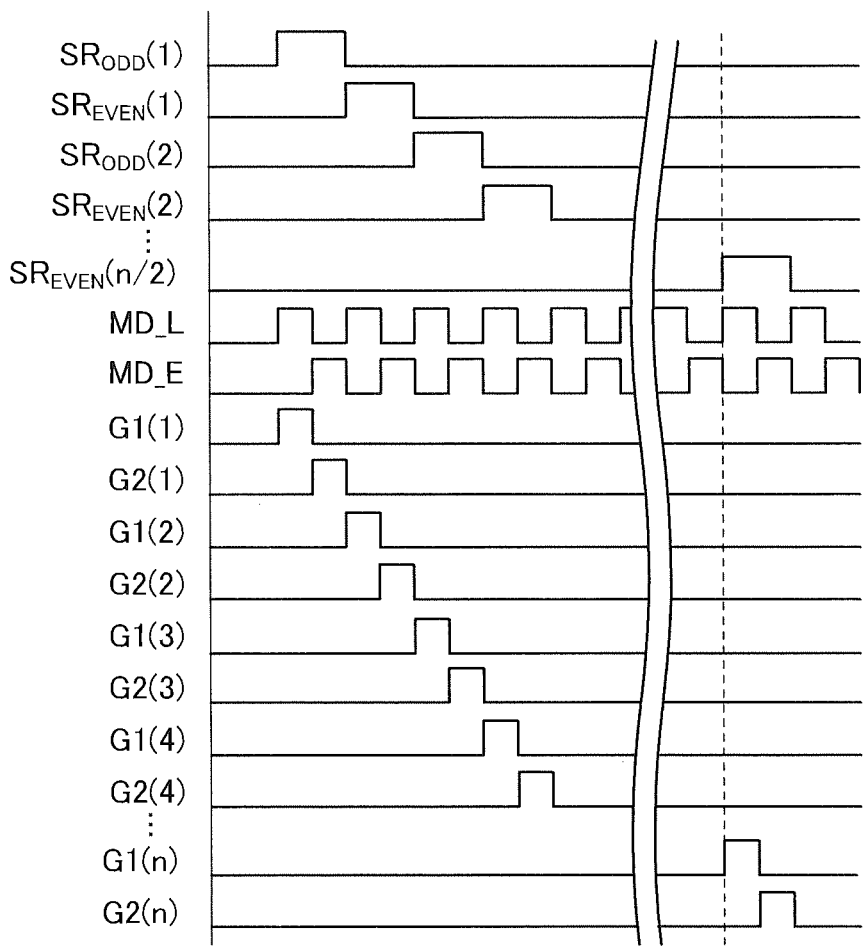
FIG. 8A is a timing chart of the display device illustrated in FIG. 7.

FIG. 8A shows a timing chart of an operation of the display device 701 in FIG. 7. In the timing chart in FIG. 8A, the selection signal MD_L and the selection signal MD_E are input in a manner similar to that shown in the timing chart in FIG. 5A. Accordingly, voltages are supplied to the first scan lines G1(1) to G1(n) and the second scan lines G2(1) to G2(n) with the same timings as those shown in the timing chart in FIG. 5A.

Figure 8B:
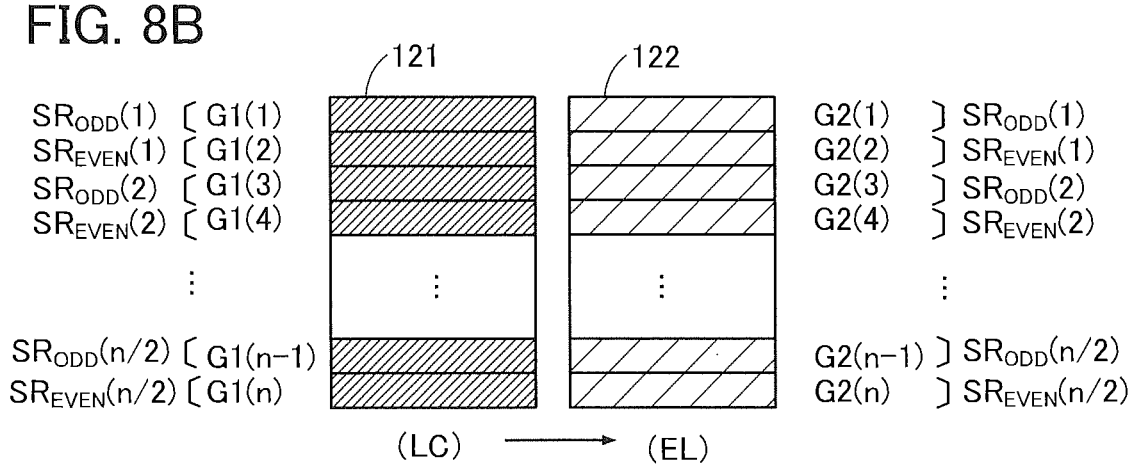
FIG. 8B is a drawing for explaining an operation.

FIG. 8B schematically shows a driving state of the display portion 120. In FIG. 7, unlike in FIG. 5B, the displayed content in the liquid crystal display region 121 is updated when the scan signals in the first scan lines G1(1) to G1(n) are brought to be High by the output signals $SR_{ODD}(1)$ to $SR_{ODD}(n/2)$ from the shift register circuit 111A, the output signals $SR_{EVEN}(1)$ to $SR_{EVEN}(n/2)$ from the shift register circuit 111B, the selection signal MD_L, and the selection signal MD_E. Furthermore, the displayed content in the light-emitting display region 122 is updated when the scan signals in the second scan lines G2(1) to G2(n) are brought to be High. Thus, the display update order accords with the timing chart in FIG. 8A.

An example in which the output signal $SR_{ODD}(1)$ from the shift register circuit 111A in FIG. 7 is High is described below. When the selection signal MD_L is High, the scan signal supplied to the first scan line G1(1) by the selection circuit 20 is High. The displayed content is updated by grayscale signals supplied to the pixel circuits 750C(1, 1) to 750C(m, 1).

When the output signal $SR_{ODD}(1)$ from the shift register circuit 111A is High and the selection signal MD_E is High, the scan signal supplied to the second scan line G2(1) by the selection circuit 20 is High. The displayed content is updated by grayscale signals supplied to the pixel circuits 650C(1, 1) to 650C(m, 1).

In FIG. 8A, while the output signal $SR_{ODD}(1)$ from the shift register circuit 111A is High, the selection signal MD_L first becomes High, and then the selection signal MD_E becomes High. In FIG. 8B, the display in the liquid crystal display region 121 is first updated when the selection signal MD_L is High. Then, the display in the light-emitting display region 122 is updated when the selection signal MD_E is High.

Figure 9A:
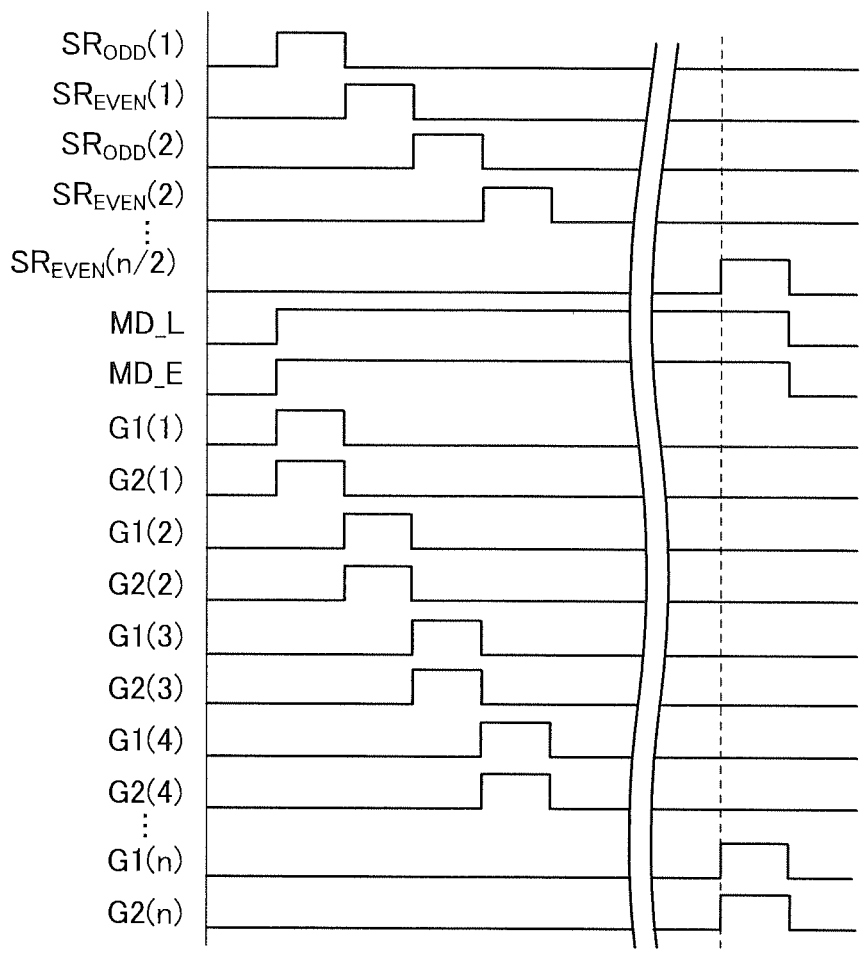
FIG. 9A is a timing chart of the display device illustrated in FIG. 7.

FIG. 9A shows a timing chart of an operation of the display device 701 in FIG. 7. In the timing chart in FIG. 9A, the selection signal MD_L and the selection signal MD_E are input in a manner similar to that shown in the timing chart in FIG. 6A. Accordingly, voltages are supplied to the first scan lines G1(1) to G1(n) and the second scan lines G2(1) to G2(n) with the same timings as those shown in the timing chart in FIG. 6A.

Figure 9B:
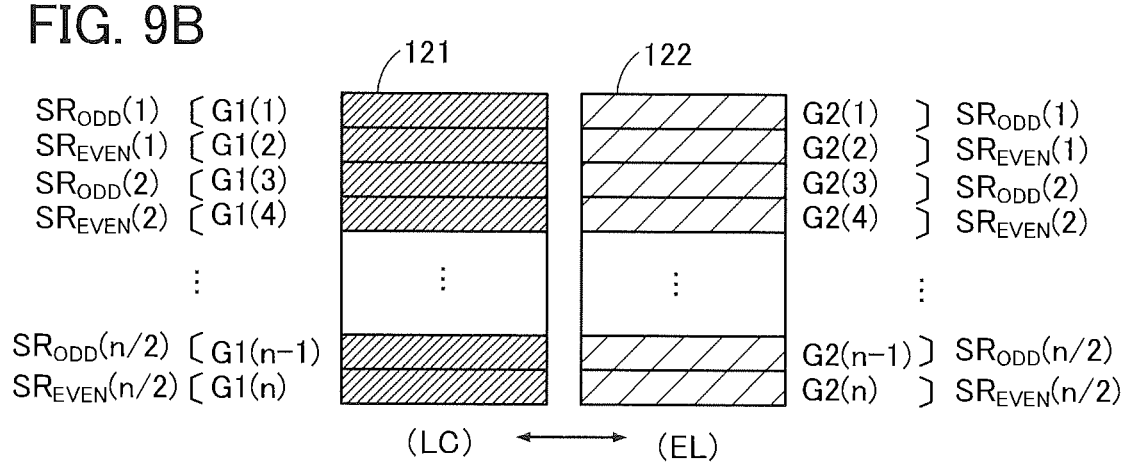
FIG. 9B is a drawing for explaining an operation.

FIG. 9B schematically shows a driving state of the display portion 120. In FIG. 7, the displayed content in the liquid crystal display region 121 is updated when the scan signals in the first scan lines G1(1) to G1(n) are brought to be High by the output signals $SR_{ODD}(1)$ to $SR_{ODD}(n/2)$ from the shift register circuit 111A, the output signals $SR_{EVEN}(1)$ to $SR_{EVEN}(n/2)$ from the shift register circuit 111B, the selection signal MD_L, and the selection signal MD_E. Furthermore, the displayed content in the light-emitting display region 122 is updated when the scan signals in the second scan lines G2(1) to G2(n) are brought to be High. Thus, the display update order accords with the timing chart in FIG. 9A.

An example in which the output signal $SR_{ODD}(1)$ from the shift register circuit 111A included in the gate driver 110A in FIG. 7 is High is described below. When the selection signal MD_L is High, the scan signal supplied to the first scan line G1(1) by the selection circuit 20 is High. The displayed content is updated by grayscale signals supplied to the pixel circuits 750C(1, 1) to 750C(m, 1).

When the selection signal MD_E is High in a period when the output signal $SR_{ODD}(1)$ from the shift register circuit 111A is High, the scan signal supplied to the second scan line G2(1) by the selection circuit 20 is High. The displayed content is updated by grayscale signals supplied to the pixel circuits 650C(1, 1) to 650C(m, 1).

In FIG. 9A, unlike in FIG. 8A, the selection signal MD_L and the selection signal MD_E are High at the same time while the output signal $SR_{ODD}(1)$ from the shift register circuit 111A is High. In FIG. 9B, the display in the liquid crystal display region 121 and the display in the light-emitting display region 122 are updated at the same time because the selection signal MD_L and the selection signal MD_E are High at the same time.

The selection of the first scan line G1(j) which is electrically connected to the gate of the transistor SW1 included in the pixel circuit 750C(i, j) or the second scan line G2(j) which is electrically connected to the gate of the transistor SW2 included in the pixel circuit 650C(i, j) can be controlled by the gate driver including the shift register circuit 111A or 111B and the selection circuit 20.

The display device 701 in FIG. 7 where the gate driver is divided into the gate driver 110A for controlling the odd-numbered rows and the gate driver 110B for controlling the even-numbered rows can be operated with the same timing as that of the display device 700 in FIG. 1 by controlling the selection signal MD_L and the selection signal MD_E. By improving the current supply capability, the high-definition display device including the pixel circuits 710C can be driven.

The structures, methods, driving timing described in this embodiment can be combined as appropriate with any of those described in the other embodiments.

Embodiment 3

In this embodiment, a gate driver driving method in which the liquid crystal display region 121 and the light-emitting display region 122 in a high-definition display device are controlled with different update frequencies will be described with reference to FIG. 10, FIGS. 11A and 11B, FIGS. 12A and 12B, FIGS. 13A and 13B, and FIGS. 14A to 14D.

Figure 10:
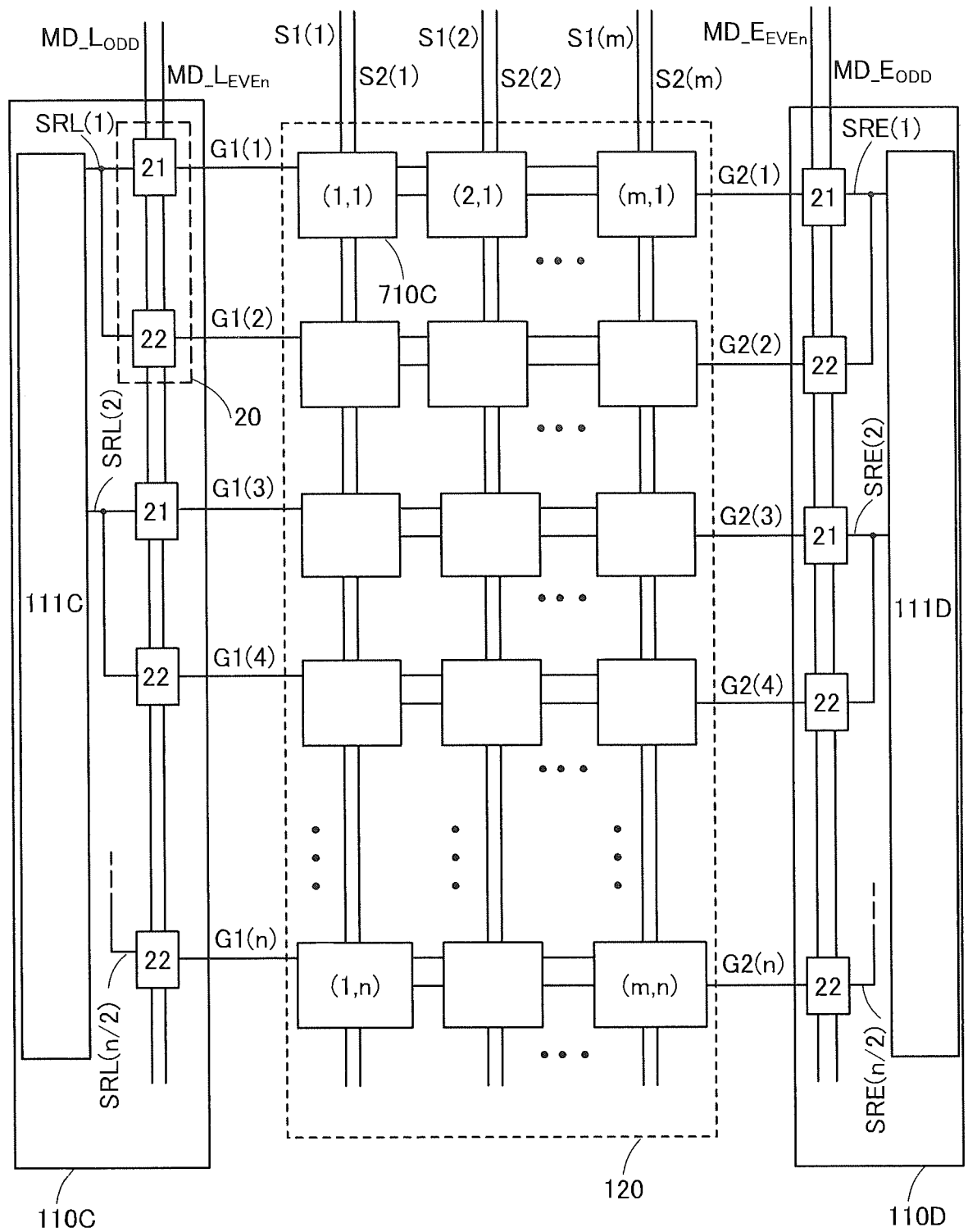
FIG. 10 illustrates a structure of a display device.

FIG. 10 is a block diagram illustrating a structure of a display device 702. FIG. 10 is different from FIG. 1 in that the gate driver 110 is divided into a gate driver 110C which controls the scan lines connected to the liquid crystal display region 121 and a gate driver 110D which controls the scan lines connected to the light-emitting display region 122. Furthermore, output signals from the selection circuit 20 are output to a scan line in an odd-numbered row and a scan line in an even-numbered row.

In the display device 702 illustrated in FIG. 10, the gate driver 110C can independently control the scan lines connected to the liquid crystal display region 121 in a selective manner, and the gate driver 110D can independently control the scan lines connected to the light-emitting display region 122 in a selective manner.

Figure 11A:
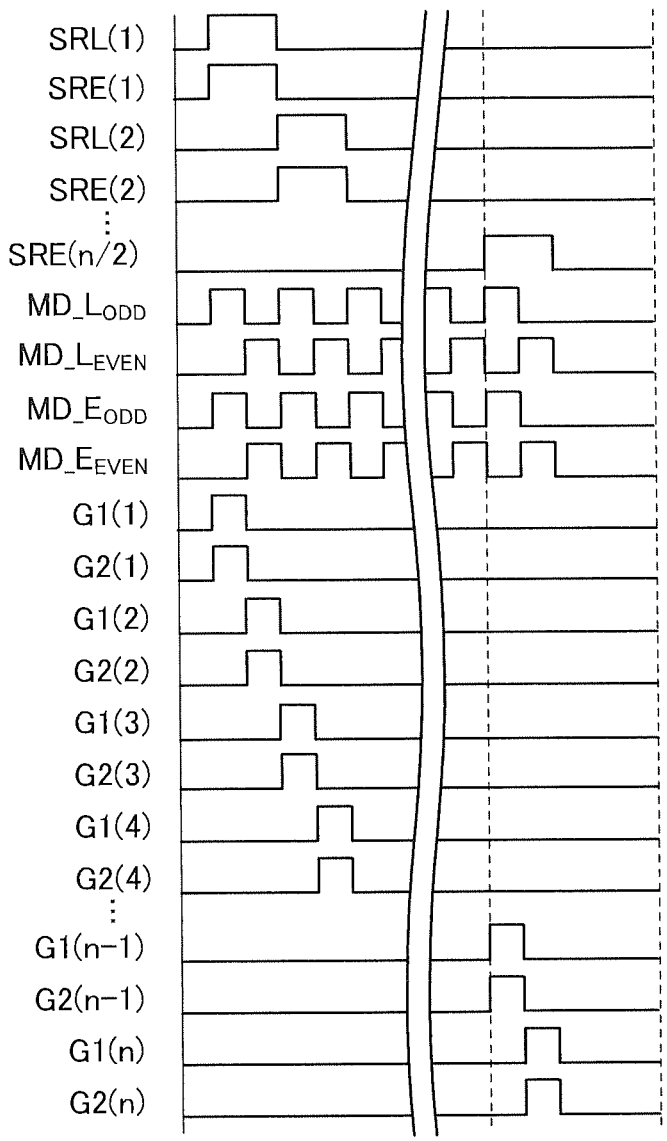
FIG. 11A is a timing chart of the display device illustrated in FIG. 10.

FIG. 11A is a timing chart of an operation of the display device 702 in FIG. 10. As an example, an operation in the timing chart in a period when an output signal SRL(1) from a shift register circuit 111C included in the gate driver 110C and an output signal SRE(1) from a shift register circuit 111D included in the gate driver 110D are High is described below.

When a selection signal $MD\_L_{ODD}$ is High in a period when the output signal SRL(1) from the shift register circuit 111C is High, the scan signal in the first scan line G1(1) is brought to be High, so that grayscale signals can be written into the pixel circuits 750C(i, 1) through the first signal lines S1(1) to S1(m).

When a selection signal $MD\_L_{EVEN}$ is High in a period when the output signal SRL(1) from the shift register circuit 111C is High, the scan signal in the first scan line G1(2) is brought to be High, so that grayscale signals can be written into the pixel circuits 750C(i, 2) through the first signal lines S1(1) to S1(m).

When a selection signal $MD\_E_{ODD}$ is High in a period when the output signal SRE(1) from the shift register circuit 111D is High, the scan signal in the second scan line G2(1) is brought to be High, so that grayscale signals can be written into the pixel circuits 650C(i, 1) through the second signal lines S2(1) to S2(m).

When a selection signal $MD\_E_{EVEN}$ is High in a period when the output signal SRE(1) from the shift register circuit 111D is High, the scan signal in the second scan line G2(2) is brought to be High, so that grayscale signals can be written into the pixel circuits 650C(i, 2) through the second signal lines S2(1) to S2(m).

Figure 11B:
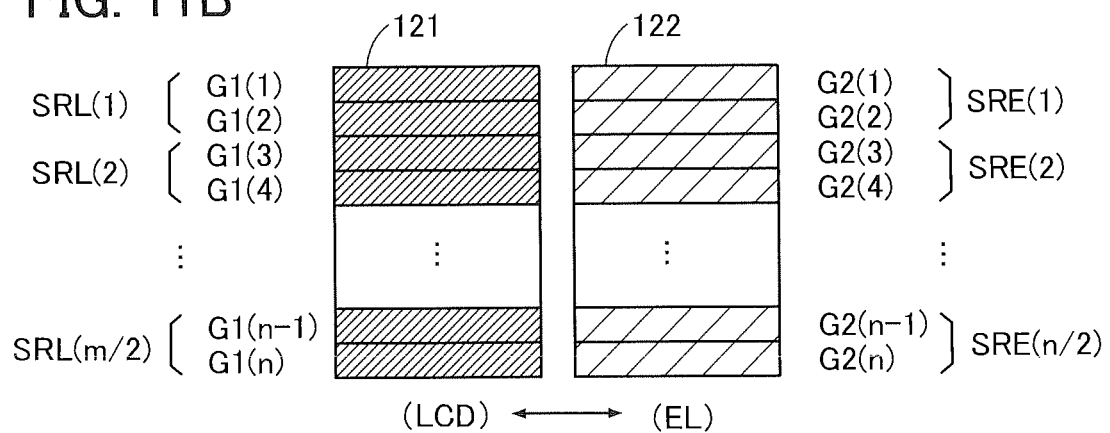
FIG. 11B is a drawing for explaining an operation.

FIG. 11B schematically shows a driving state of the liquid crystal display region 121 and the light-emitting display region 122. The order of updating the displayed content in the liquid crystal display region 121 and the light-emitting display region 122 by output signals SRL(1) to SRL(n/2) from the shift register circuit 111C, the selection signals $MD\_L_{ODD}$ and $MD\_E_{EVEN}$, output signals SRE(1) to SRE(n/2) from the shift register circuit 111D, and the selection signals $MD\_E_{ODD}$ and $MD\_E_{EVEN}$ is shown in FIG. 11B.

FIG. 11B schematically shows a driving state of the display portion 120. The displayed content in the liquid crystal display region 121 is updated when the scan signals in the first scan lines G1(1) to G1(n) which are output by the output signals SRL(1) to SRL(n/2) from the shift register circuit 111C, the selection signal $MD\_L_{ODD}$, and the selection signal $MD\_L_{EVEN}$ are High. The displayed content in the light-emitting display region 122 is updated when the scan signals in the second scan lines G2(1) to G2(n) which are output by the output signals SRE(1) to SRE(n/2) from the shift register circuit 111D, the selection signal $MD\_E_{ODD}$, and the selection signal $MD\_E_{EVEN}$ are High. Thus, the display update order accords with the timing chart in FIG. 11A.

An example in which the output signal SRL(1) from the shift register circuit 111C in FIG. 10 is High is described. When the selection signal $MD\_L_{ODD}$ is High, the scan signal in the first scan line G1(1) is brought to be High by the selection circuit 20, which means that the displayed content in the pixel circuits 750C(1, 1) to 750C(m, 1) is updated by grayscale signals. Moreover, when the selection signal $MD\_L_{EVEN}$ is High, the scan signal in the first scan line G1(2) is brought to be High by the selection circuit 20, which means that the displayed content in the pixel circuits 750C(1, 2) to 750C(m, 2) is updated by grayscale signals.

Similarly, a case where the output signal SRE(1) from the shift register circuit 111D is High is described. When the selection signal $MD\_E_{ODD}$ is High, the scan signal in the first scan line G2(1) is brought to be High by the selection circuit 20, which means that the displayed content in the pixel circuits 650C(1, 1) to 650C(m, 1) is updated by grayscale signals. Moreover, when the selection signal $MD\_E_{EVEN}$ is High, the scan signal in the first scan line G2(2) is brought to be High by the selection circuit 20, which means that the displayed content in the pixel circuits 650C(1, 2) to 650C(m, 2) is updated by grayscale signals.

In FIG. 11A, the selection signals $MD\_L_{ODD}$ and $MD\_E_{ODD}$ are High at the same time while the output signal SRL(1) from the shift register circuit 111C and the output signal SRE(1) from the shift register circuit 111D are High in FIG. 10. In FIG. 11B, the display in the liquid crystal display region 121 and the display in the light-emitting display region 122 are updated at the same time because the selection signals $MD\_L_{ODD}$ and $MD\_E_{ODD}$ are High at the same time.

The gate driver in the display device 702 is divided in order to independently control the liquid crystal display region 121 and the light-emitting display region 122.

In addition, the liquid crystal display region 121 in an odd-numbered row and an adjacent even-numbered row is controlled by one selection circuit 20, and the light-emitting display region 122 in an odd-numbered row and an adjacent even-numbered row is controlled by another selection circuit 20. Furthermore, the scan lines connected to the pixel circuit 750C(i, j) and the pixel circuit 650C(i, j) can be selectively controlled by controlling driving timings of the selection signals $MD\_L_{ODD}$ and $MD\_L_{EVEN}$ and the selection signals $MD\_E_{ODD}$ and $MD\_E_{EVEN}$.

Figure 12A:
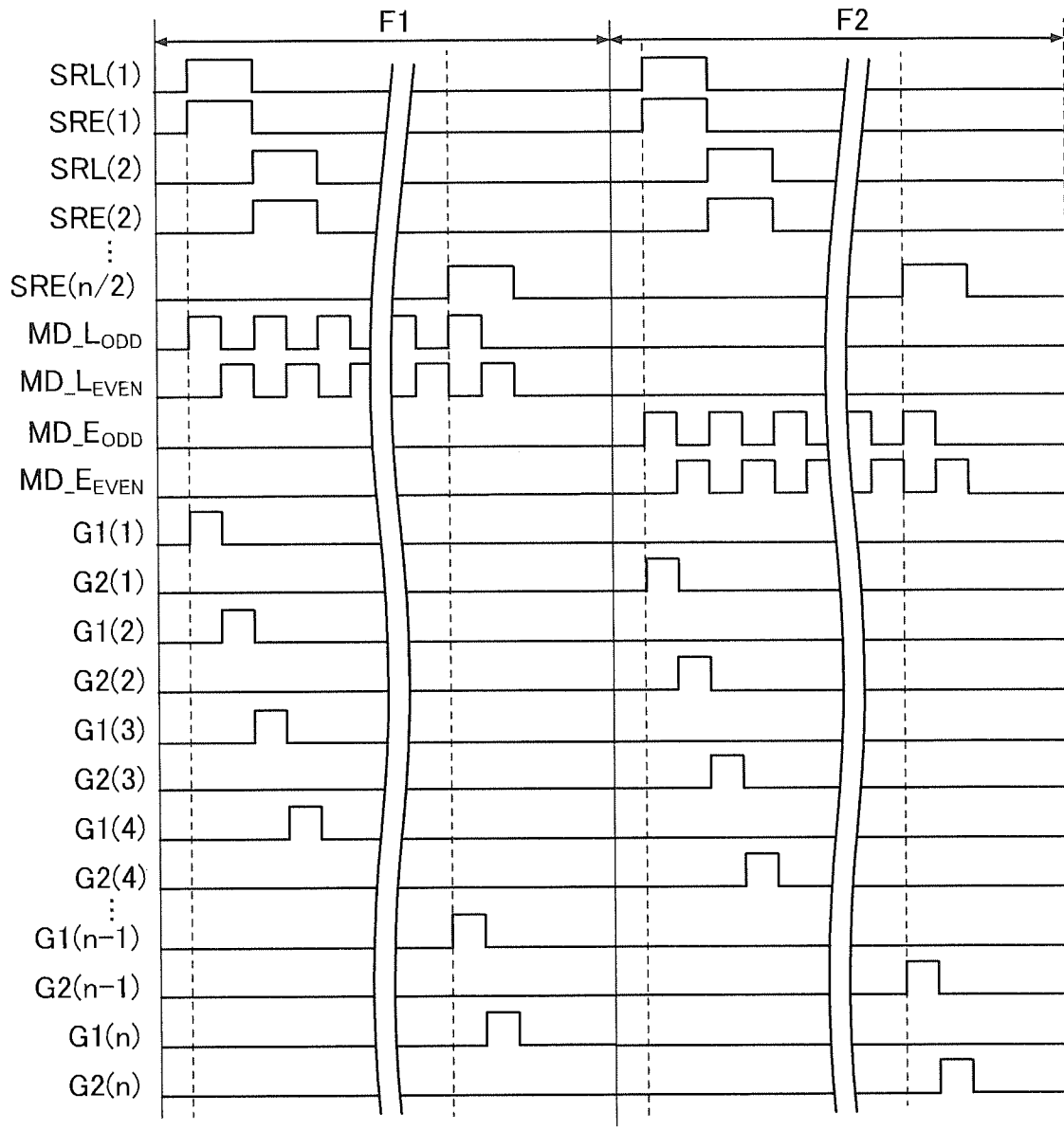
FIG. 12A is a timing chart of the display device illustrated in FIG. 10.

FIG. 12A shows a timing chart of an operation of the display device 702 in FIG. 10, which is different from that in FIG. 11A. In this operation example, the display in the liquid crystal display region 121 and the display in the light-emitting display region 122 are updated with different timings; in other words, the update frequency of the display in the liquid crystal display region 121 is different from that of the display in the light-emitting display region 122. The operation is described using a first frame F1 and a second frame F2. The operation in the timing chart in a period when the output signal SRL(1) from the shift register circuit 111C and the output signal SRE(1) from the shift register circuit 111D are High is described below.

For example, the gate driver 110C and the gate driver 110D operate with the same timing in the first frame F1;

thus, the output signals SRL(1) and SRE(1) are output from the shift register circuits 111C and 111D, respectively, with the same timing.

In a period when the output signal SRL(1) from the shift register circuit 111C and the selection signal MD_L$_{ODD}$ are High, the scan signal output to the first scan line G1(1) by the determination circuit 21 is High. When the scan signal in the first scan line G1(1) is High, grayscale signals supplied to the pixel circuits 750C(i, 1) including the first display elements 750(i, 1) are updated.

In a period when the output signal SRL(1) from the shift register circuit 111C and the selection signal MD_L$_{EVEN}$ are High, the scan signal output to the first scan line G1(2) by the determination circuit 22 is High. When the scan signal in the first scan line G1(2) is High, grayscale signals supplied to the pixel circuits 750C(i, 2) are updated.

In a period when the selection signal MD_E$_{ODD}$ is Low, the scan signal output to the second scan line G2(1) by the determination circuit 21 is Low regardless of the state of the output signal SRE(1). In a period when the selection signal MD_E$_{EVEN}$ is Low, the scan signal output to the second scan line G2(1) by the determination circuit 21 is Low regardless of the state of the output signal SRE(1).

For example, the gate driver 110C and the gate driver 110D operate with the same timing in the second frame F2; thus, the output signals SRL(1) and SRE(1) are output from the shift register circuit 111C and the shift register circuit 111D, respectively, with the same timing.

In a period when the output signal SRE(1) from the shift register circuit 111D and the selection signal MD_E$_{ODD}$ are High, the scan signal output to the second scan line G2(1) by the determination circuit 21 is High. When the scan signal in the second scan line G2(1) is High, grayscale signals supplied to the pixel circuits 650C(i, 1) are updated.

In a period when the output signal SRE(1) from the shift register circuit 111D and the selection signal MD_E$_{EVEN}$ are High, the scan signal output to the second scan line G2(2) by the determination circuit 22 is High. When the scan signal in the second scan line G2(2) is High, grayscale signals supplied to the pixel circuits 650C(i, 2) including the second display elements 650(i, 2) are updated.

In a period when the selection signal MD_L$_{ODD}$ is Low, the scan signal output to the first scan line G1(1) by the determination circuit 21 is Low regardless of the state of the output signal SRL(1). In a period when the selection signal MD_L$_{EVEN}$ is Low, the scan signal output to the first scan line G1(1) by the determination circuit 21 is Low regardless of the state of the output signal SRL(1).

Figure 12B:
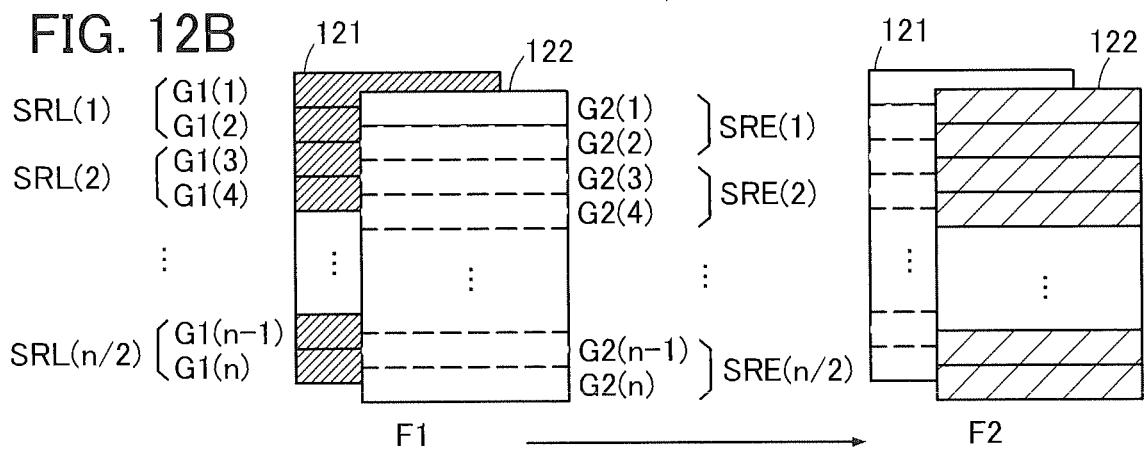
FIG. 12B is a drawing for explaining an operation.

FIG. 12B schematically shows a driving state of the liquid crystal display region 121 and the light-emitting display region 122 when they are driven with the timings of the first frame F1 and the second frame F2.

In the first frame F1, the displayed content is updated in the liquid crystal display region 121 but not updated in the light-emitting display region 122. In the second frame F2, the displayed content is not updated in the liquid crystal display region 121 but updated in the light-emitting display region 122.

FIG. 12B schematically shows a driving state of the display portion 120. The displayed content in the liquid crystal display region 121 is updated when the scan signals in the first scan lines G1(1) to G1(n) are brought to be High by the output signals SRL(1) to SRL(n/2) from the shift register circuit 111C and the selection signals MD_L$_{ODD}$ and MD_L$_{EVEN}$. Furthermore, the displayed content in the light-emitting display region 122 is updated when the scan signals in the second scan lines G2(1) to G2(n) are brought to be High by the output signals SRE(1) to SRE(n/2) from the shift register circuit 111D and the selection signals MD_E$_{ODD}$ and MD_E$_{EVEN}$. Thus, the display update order accords with the timing chart in FIG. 12A.

In the first frame F1, the displayed content is updated in the liquid crystal display region 121 but not updated in the light-emitting display region 122.

As an example, a case where the output signal SRL(1) from the shift register circuit 111C is High is described. When the selection signal MD_L$_{ODD}$ is High, the scan signal in the first scan line G1(1) is brought to be High by the selection circuit 20, which means that the displayed content in the pixel circuits 750C(1, 1) to 750C(m, 1) is updated by grayscale signals. Moreover, when the selection signal MD_L$_{EVEN}$ is High, the scan signal in the first scan line G1(2) is brought to be High by the selection circuit 20, which means that the displayed content in the pixel circuits 750C(1, 2) to 750C(m, 2) is updated by grayscale signals.

Similarly, a case where the output signal SRE(1) from the shift register circuit 111D is High is described. When the selection signal MD_E$_{ODD}$ is Low, the scan signal in the second scan line G2(1) is brought to be Low by the selection circuit 20, which means that the displayed content in the pixel circuits 650C(1, 1) to 650C(m, 1) is not updated. Moreover, when the selection signal MD_E$_{EVEN}$ is Low, the scan signal in the second scan line G2(2) is brought to be Low by the selection circuit 20, which means that the displayed content in the pixel circuits 650C(1, 2) to 650C(m, 2) is not updated.

In the second frame F2, the displayed content is not updated in the liquid crystal display region 121 but updated in the light-emitting display region 122.

As an example, a case where the output signal SRL(1) from the shift register circuit 111C is High is described. When the selection signal MD_L$_{ODD}$ is Low, the scan signal in the first scan line G1(1) is brought to be Low by the selection circuit 20, which means that the displayed content in the pixel circuits 750C(1, 1) to 750C(m, 1) is not updated. Moreover, when the selection signal MD_L$_{EVEN}$ is Low, the scan signal in the first scan line G1(2) is brought to be Low by the selection circuit 20, which means that the displayed content in the pixel circuits 750C(1, 2) to 750C(m, 2) is not updated.

Similarly, a case where the output signal SRE(1) from the shift register circuit 111D in FIG. 10 is High is described. When the selection signal MD_E$_{ODD}$ is High, the scan signal in the second scan line G2(1) is brought to be High by the selection circuit 20, which means that the displayed content in the pixel circuits 650C(1, 1) to 650C(m, 1) is updated by grayscale signals. Moreover, when the selection signal MD_E$_{EVEN}$ is High, the scan signal in the second scan line G2(2) is brought to be High by the selection circuit 20, which means that the displayed content in the pixel circuits 650C(1, 2) to 650C(m, 2) is updated by grayscale signals.

In the first frame F1 illustrated in FIG. 12A, when the selection signal MD_L$_{ODD}$ or MD_L$_{EVEN}$ is High in a period when the output signal SRL(1) or SRL(2) from the shift register circuit 111C is High, the display is updated in the liquid crystal display region 121. In the second frame F2, when the selection signal MD_E$_{ODD}$ or MD_E$_{EVEN}$ is High in a period when the output signal SRE(1) or SRE(2) from the shift register circuit 111D is High, the display is updated in the light-emitting display region 122.

Although the liquid crystal display region 121 or the light-emitting display region 122 is stopped on the frame basis by selectively controlling the scan lines with the selection signals in the example illustrated in FIG. 12A, the same effect can be obtained by stopping the shift register circuits on the frame basis.

Moreover, in the case where a still image is reproduced by the pixel circuit 750C(i, j) and a moving image is reproduced by the pixel circuit 650C(i, j), optimum driving suited for the displayed content can be selected, for example, in such a manner that the update frequency of the displayed content for a still image is set lower than that of the displayed content for a moving image.

Furthermore, the power consumption of the high-definition display portion 120 including the pixel circuit 750C(i, j) and the pixel circuit 650C(i, j) can be reduced by the optimum driving.

Although the even-numbered rows and the odd-numbered rows can be selectively controlled by the selection circuits 20 in one embodiment of the present invention, the number of rows that can be selected by one selection circuit may be an integer of 2 or more.

Figure 13A:
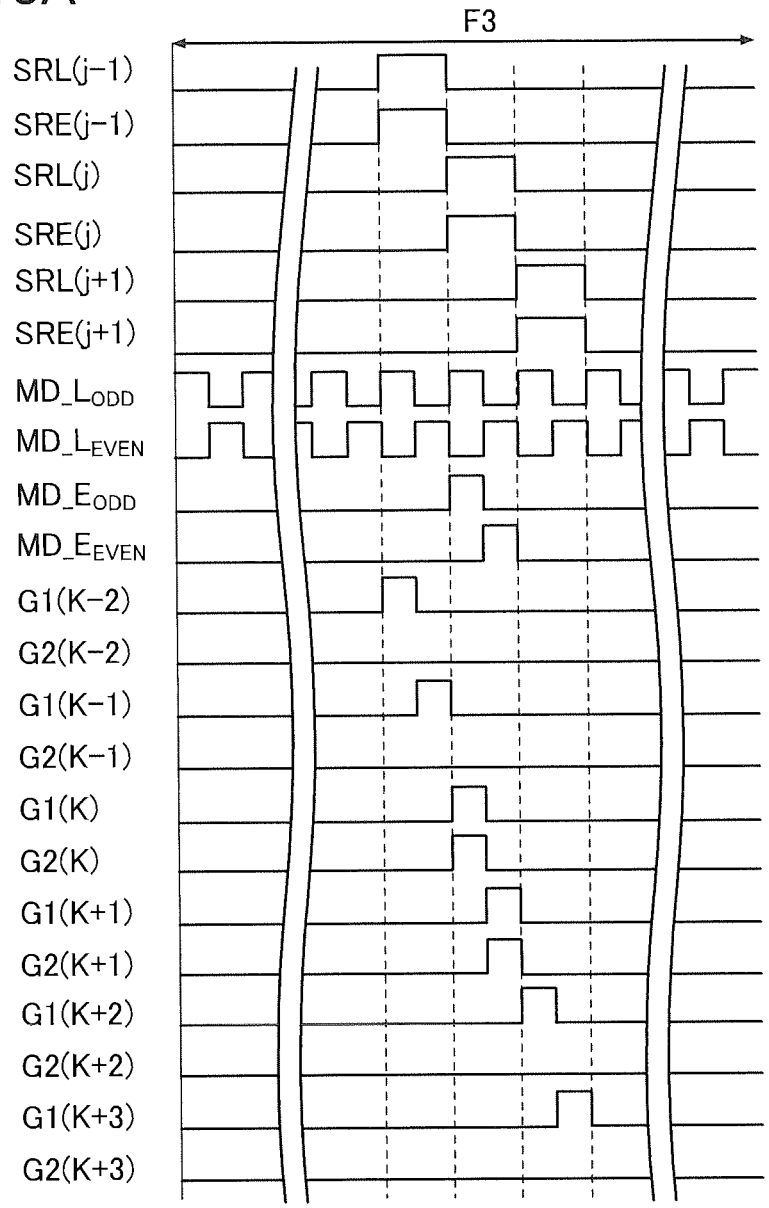
FIG. 13A is a timing chart of the display device illustrated in FIG. 10.

FIG. 13A is a timing chart of an operation of the display device 702 illustrated in FIG. 10, which is different from that in FIG. 12A. Described here is an example of a display device which includes a first display region and a second display region and in which the update frequency of the display of a display element included in the first display region is different from that of the display of a display element included in the second display region. Specifically, in the example described below, the display is sequentially updated on an entire surface of one of the liquid crystal display region 121 and the light-emitting display region 122, while the display is updated partly in the other thereof. Description is given using a third frame F3 as an example. An operation of the (j−1)-th row, the j-th row, and the (j+1)-th row in the shift register circuit 111C and the shift register circuit 111D is shown in the timing chart.

As an example, an operation in the timing chart in a period when the output signals SRL(j−1), SRL(j), and SRL(j+1) from the shift register circuit 111C and the output signals SRE(j−1), SRE(j), and SRE(j+1) from the shift register circuit 111D are High is described below.

The gate driver 110C and the gate driver 110D operate with the same timing in the third frame F3; thus, the output signals SRL(j) and SRE(j) are output from the shift register circuits 111C and 111D, respectively, with the same timing.

An operation of the case where the output signal SRL(j−1) from the shift register circuit 111C in FIG. 10 is supplied to the selection circuit 20 is described. When the selection signal MD_L$_{ODD}$ is High, the scan signal in the first scan line G1(K−2) is brought to be High by the selection circuit 20, which means that the displayed content in the pixel circuits 750C(1, K−2) to 750C(m, K−2) is updated by grayscale signals. Moreover, when the selection signal MD_L$_{EVEN}$ is High, the scan signal in the first scan line G1 (K−1) is brought to be High by the selection circuit 20, which means that the displayed content in the pixel circuits 750C(1, K−1) to 750C(m, K−1) is updated by grayscale signals.

An operation of the case where the output signal SRE(j−1) from the shift register circuit 111D in FIG. 10 is supplied to the selection circuit 20 is described. When the selection signal MD_E$_{ODD}$ is Low, the scan signals in the second scan lines G2(K−2) and G2(K−1) are brought to be Low by the selection circuit 20, which means that the displayed content in the pixel circuits 650C(1, K−2) to 650C(m, K−2) is not updated and that the displayed content in the pixel circuits 650C(1, K−1) to 650C(m, K−1) is not updated.

An operation of the case where the output signal SRL(j) from the shift register circuit 111C in FIG. 10 is supplied to the selection circuit 20 is described. When the selection signal MD_L$_{ODD}$ is High, the scan signal in the first scan line G1(K) is brought to be High by the selection circuit 20, which means that the displayed content in the pixel circuits 750C(1, K) to 750C(m, K) is updated by grayscale signals. Moreover, when the selection signal MD_L$_{EVEN}$ is High, the scan signal in the first scan line G1(K+1) is brought to be High by the selection circuit 20, which means that the displayed content in the pixel circuits 750C(1, K+1) to 750C(m, K+1) is updated by grayscale signals.

An operation of the case where the output signal SRE(j) from the shift register circuit 111D in FIG. 10 is supplied to the selection circuit 20 is described. When the selection signal MD_E$_{ODD}$ is High, the scan signal in the second scan line G2(K) is brought to be High by the selection circuit 20, which means that the displayed content in the pixel circuits 650C(1, K) to 650C(m, K) is updated by grayscale signals. Moreover, when the selection signal MD_E$_{ODD}$ is High, the scan signal in the second scan line G2(K+1) is brought to be High by the selection circuit 20, which means that the displayed content in the pixel circuits 650C(1, K+1) to 650C(m, K+1) is updated by grayscale signals.

An operation of the case where the output signal SRL(j+1) from the shift register circuit 111C in FIG. 10 is supplied to the selection circuit 20 is described. When the selection signal MD_L$_{ODD}$ is High, the scan signal in the first scan line G1(K+2) is brought to be High by the selection circuit 20, which means that the displayed content in the pixel circuits 750C(1, K+2) to 750C(m, K+2) is updated by grayscale signals. Moreover, when the selection signal MD_L$_{EVEN}$ is High, the scan signal in the first scan line G1(K+3) is brought to be High by the selection circuit 20, which means that the displayed content in the pixel circuits 750C(1, K+3) to 750C(m, K+3) is updated by grayscale signals.

An operation of the case where the output signal SRE(j+1) from the shift register circuit 111D in FIG. 10 is supplied to the selection circuit 20 is described. When the selection signal MD_E$_{ODD}$ is Low, the scan signals in the second scan lines G2(K+2) and G2(K+1) are brought to be Low by the selection circuit 20, which means that the displayed content in the pixel circuits 650C(1, K+2) to 650C(m, K+2) is not updated and that the displayed content in the pixel circuits 650C(1, K+3) to 650C(m, K+3) is not updated.

In the third frame F3, the displayed content is sequentially updated in the liquid crystal display region 121, but the displayed content only for the output signal SRE(j) is updated in the light-emitting display region 122.

Figure 13B:
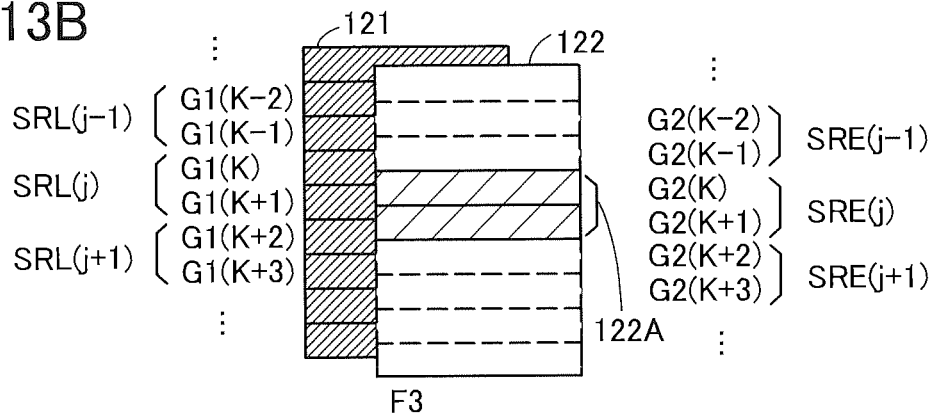
FIG. 13B is a drawing for explaining an operation.

FIG. 13B schematically shows a driving state of the display portion 120. The displayed content in the liquid crystal display region 121 is updated when the scan signals in the first scan lines G1(1) to G1(n) are brought to be High by the output signals SRL(1) to SRL(n/2) from the shift register circuit 111C and the selection signals MD_L$_{ODD}$ and MD_L$_{EVEN}$. Furthermore, the displayed content in the light-emitting display region 122 is updated when the scan signals in the second scan lines G2(1) to G2(n) are brought to be High by the output signals SRE(1) to SRE(n/2) from the shift register circuit 111D and the selection signals MD_E$_{ODD}$ and MD_E$_{EVEN}$. Thus, the display update order accords with the timing chart in FIG. 13A.

In FIG. 13B, the displayed content only in a particular display region can be updated by the selection signals.

For example, the entire liquid crystal display region 121 can display a still image by the pixel circuit 750C(i, j) and only a particular light-emitting display region 122A can reproduce a moving image by the pixel circuit 650C(i, j). Optimum driving suited for the displayed content can be selected, for example, in such a manner that the update frequency of the displayed content for a still image is set lower than that of the displayed content for a moving image.

Optimizing the update frequency of the displayed content by optimum driving of the high-definition display portion 120 including the pixel circuit 750C(i, j) and the pixel circuit 650C(i, j) can reduce power consumption.

Although the even-numbered rows and the odd-numbered rows can be selectively controlled by the selection circuits 20 in one embodiment of the present invention, the number of rows that can be selected by one selection circuit may be an integer of 2 or more.

FIGS. 14A to 14D show examples of an operation pattern that can be exhibited by the circuits illustrated in FIG. 1, FIG. 7, and FIG. 10.

Figure 14A:
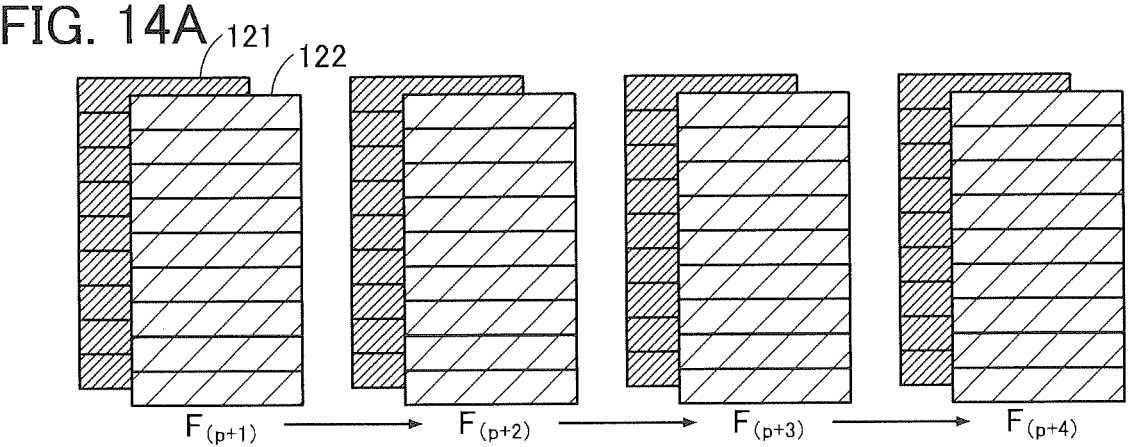
FIGS. 14A to 14D each illustrate a display example.
Figure 14B:
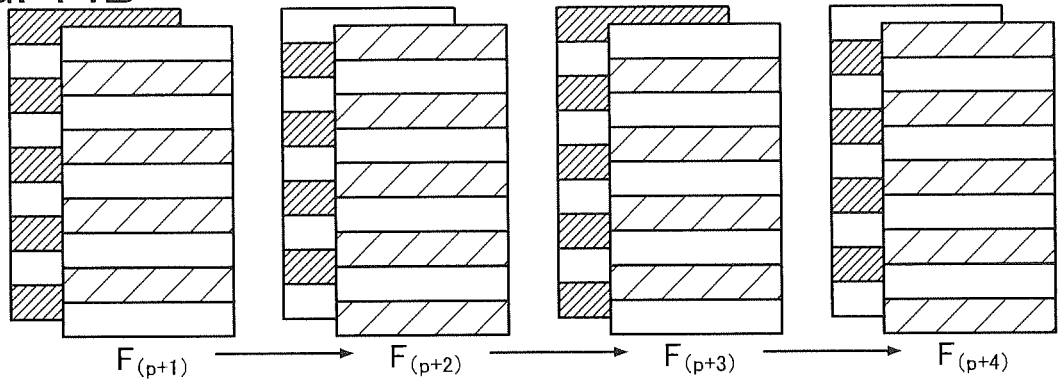

In FIG. 14B, the liquid crystal display region 121 and the light-emitting display region 122 alternate with each other in updating the display, and they each update the display in every two rows. Either one of the liquid crystal display region 121 and the light-emitting display region 122 may update the display. In a high-definition display device that can exhibit many grayscale levels, the display quality can be heightened by ensuring the long writing period.

Figure 14C:
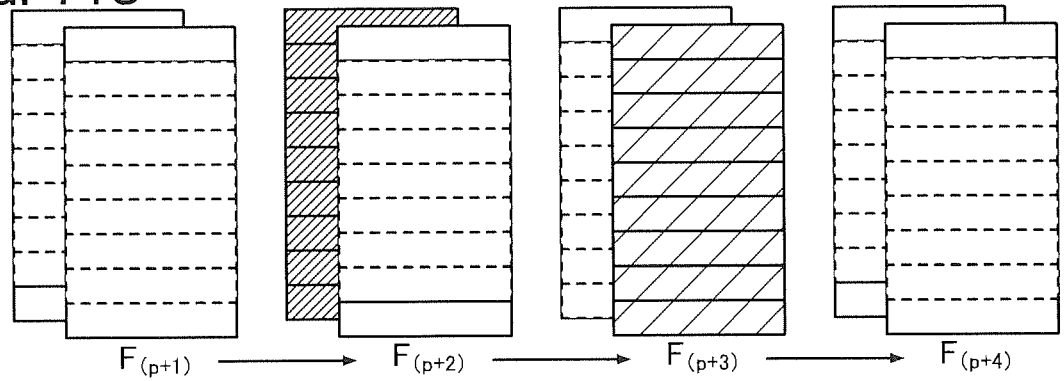

In FIG. 14C, the liquid crystal display region 121 and the light-emitting display region 122 can update the displayed content once every four frames. The reduction in the update frequency of the displayed content can decrease power consumption.

Figure 14D:
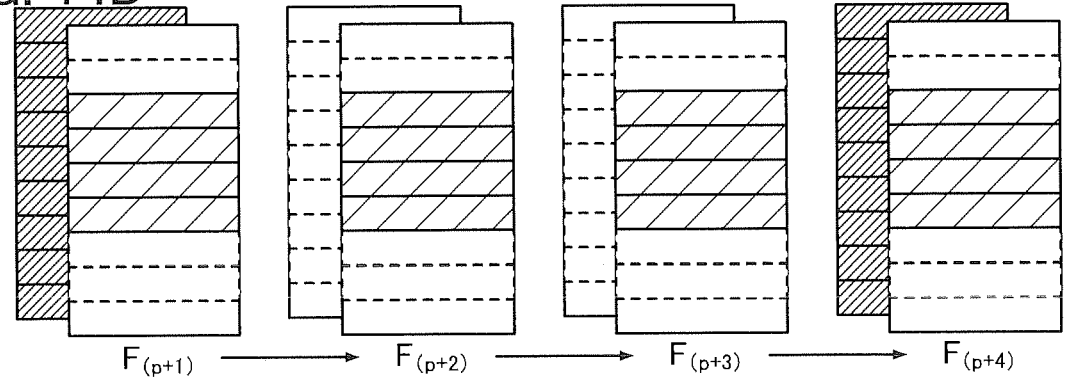

In FIG. 14D, the operation of FIG. 14C is combined with an operation of updating the displayed content in a particular region of the light-emitting display region 122. In the liquid crystal display region 121 displaying a still image, the power consumption can be reduced by lowering the update frequency of the displayed content, and the update of the displayed content suited for moving image display can be performed in a particular region. In the particular region where a moving image is reproduced, the employment of the driving pattern in FIG. 14B can further reduce power consumption.

In the high-definition display portion including the pixel circuit 750C(i, j) and the pixel circuit 650C(i, j), the timing for driving the scan lines can be controlled with the selection signal MD_L$_{ODD}$, the selection signal MD_L$_{EVEN}$, the selection signal MD_E$_{ODD}$, the selection signal MD_E$_{EVEN}$, and the selection circuit 20. Moreover, the update frequency can be controlled to be optimum value suited for the displayed content. Furthermore, as illustrated in FIGS. 14A to 14D, the update of the displayed content in a particular region in the liquid crystal display region 121 and the light-emitting display region 122 can be freely controlled by selective control of scan lines.

The structures, methods, driving timing described in this embodiment can be combined as appropriate with any of those described in the other embodiments.

Embodiment 4

In this embodiment, a display device in which a grayscale signal is supplied through a signal line that is electrically connected to a pixel circuit including a first display element and a pixel circuit including a second display element will be described with reference to FIG. 15, FIG. 16, FIGS. 17A and 17B, FIGS. 18A and 18B, and FIG. 19.

Figure 15:
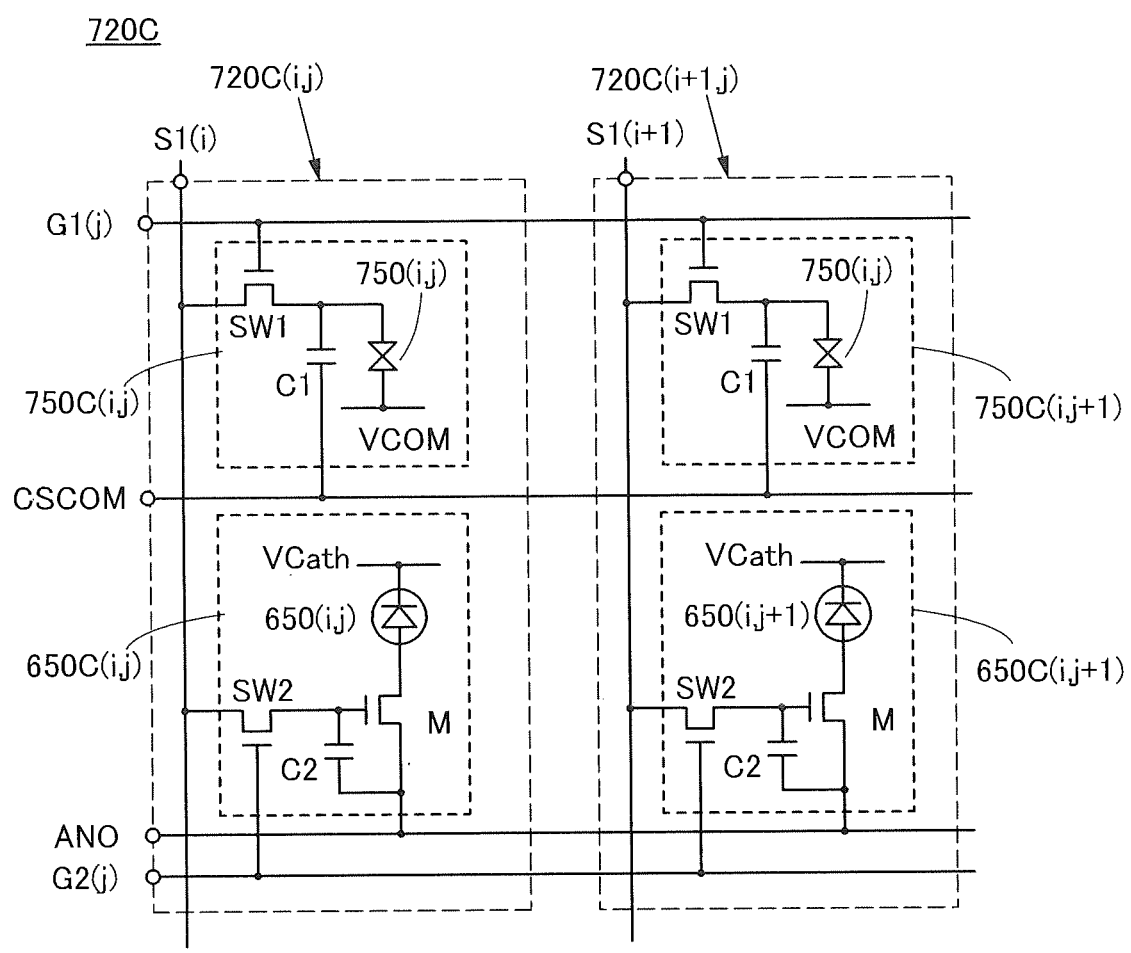
FIG. 15 illustrates a structure of pixels.
Figure 16:
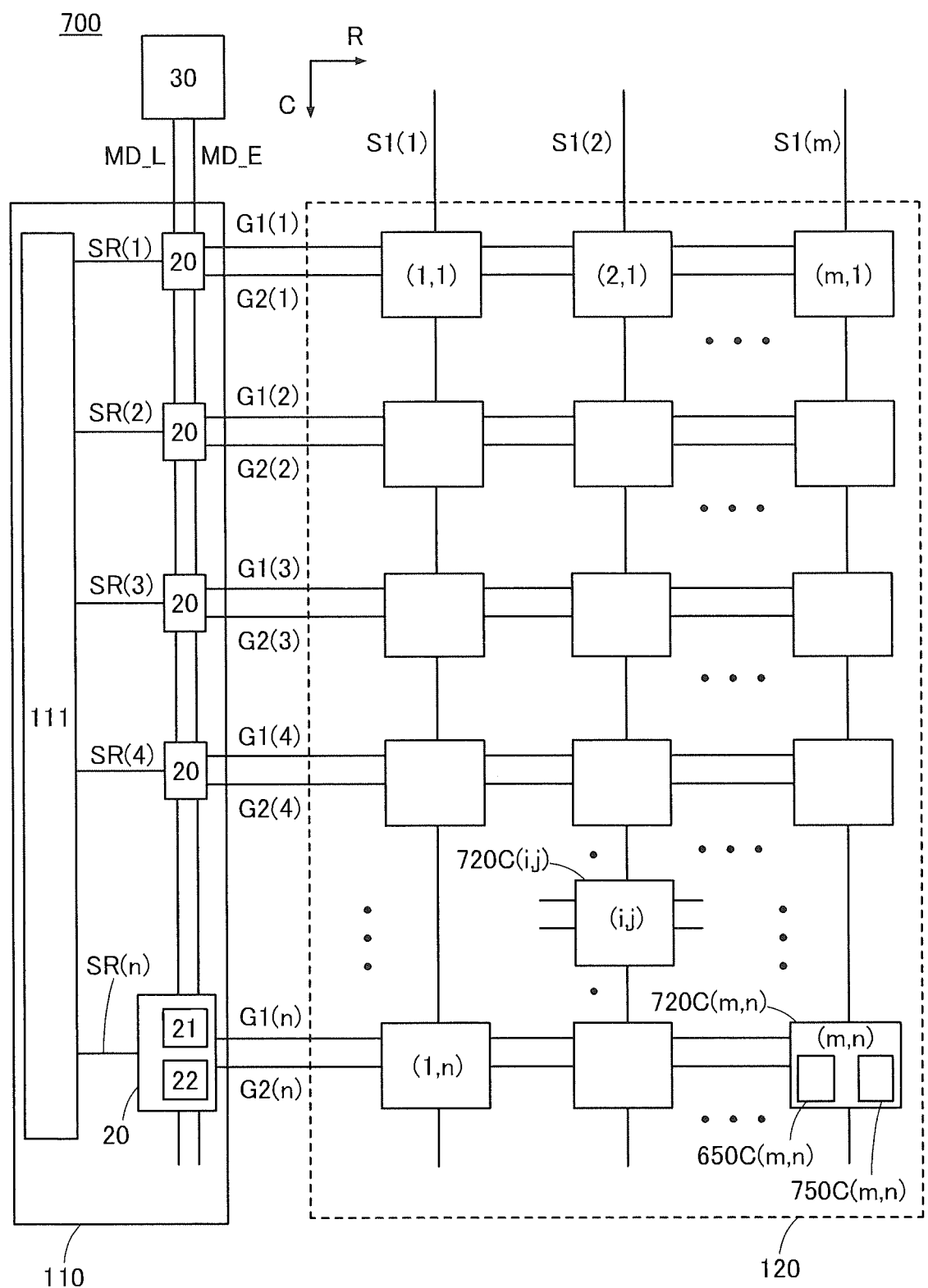
FIG. 16 illustrates a structure of a display device.

FIG. 15 illustrates a structure example of pixel circuits 720C. One pixel in the display portion 120 of the display device 700 illustrated in FIG. 16 is described as a pixel circuit 720C(i, j). The display portion 120 includes m (row direction)×n (column direction) pixels in a matrix; m is an integer of 1 or more and n is an integer of 1 or more. Note that i is an integer greater than or equal to 1 and less than or equal to m, and j is an integer greater than or equal to 1 and less than or equal to n.

The pixel circuit 72C(i, j) includes a pixel circuit 750C(i, j) which includes a first display element 750(i, j). For example, the first display element 750(i, j) is preferably a liquid crystal element which is driven by an alternating current in order to prevent burn-in.

The pixel circuit 720C(i, j) includes a pixel circuit 650C(i, j) which includes a second display element 650(i, j). For example, the second display element 650(i, j) is preferably a light-emitting element which is driven by a direct current.

A gate of the transistor SW1 of the pixel circuit 750C(i, j) is electrically connected to the first scan line G1(j). One of a source and a drain of the transistor SW1 is electrically connected to the signal line S1(i).

A voltage is generated between a first pixel electrode and a first counter electrode by a first grayscale signal supplied from the signal line S1(i). Furthermore, the grayscale level of the first display element 750(i, j) is controlled by the voltage generated between the first pixel electrode and the first counter electrode.

The gate of the transistor SW2 in the pixel circuit 650C(i, j) is electrically connected to the second scan line G2(j). One of a source and a drain of the transistor SW2 is electrically connected to the signal line S1(i).

A driving current is controlled by the transistor M which is controlled by a second grayscale signal supplied from the signal line S1(i). The grayscale level of the second display element 650(i, j) is controlled by the driving current flowing through the second display element 650(i, j).

FIG. 16 is a block diagram illustrating a structure of a display device 700. The display device 700 includes a gate driver 110, a selection signal output circuit 30, and a display portion 120. The gate driver 110 includes a shift register circuit 111 and a selection circuit 20. The selection circuit 20 includes a determination circuit 21 and a determination circuit 22. The display portion 120 includes pixel circuits 720C(1, 1) to 720C(m, n). The pixel circuit 720C(m, n) includes a pixel circuit 750C(m, n) and a pixel circuit 650C(m, n).

The display portion 120 described in this embodiment includes the pixel circuits 720C(1, 1) to 720C(m, n), first scan lines G1(1) to G1(n), second scan lines G2(1) to G2(n), and the signal lines S1(1) to S1(m).

The selection circuit 20 is the same as that in FIGS. 4A and 4B and therefore not described here.

Figure 17A:
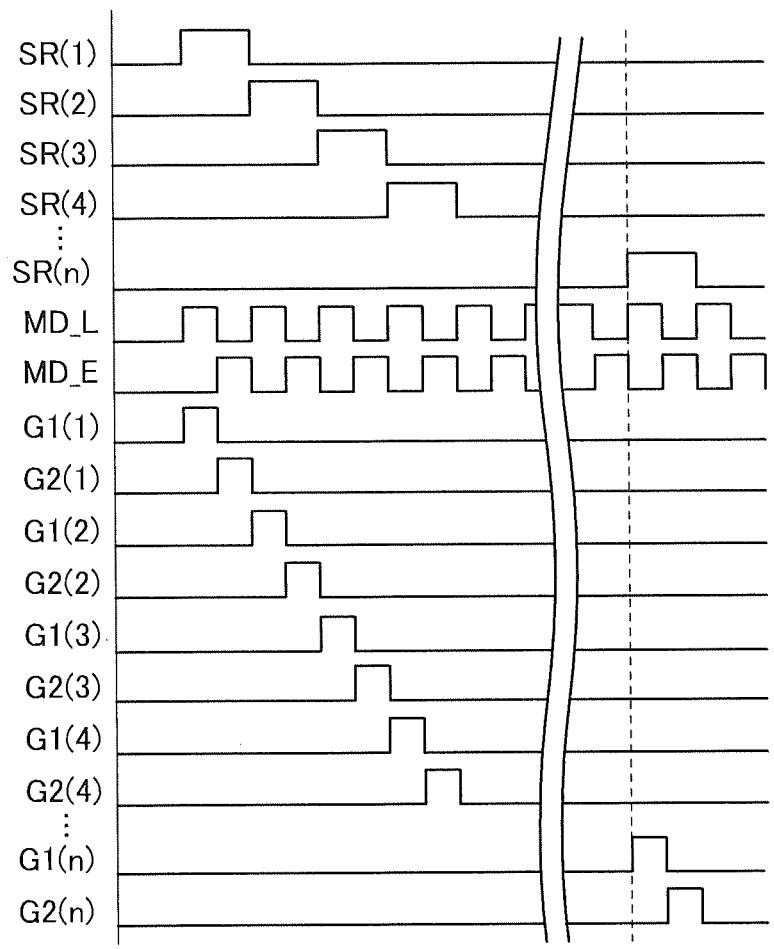
FIG. 17A is a timing chart of the display device illustrated in FIG. 16.

FIG. 17A shows a timing chart of an operation of the display device 700 in FIG. 16. The gate driver 110 in FIG. 16 sequentially outputs the output signals SR(1) to SR(n) from the shift register circuit 111.

A scan signal output to the first scan line G1(j) electrically connected to the pixel circuit 750C(i, j) is generated using the output signal SR(j) from the shift register circuit 111 and the selection signal MD_L from the selection signal output circuit 30 by the determination circuit 21 of the selection circuit 20.

A scan signal output to the second scan line G2(j) electrically connected to the pixel circuit 650C(i, j) is generated using the output signal SR(j) from the shift register circuit 111 and the selection signal MD_E from the selection signal output circuit 30 by the determination circuit 22 of the selection circuit 20.

As an example, an operation of the gate driver 110 in a period when the output signal SR(1) is High will be described with reference to a timing chart in FIG. 17A.

While the selection signal MD_L is High in the period when the output signal SR(1) of the shift register circuit 111 is High, the scan signal in the first scan line G1(1) is High, so that grayscale signals can be written into the pixel circuits 750C(i, 1) through the signal lines S1(1) to S1(m) electrically connected to the pixel circuits 750C(i, 1).

While the selection signal MD_E is High in the period when the output signal SR(1) of the shift register circuit 111 is High, the scan signal in the second scan line G2(1) is High, so that grayscale signals can be written into the pixel circuits 650C(i, 1) through the signal lines S1(1) to S1(m) electrically connected to the pixel circuits 650C(i, 1).

Figure 17B:
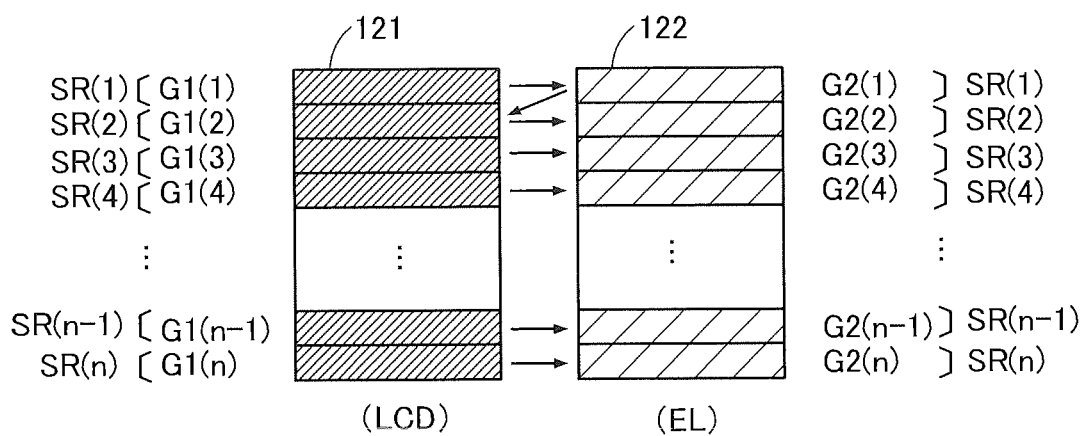
FIG. 17B is a drawing for explaining an operation.

FIG. 17B schematically shows a driving state of the display portion 120. A display region obtained by the pixel circuit 750C(i, j) is referred to as a liquid crystal display region 121, and a display region obtained by the pixel circuit 650C(i, j) is referred to as a light-emitting display region 122.

In FIG. 16, the displayed content in the liquid crystal display region 121 is updated by the scan signal which is output to the first scan line G1(j) using the output signal SR(j) from the shift register circuit 111, the selection signal MD_L, the selection signal MD_E, and the selection circuit 20. Furthermore, the displayed content in the light-emitting display region 122 is updated by the scan signal output to the second scan line G2(j). Thus, the display update order accords with the timing chart in FIG. 17A.

FIG. 17B shows a period in which the output signal SR(1) is High. When the selection signal MD_L is High, the scan signal supplied to the first scan line G1(1) by the selection circuit 20 is High. The displayed content in the pixel circuits 750C(1, 1) to 750C(m, 1) is updated by grayscale signals.

When the output signal SR(1) is High and the selection signal MD_E is High, the scan signal supplied to the second scan line G2(1) by the selection circuit 20 is High. The displayed content in the pixel circuits 650C(1, 1) to 650C(m, 1) is updated by grayscale signals.

In FIG. 17A, while the output signal SR(1) is High, the selection signal MD_L first becomes High, and then the selection signal MD_E becomes High. In FIG. 17B, the display in the liquid crystal display region 121 is first updated when the selection signal MD_L is High. Then, the display in the light-emitting display region 122 is updated when the selection signal MD_E is High.

In the circuit illustrated in FIG. 16, the scan signal for the first scan line G1 and the scan signal for the second scan line G2 are brought to be High at different times. Thus, the first grayscale signal and the second grayscale signal supplied to the same signal line do not influence each other.

The selection of the first scan line G1(1) which is electrically connected to the gate of the transistor SW1 included in the pixel circuit 750C(i, 1) or the second scan line G2(1) which is electrically connected to the gate of the transistor SW2 included in the pixel circuit 650C(i, 1) can be controlled by the gate driver 110 including the shift register circuit 111 and the selection circuit 20.

A grayscale signal for the pixel circuit 750C(i, 1) and a grayscale signal for the pixel circuit 650C(i, 1) can be supplied to the signal line S1(i).

In the pixel circuit 720C(i, j) in FIG. 15, following the occurrence of variations of a resistance component of the second display element 650(i, j) included in the pixel circuit 650C(i, j), the voltage between the drain and the source of the transistor M varies. Since the drain of the transistor M is fixed at an anode voltage and the counter electrode of the second display element 650(i, j) is fixed at a cathode voltage, the source voltage of the transistor M varies. The variations in the source voltage of the transistor M cause variations in the voltage applied between the source and the gate of the transistor M, leading to variations in driving current. Accordingly, the grayscale level is not controlled precisely.

In order to precisely control the grayscale level of the display element 650(i, j), a voltage generated by the second grayscale signal needs to be supplied to the gate of the transistor M, using the source voltage of the transistor M as a reference.

Figure 18A:
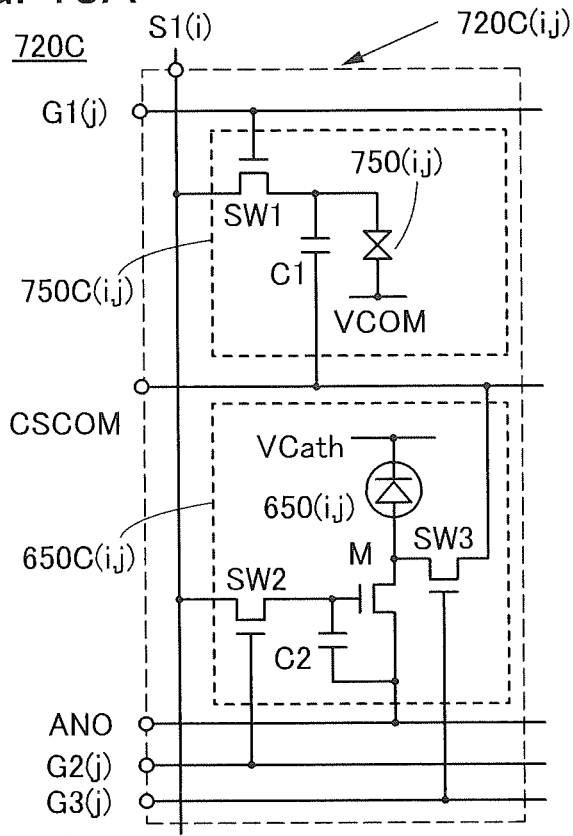
FIG. 18A illustrates a structure of a pixel.

An operation for controlling the driving current without an influence of variations in a resistance component of the second display element 650(i, j) included in the pixel circuit 650C(i, j) will be described with reference to FIGS. 18A to 18C. FIG. 18A is different from FIG. 15 in that the pixel circuit 650C(i, j) includes a transistor SW3.

One of a source and a drain of the transistor SW3 is electrically connected to the source of the transistor M. The other of the source and the drain of the transistor SW3 is electrically connected to the CSCOM terminal. A gate of the transistor SW3 is electrically connected to a third scan line G3(j).

The output signal SR from the shift register circuit 111 is supplied to the third scan line as a third scan signal.

An operation for controlling the driving current without an influence of variations in a resistance component of the second display element 650(i, j) included in the pixel circuit 650C(i, j) will be described with reference to a timing chart of FIG. 18B. When the first scan signal is High, the output signal SR(j) from the shift register circuit 111 is supplied to the third scan line G3 as the third scan signal. Then, the gate of the transistor SW3 is brought to be High, so that a common voltage is supplied to the source of the transistor M through the CSCOM terminal.

Because the source of the transistor M and a second pixel electrode are electrically connected to each other, a current flows between the second pixel electrode and a second counter electrode through the second display element 650(i, j). The common voltage is preferably determined in consideration of electrical characteristics of the second display element 650(i, j) so that the current flowing through the second display element 650(i, j) does not contribute to light emission.

When the output signal SR(j) is High, the common voltage is supplied to the source of the transistor M. While the grayscale level of the first display element 750(i, j) included in the pixel circuit 750C(i, j) changes by the first grayscale signal, the second display element 650(i, j) in the pixel circuit 650C(i, j) is not supplied with an enough current for light emission and is thus in a non-light-emitting state.

Also in a period when the second scan signal is High and a grayscale signal is written into the pixel circuit 650C(i, j), the source of the transistor M is fixed at the common voltage. Thus, a grayscale signal having a precise value with reference to the common voltage is supplied to the pixel circuit 650C(i, j).

Figure 18C:
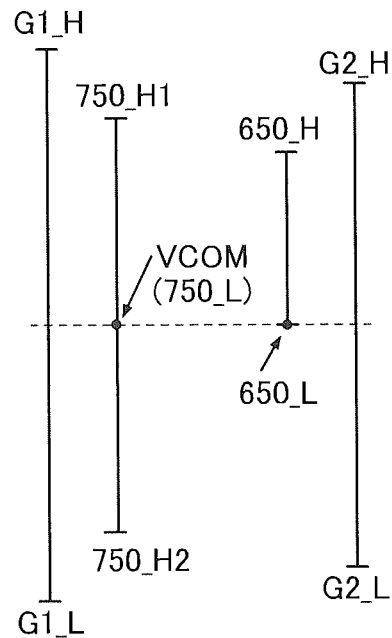
FIG. 18C illustrates a voltage relationship among signals.
Figure 18B:
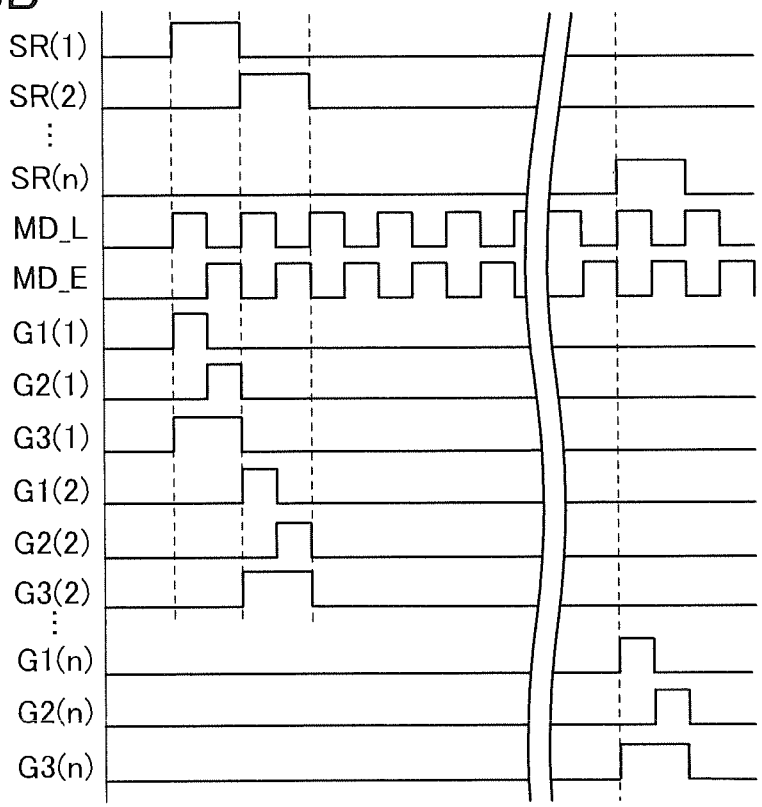
FIG. 18B is a timing chart of the pixel illustrated in FIG. 18A.

FIG. 18C shows a voltage relationship of signals in FIG. 18A. First, as for the scan signals, the High voltage and the Low voltage of the first scan signal are referred to as G1_H and G1_L, respectively, and the High voltage and the Low voltage of the second scan signal are referred to as G2_H and G2_L, respectively. Although an example in which G1_H and G2_H have different voltage levels and G1_L and G2_L have different voltage levels is described, they may have the same voltage level, in which case the number of power sources can be reduced and the circuit scale can be reduced.

The grayscale signal is described, using a liquid crystal element in which the first display element 750(i, j) performs inversion driving as an example. When the black color is expressed in the state where the first pixel electrode and the first counter electrode are both at the common voltage, the maximum voltage generated by the first grayscale signal is referred to as 750_H1, and the minimum voltage generated by the inverted first grayscale signal is referred to as 750_H2. 750_L is the common voltage. The maximum voltage generated by the second grayscale signal is 650_H, and the minimum voltage generated by the second grayscale signal is 650_L.

In FIG. 18C, the same common voltage as 750_L is supplied as 650_L. 650_L preferably has a voltage level at which a current flowing through the cathode terminal does not contribute to light emission of the second display element 650(i, j). The common voltage supplied as 650_L is preferably determined in consideration of electrical characteristics of the second display element 650(i, j).

The voltages of signals not shown in FIG. 18C are described. The anode voltage supplied to the ANO terminal is higher than 650_H, and the cathode voltage supplied to the VCath terminal is lower than 650_L.

In the circuit illustrated in FIG. 18A, even when the circuit for controlling the driving current so that the driving current is not influenced by variations in a resistance component of the second display element 650(i, j) included in the pixel circuit 650C(i, j) is not provided, the use of the common voltage, which is a reference voltage of the capacitor C1 included in the pixel circuit 750C(i, j), allows for an improvement in display quality without additional wirings.

In the circuit illustrated in FIG. 18A, even when the circuit for controlling the driving current so that the driving current is not influenced by variations in a resistance component of the second display element 650(i, j) included in the pixel circuit 650C(i, j) is not provided, bringing the scan signals for the first scan line G1 and the second scan line G2 to be High at different times enables the first grayscale signal and the second grayscale signal supplied to the same signal line not to influence each other.

Note that the circuit structure of the pixel circuit 720C(i, j) in one embodiment of the present invention is not limited to that illustrated in FIG. 15. An example of the circuit structure of the pixel circuit 750C(i, j) and the pixel circuit 650C(i, j) which is different from those illustrated in FIG. 15 is illustrated in FIG. 19.

Figure 19:
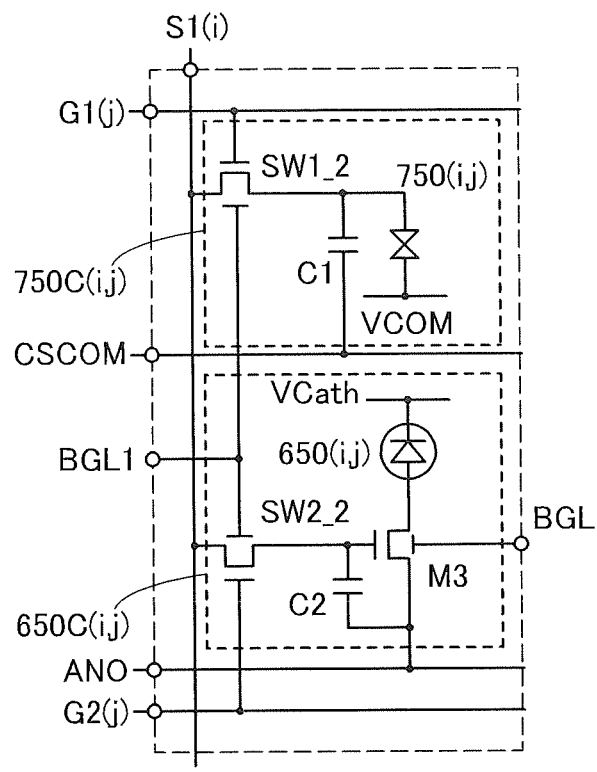
FIG. 19 illustrates a structure of a pixel.

The pixel circuit 750C(i, 1) and the pixel circuit 650C(i, j) in FIG. 19 are different from those in FIG. 3C in the following points. In FIG. 19, a backgate of a transistor SW1_2 and a backgate of a transistor SW2_2 are connected to a BGL1 terminal. A backgate voltage can be supplied from the BGL1 terminal. The voltage supplied to the BGL1 terminal may be equal to or different from that supplied to the BGL terminal.

Note that the circuit structure of the pixel circuit 720C(i, j) in one embodiment of the present invention is not limited to that in FIG. 19. Other terminals can be electrically connected to the backgates, or other combinations of connection can be employed.

The structures, methods, driving timing described in this embodiment can be combined as appropriate with any of those described in the other embodiments.

Embodiment 5

In this embodiment, a method for separately controlling odd-numbered rows and even-numbered rows of the gate driver in a high-definition display device including the pixel circuits 720C will be described with reference to FIG. 20 and FIGS. 21A and 21B.

Figure 20:
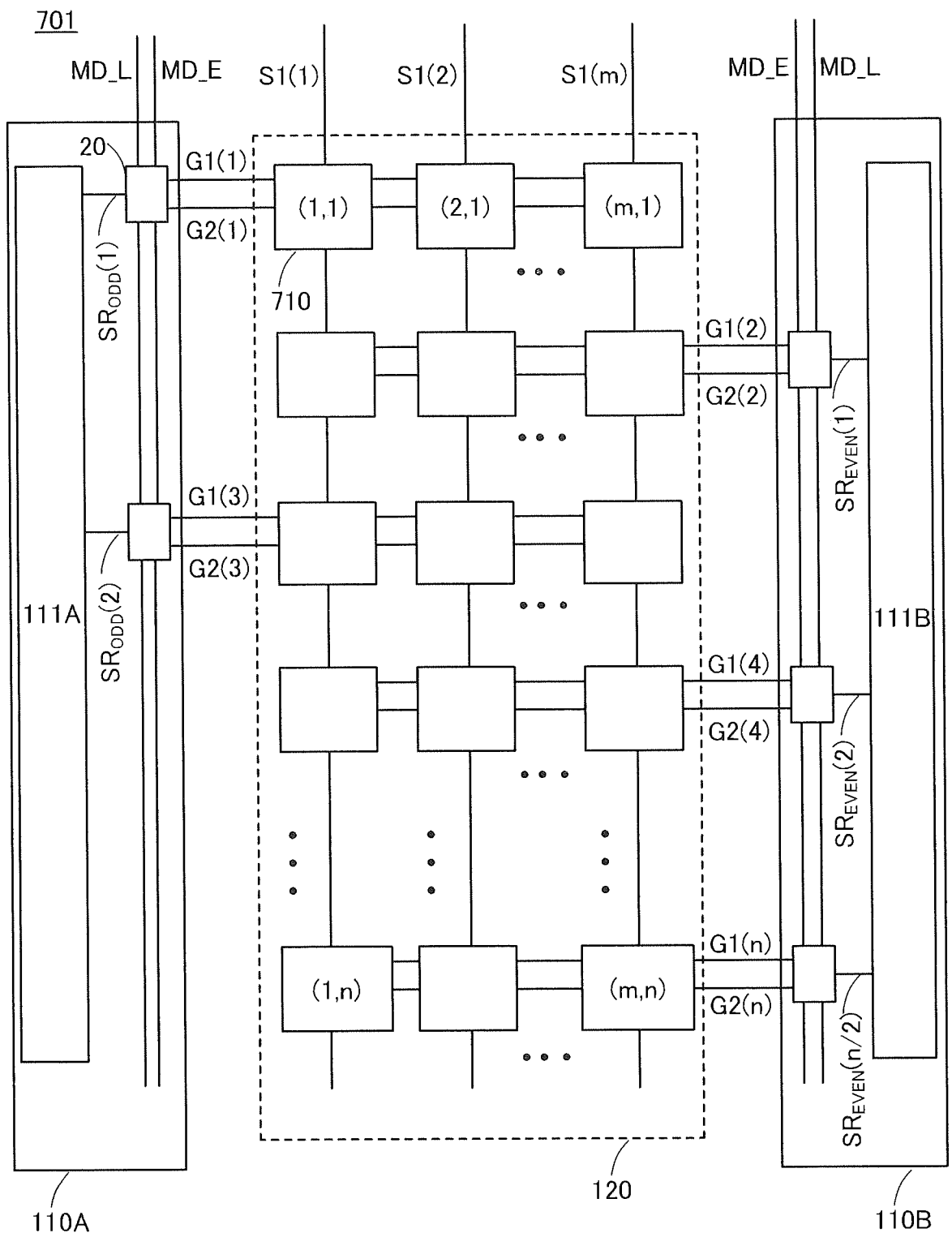
FIG. 20 illustrates a structure of a display device.

FIG. 20 is a block diagram illustrating a structure of the display device 701. FIG. 20 is different from FIG. 16 in that the gate driver 110 is divided into the gate driver 110A which controls the scan lines in the odd-numbered rows and the gate driver 110B which controls the scan lines in the even-numbered rows.

In the display device 701 illustrated in FIG. 20, the shift register circuit 111A and the shift register circuit 111B generate the output signal $SR_{ODD}$ and the output signal $SR_{EVEN}$ with different timings from those of the output signals SR output from the shift register circuit 111 in FIG. 16.

The structure of the gate driver is divided into a part for controlling odd-numbered rows and a part for controlling even-numbered rows in the display device 701 in FIG. 20. This reduces the number of stages in a gate driver and the circuit area to half. In this case, the size of the buffer circuit 26 in the selection circuit 20 which drives the scan signals in the first scan lines G1 and the second scan lines G2 can be increased, so that the current supply capability can be improved. In FIG. 20, n is an even integer of 2 or more.

Figure 21A:
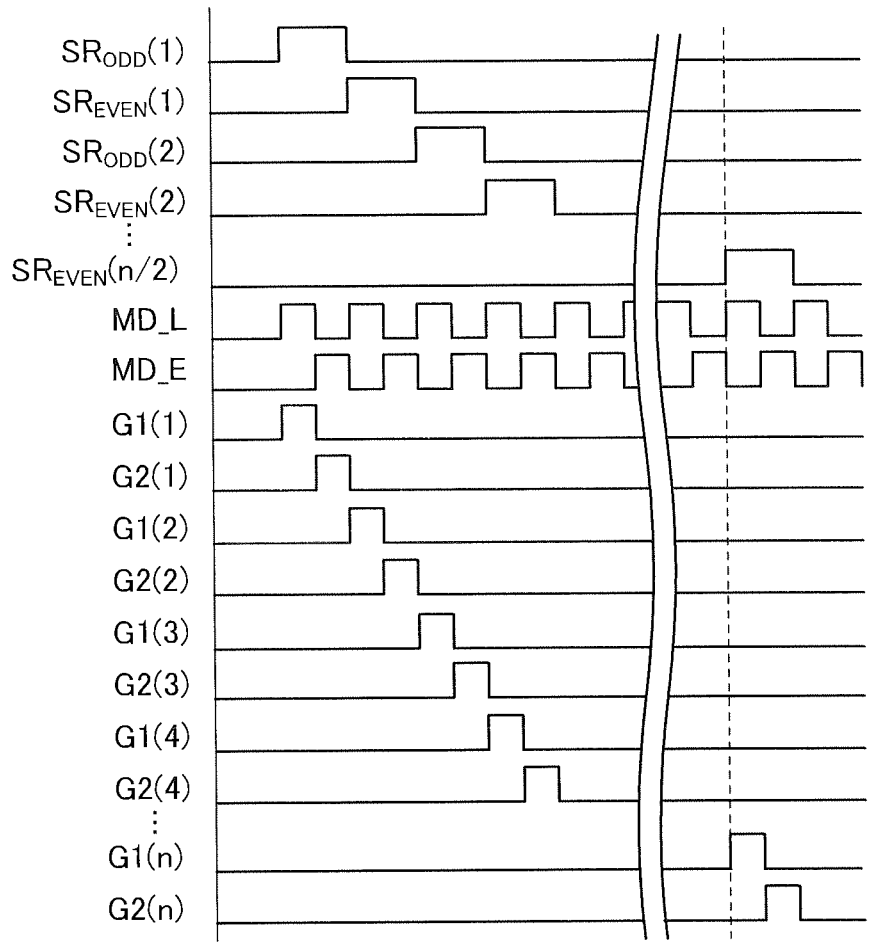
FIG. 21A is a timing chart of the display device illustrated in FIG. 20.

FIG. 21A shows a timing chart of an operation of the display device 701 in FIG. 20. In the timing chart in FIG. 21A, the selection signal MID_L and the selection signal MD_E are input in a manner similar to that shown in the timing chart in FIG. 17A. Accordingly, voltages are supplied to the first scan lines G1(1) to G1(n) and the second scan lines G2(1) to G2(n) with the same timings as those shown in the timing chart in FIG. 17A.

Figure 21B:
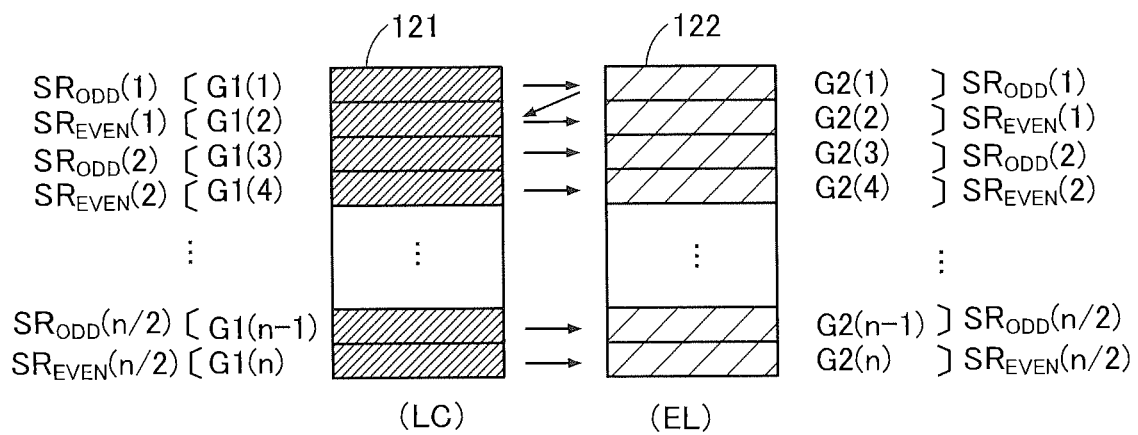
FIG. 21B is a drawing for explaining an operation.

FIG. 21B schematically shows a driving state of the display portion 120. In FIG. 20, unlike in FIG. 17B, the displayed content in the liquid crystal display region 121 is updated when the scan signals in the first scan lines G1(1) to G1(n) are brought to be High by the output signals $SR_{ODD}(1)$ to $SR_{ODD}(n/2)$ from the shift register circuit 111A included in the gate driver 110A, the output signals $SR_{EVEN}(1)$ to $SR_{EVEN}(n/2)$ from the shift register circuit 111B included in the shift register circuit 111B, the selection signal MD_L, and the selection signal MD_E. Furthermore, the displayed content in the light-emitting display region 122 is updated when the scan signals in the second scan lines G2(1) to G2(n) are brought to be High. Thus, the display update order accords with the timing chart in FIG. 21A.

An example in which the output signal $SR_{ODD}(1)$ from the shift register circuit 111A in FIG. 20 is High is described below. When the selection signal MD_L is High, the scan signal supplied to the first scan line G1(1) by the selection circuit 20 is High. This means that the displayed content in the pixel circuits 750C(1, 1) to 750C(m, 1) is updated by grayscale signals.

When the output signal $SR_{ODD}(1)$ from the shift register circuit 111A is High and the selection signal MD_E is High in FIG. 20, the scan signal supplied to the second scan line G2(1) by the selection circuit 20 is High. The displayed content in the pixel circuits 650C(1, 1) to 650C(m, 1) is updated by grayscale signals.

In FIG. 21A, while the output signal $SR_{ODD}(1)$ from the shift register circuit 111A included in the gate driver 110A is High, the selection signal MD_L first becomes High, and then the selection signal MD_E becomes High. In FIG. 21B, the display in the liquid crystal display region 121 is first updated when the selection signal MD_L is High. Then, the display in the light-emitting display region 122 is updated when the selection signal MD_E is High.

The selection of the first scan line G1(j) or the second scan line G2(j) can be controlled by the gate driver 110A including the shift register circuit 111A and the selection circuit 20.

The display device 701 in FIG. 20 where the gate driver is divided into the gate driver 110A for controlling the odd-numbered rows and the gate driver 110B for controlling the even-numbered rows can be operated with the same timing as that of the display device 700 in FIG. 16 by controlling the selection signal MD_L and the selection signal MD_E with the selection signal output circuit 30.

When the pixel circuit 750C(i, j) and the pixel circuit 650C(i, j) in the pixel circuit 720C share the signal line S1(j), driving of the high-definition display device is possible. Moreover, the current supply capability can be increased by increasing the buffer circuit, which enables driving of a display device having high definition such as 4K or 8K and including a display region.

In the circuit illustrated in FIG. 20, the scan signal for the first scan line G1 and the scan signal for the second scan line G2 are brought to be High at different times. Thus, the first grayscale signal and the second grayscale signal supplied to the same signal line do not influence each other.

The structures, methods, driving timing described in this embodiment can be combined as appropriate with any of those described in the other embodiments.

Embodiment 6

In this embodiment, a gate driver driving method in which the liquid crystal display region 121 and the light-emitting display region 122 in a high-definition display device including the pixel circuit 720C are controlled with different update frequencies will be described with reference to FIG. 22, FIGS. 23A and 23B, FIGS. 24A and 24B, FIGS. 25A and 25B, and FIGS. 26A to 26B.

Figure 22:
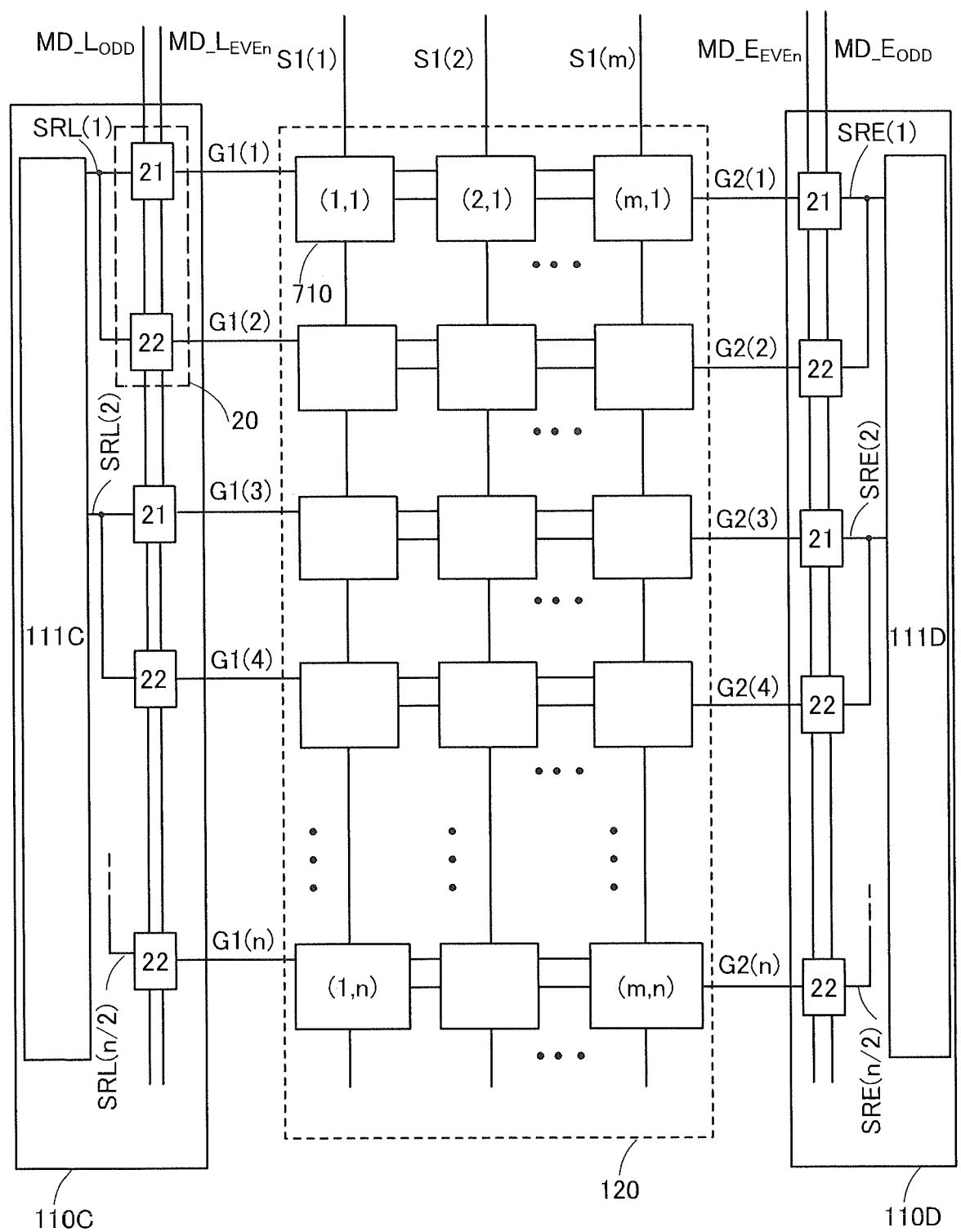
FIG. 22 illustrates a structure of a display device.

FIG. 22 is a block diagram illustrating a structure of the display device 702. FIG. 22 is different from FIG. 16 in that the gate driver 110 is divided into the gate driver 110C which controls the scan lines connected to the liquid crystal display region 121 and the gate driver 110D which controls the scan lines connected to the light-emitting display region 122. Furthermore, output signals from the selection circuit 20 are output to a scan line in an odd-numbered row and a scan line in an even-numbered row.

In the display device 702 illustrated in FIG. 22, the gate driver 110C can independently control the scan lines connected to the liquid crystal display region 121 in a selective manner, and the gate driver 110D can independently control the scan lines connected to the light-emitting display region 122 in a selective manner. In FIG. 22, n is an even integer of 2 or more.

Figure 23A:
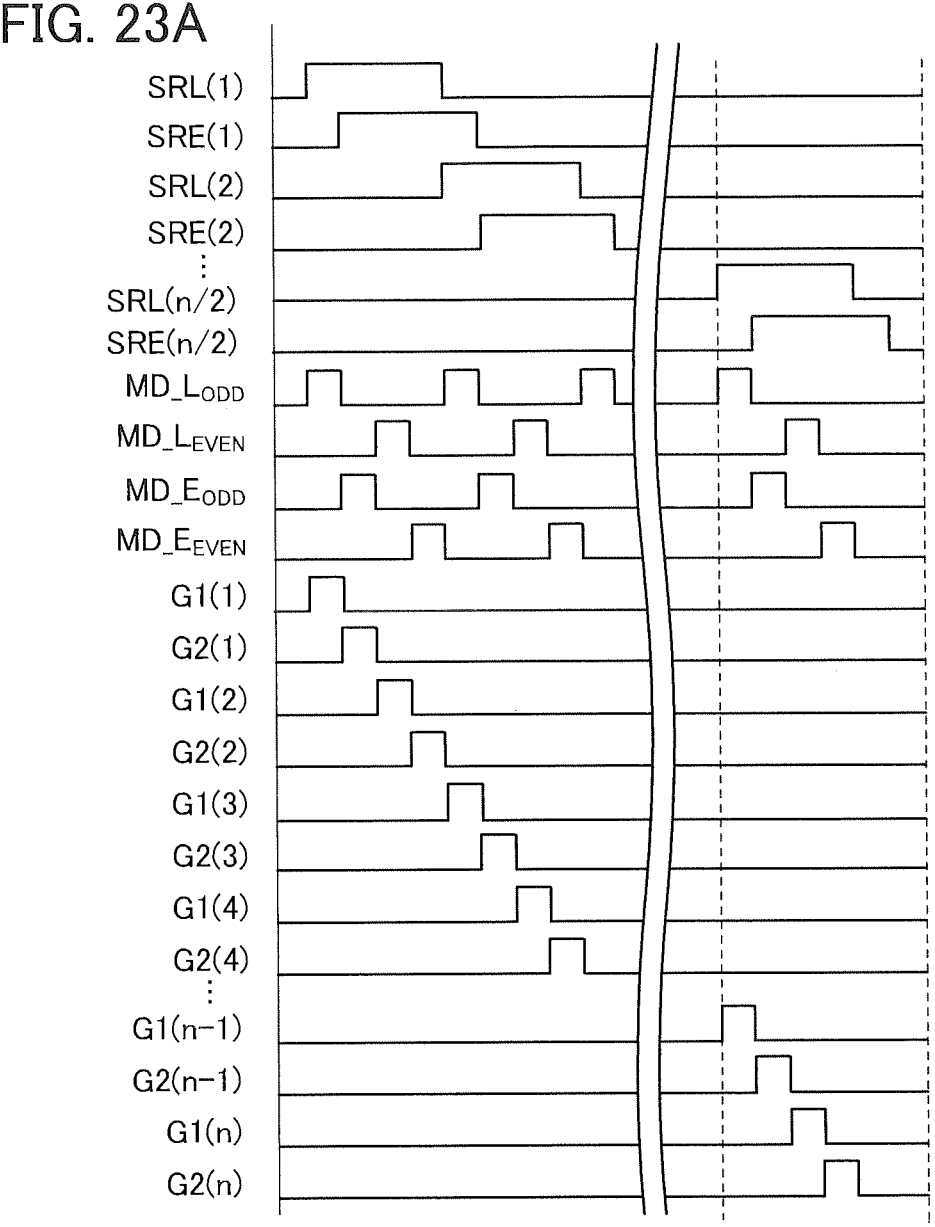
FIG. 23A is a timing chart of the display device illustrated in FIG. 22.

FIG. 23A is a timing chart of an operation of the display device 702 in FIG. 22. As an example, the operation in the timing chart in a period when the output signal SRL(1) from the shift register circuit 111C and the output signal SRE(1) from the shift register circuit 111D are High is described below.

When the selection signal $MD\_L_{ODD}$ is High in a period when the output signal SRL(1) from the shift register circuit 111C is High in FIG. 22, the scan signal in the first scan line G1(1) is brought to be High, so that grayscale signals can be written into the pixel circuits 750C(i, 1) through the signal lines S1(1) to S1(m).

When the selection signal $MD\_L_{EVEN}$ is High in a period when the output signal SRL(1) from the shift register circuit 111C is High in FIG. 22, the scan signal in the first scan line G1(2) is brought to be High, so that grayscale signals can be written into the pixel circuits 750C(i, 2) through the signal lines S1(1) to S1(m).

When the selection signal $MD\_E_{ODD}$ is High in a period when the output signal SRE(1) from the shift register circuit 111D is High in FIG. 22, the scan signal in the second scan line G2(1) is brought to be High, so that grayscale signals can be written into the pixel circuits 650C(i, 1) through the signal lines S1(1) to S1(m).

Figure 23B:
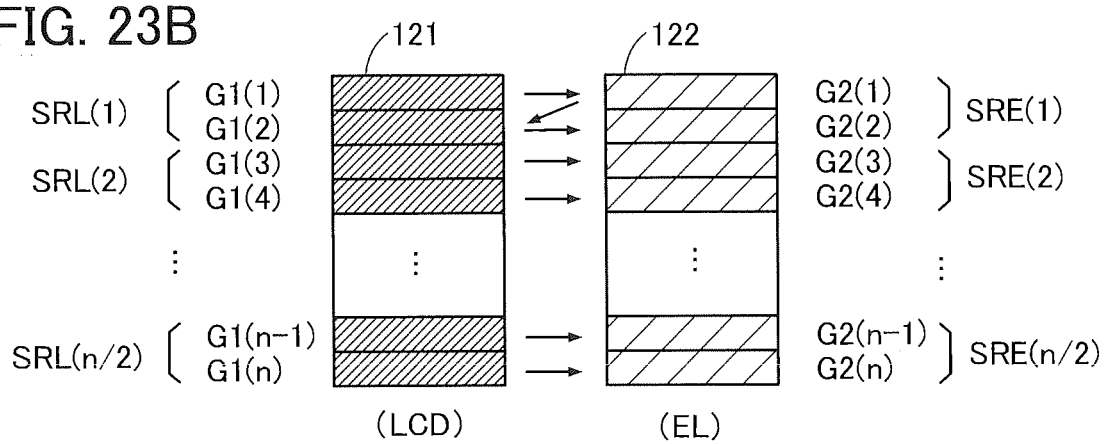
FIG. 23B is a drawing for explaining an operation.

When a selection signal $MD\_E_{EVEN}$ is High in a period when the output signal SRE(1) from the shift register circuit 111D is High in FIG. 23B, the scan signal in the second scan line G2(2) is brought to be High, so that grayscale signals can be written into the pixel circuits 650C(i, 2) through the signal lines S1(1) to S1(m).

FIG. 23B schematically shows a driving state of the liquid crystal display region 121 and the light-emitting display region 122. The order of updating the displayed content in the liquid crystal display region 121 and the light-emitting display region 122 by output signals SRL(1) to SRL(n/2) from the shift register circuit 111C, the selection signals $MD\_L_{ODD}$ and $MD\_E_{EVEN}$, output signals SRE(1) to SRE(n/2) from the shift register circuit 111D included in the gate driver 110D, and the selection signals $MD\_E_{ODD}$ and $MD\_E_{EVEN}$ is shown in FIG. 23B.

FIG. 23B schematically shows an update state of the displayed content in the display portion 120. The displayed content in the liquid crystal display region 121 is updated when the scan signals in the first scan lines G1(1) to G1(n) which are output by the output signals SRL(1) to SRL(n/2) from the shift register circuit 111C, the selection signal $MD\_L_{ODD}$, and the selection signal $MD\_L_{EVEN}$ are High. The displayed content in the light-emitting display region 122 is updated when the scan signals in the second scan lines G2(1) to G2(n) which are output by the output signals SRE(1) to SRE(n/2) from the shift register circuit 111D, the selection signal $MD\_E_{ODD}$, and the selection signal $MD\_E_{EVEN}$ are High. Thus, the display update order accords with the timing chart in FIG. 23A.

An example in which the output signal SRL(1) from the shift register circuit 111C in FIG. 22 is High is described. When the selection signal $MD\_L_{ODD}$ is High, the scan signal in the first scan line G1(1) is brought to be High by the selection circuit 20, which means that the displayed content in the pixel circuits 750C(1, 1) to 750C(m, 1) is updated by grayscale signals. Moreover, when the selection signal $MD\_L_{EVEN}$ is High, the scan signal in the first scan line G1(2) is brought to be High by the selection circuit 20, which means that the displayed content in the pixel circuits 750C(1, 2) to 750C(m, 2) is updated by grayscale signals.

Similarly, a case where the output signal SRE(1) from the shift register circuit 111D is High in FIG. 22 is described. When the selection signal $MD\_E_{ODD}$ is High, the scan signal in the second scan line G2(1) is brought to be High by the selection circuit 20, which means that the displayed content in the pixel circuits 650C(1, 1) to 650C(m, 1) is updated by grayscale signals. Moreover, when the selection signal $MD\_E_{EVEN}$ is High, the scan signal in the second scan line G2(2) is brought to be High by the selection circuit 20, which means that the displayed content in the pixel circuits 650C(1, 2) to 650C(m, 2) is updated by grayscale signals.

In the circuit illustrated in FIG. 22, the scan signal for the first scan line G1 and the scan signal for the second scan line G2 are brought to be High at different times. Thus, the first grayscale signal and the second grayscale signal supplied to the same signal line S1 do not influence each other.

The gate driver in the display device 702 is divided in order to independently control the liquid crystal display region 121 and the light-emitting display region 122. In addition, the liquid crystal display region 121 in an odd-numbered row and an adjacent even-numbered row is controlled by one selection circuit 20, and the light-emitting display region 122 in an odd-numbered row and an adjacent even-numbered row is controlled by another selection circuit 20. Furthermore, the scan lines connected to the pixel circuit 750C(i, j) and the pixel circuit 650C(i, j) can be selectively controlled by controlling driving timings of the selection signals MD_$L_{ODD}$ and MD_$L_{EVEN}$ and the selection signals MD_$E_{ODD}$ and MD_$E_{EVEN}$.

Figure 24A:
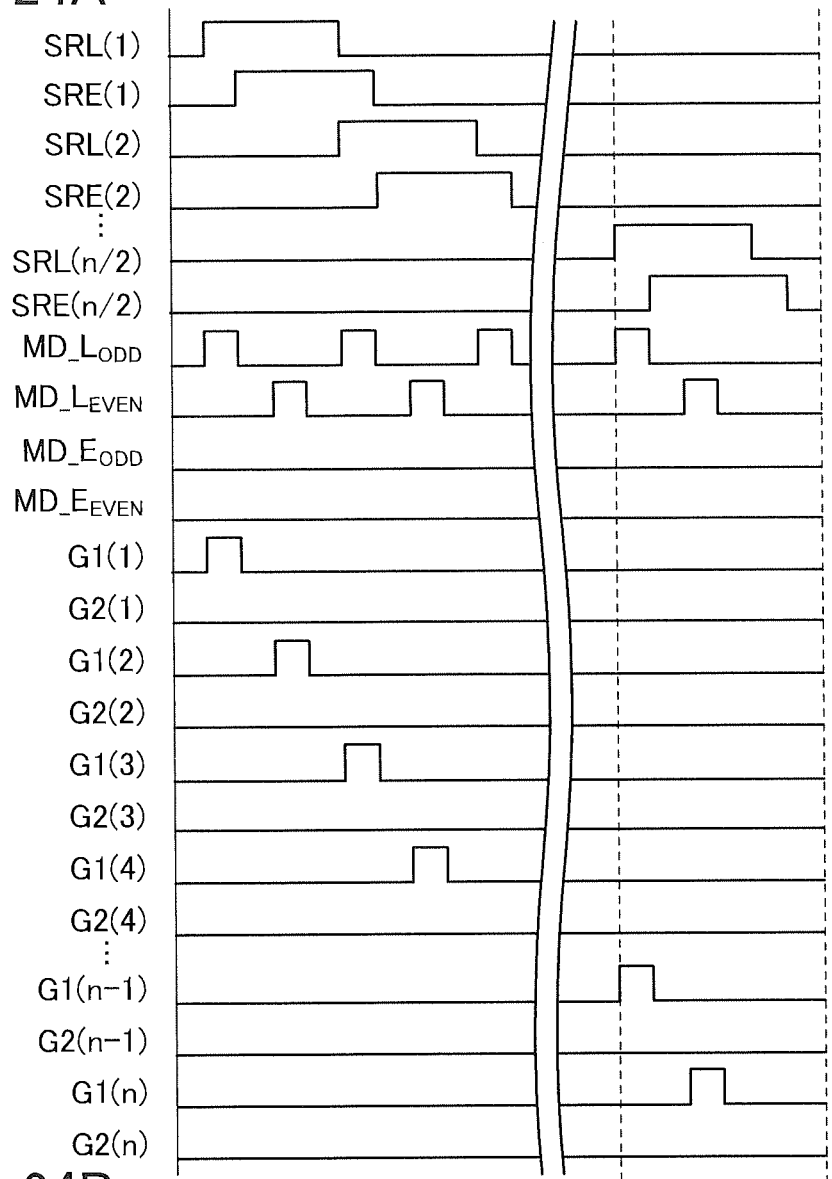
FIG. 24A is a timing chart of the display device illustrated in FIG. 22.
Figure 25A:
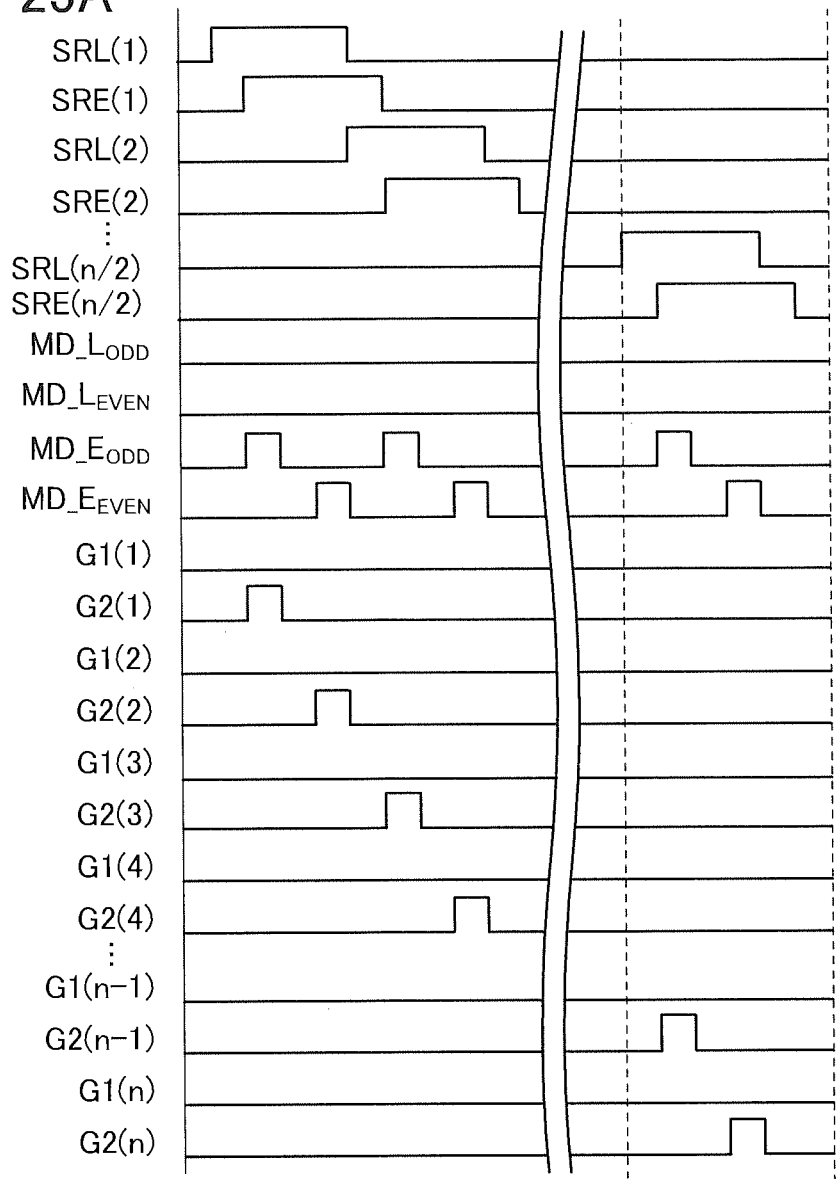
FIG. 25A is a timing chart of the display device illustrated in FIG. 22.

FIG. 24A and FIG. 25A show timing charts of an operation of the display device 702 in FIG. 22, which are different from that in FIG. 23A. In these operation examples, the display in the liquid crystal display region 121 and the display in the light-emitting display region 122 are updated with different timings; in other words, the update frequency of the display in the liquid crystal display region 121 is different from that of the display in the light-emitting display region 122. In FIG. 24A, the operation in the timing chart in a period when the output signal SRL(1) from the shift register circuit 111C and the output signal SRE(1) from the shift register circuit 111D included in the gate driver 110D are each High is described below.

In a period when the output signal SRL(1) from the shift register circuit 111C and the selection signal MD_$L_{ODD}$ are High, the scan signal High is output to the first scan line G1(1) by the determination circuit 21. When the scan signal in the first scan line G1(1) is High, grayscale signals supplied to the pixel circuits 750C(i, 1) are updated.

In a period when the output signal SRL(1) from the shift register circuit 111C and the selection signal MD_$L_{EVEN}$ are High, the scan signal High is output to the first scan line G1(2) by the determination circuit 22. When the scan signal in the first scan line G1(2) is High, grayscale signals supplied to the pixel circuits 750C(i, 2) are updated.

In a period when the selection signal MD_$E_{ODD}$ is Low, the scan signal output to the second scan line G2(1) by the determination circuit 21 is Low regardless of the state of the output signal SRE(1). In a period when the selection signal MD_$E_{EVEN}$ is Low, the scan signal output to the second scan line G2(1) by the determination circuit 21 is Low regardless of the state of the output signal SRE(1).

Figure 24B:
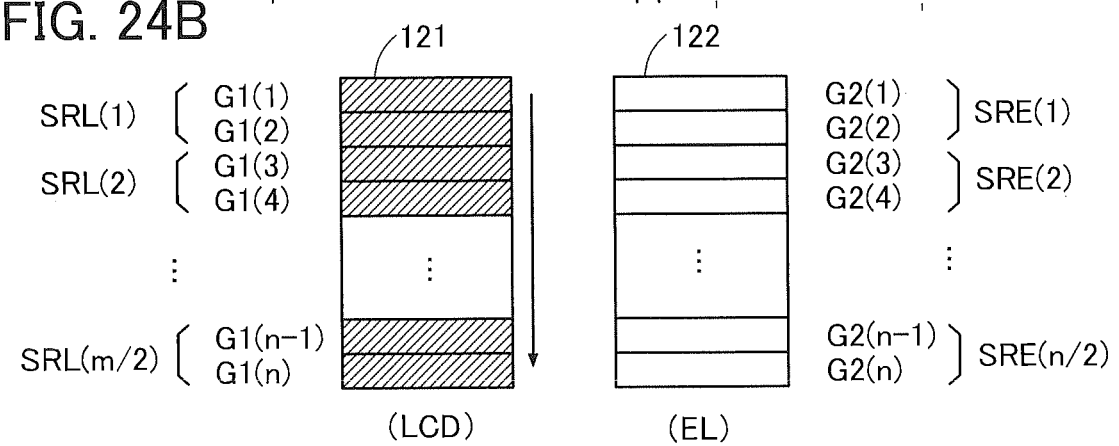
FIG. 24B is a drawing for explaining an operation.

FIG. 24B schematically shows a driving state of the liquid crystal display region 121 and the light-emitting display region 122.

FIG. 24B schematically shows a driving state of the display portion 120. The displayed content in the liquid crystal display region 121 is updated when the scan signals in the first scan lines G1(1) to G1(n) are brought to be High by the output signals SRL(1) to SRL(n/2) from the shift register circuit 111C and the selection signals MDL_$ODD$ and MD_$L_{EVEN}$.

Furthermore, the displayed content in the light-emitting display region 122 is not updated when the scan signals in the second scan lines G2(1) to G2(n) are brought to be Low by the output signals SRE(1) to SRE(n/2) from the shift register circuit 111D and the selection signals MD_$E_{ODD}$ and MD_$E_{EVEN}$.

In FIG. 24B, the displayed content is updated in the liquid crystal display region 121 and not updated in the light-emitting display region 122. This accords with the timing chart in FIG. 24A.

In FIG. 25A, the operation in the timing chart in a period when the output signal SRL(1) from the shift register circuit 111C and the output signal SRE(1) from the shift register circuit 111D are High is described below.

For example, in a period when the output signal SRE(1) from the shift register circuit 111D and the selection signal MD_$E_{ODD}$ are High, the scan signal output to the second scan line G2(1) by the determination circuit 21 is High. When the scan signal in the second scan line G2(1) is High, grayscale signals supplied to the pixel circuits 650C(i, 1) are updated.

In a period when the output signal SRE(1) from the shift register circuit 111D and the selection signal MD_$E_{EVEN}$ are High, the scan signal output to the second scan line G2(2) by the determination circuit 22 is High. When the scan signal in the second scan line G2(2) is High, grayscale signals supplied to the pixel circuits 650C(i, 2) are updated.

In a period when the selection signal MD_$L_{ODD}$ is Low, the scan signal output to the first scan line G1(1) by the determination circuit 21 is Low regardless of the state of the output signal SRL(1). In a period when the selection signal MD_$L_{EVEN}$ is Low, the scan signal output to the first scan line G1(1) by the determination circuit 21 is Low regardless of the state of the output signal SRL(1).

Figure 25B:
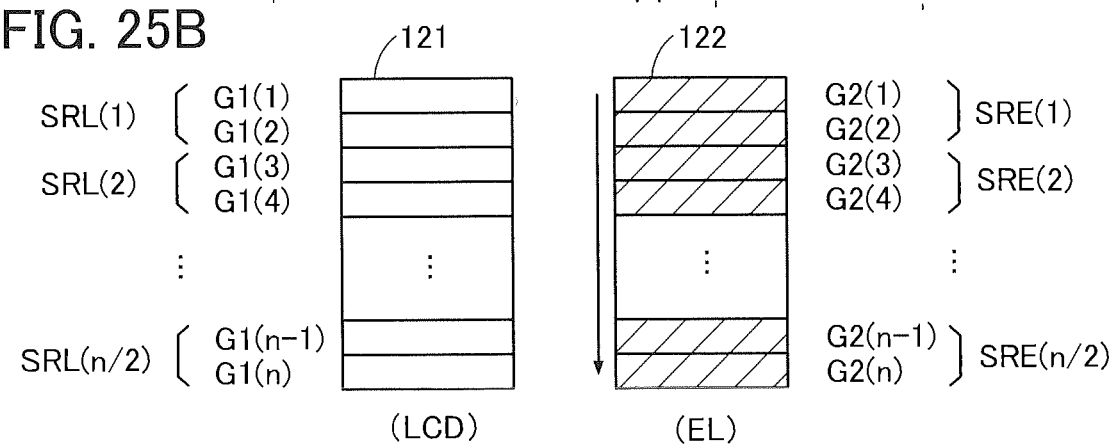
FIG. 25B is a drawing for explaining an operation.

FIG. 25B schematically shows a driving state of the liquid crystal display region 121 and the light-emitting display region 122.

FIG. 25B schematically shows a driving state of the display portion 120. The displayed content in the liquid crystal display region 121 is not updated when the scan signals in the first scan lines G1(1) to G1(n) are brought to be Low by the output signals SRL(1) to SRL(n/2) from the shift register circuit 111C and the selection signals MDL_$ODD$ and MD_$L_{EVEN}$.

Furthermore, the displayed content in the light-emitting display region 122 is not updated when the scan signals in the second scan lines G2(1) to G2(n) are brought to be Low by the output signals SRE(1) to SRE(n/2) from the shift register circuit 111D and the selection signals MD_$E_{ODD}$ and MD_$E_{EVEN}$.

In FIG. 25B, the displayed content is updated in the light-emitting display region 122 and not updated in the liquid crystal display region 121. This accords with the timing chart in FIG. 25A.

In FIG. 24A, when the selection signal MD_$L_{ODD}$ or MD_$L_{EVEN}$ is High in a period when the output signal SRL(1) or SRL(2) from the shift register circuit 111C is High, the display is updated in the liquid crystal display region 121.

In FIG. 25A, when the selection signal MD_$E_{ODD}$ or MD_$E_{EVEN}$ is High in a period when the output signal SRE(1) or SRE(2) from the shift register circuit 111D is High, the display is updated in the light-emitting display region 122.

Although the liquid crystal display region 121 or the light-emitting display region 122 is stopped on the frame basis by selectively controlling the scan lines with the selection signals in the examples illustrated in FIG. 24A and FIG. 25A, the same effect can be obtained by stopping the shift register circuits on the frame basis.

Moreover, in the case where a still image is reproduced by the pixel circuit 750C(i, j) and a moving image is reproduced by the pixel circuit 650C(i, j), optimum driving suited for the displayed content can be selected, for example, in such a manner that the update frequency of the displayed content for a still image is set lower than that of the displayed content for a moving image.

Furthermore, the power consumption of the high-definition display portion 120 including the pixel circuit 750C(i, j) and the pixel circuit 650C(i, j) can be reduced by the optimum driving.

Although the even-numbered rows and the odd-numbered rows can be selectively controlled by the selection circuits 20 in one embodiment of the present invention, the number of rows that can be selected by one selection circuit may be an integer of 2 or more.

Figure 26A:
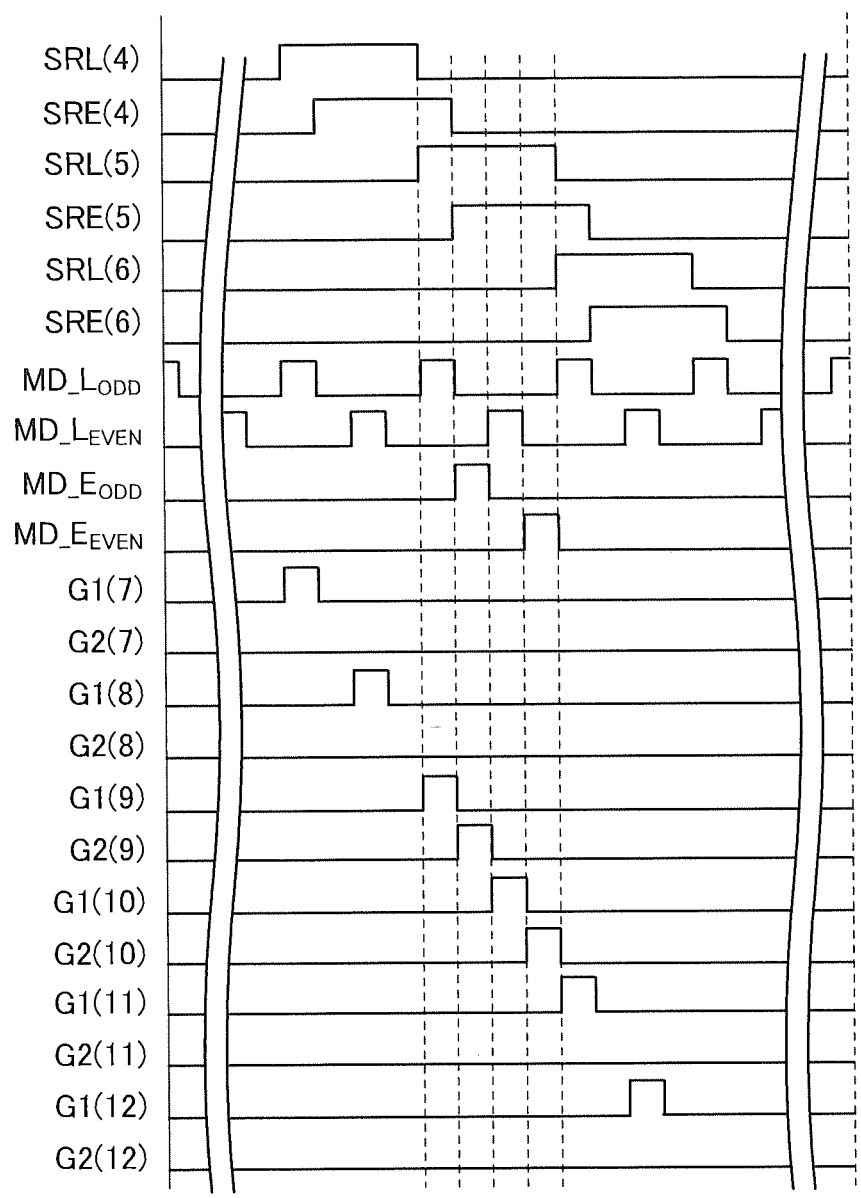
FIG. 26A is a timing chart of the display device illustrated in FIG. 22.

FIG. 26A is a timing chart of an operation of the display device 702 illustrated in FIG. 22, which is different from that in FIG. 24A. Described here is an example of a display device which includes a first display region and a second display region and in which the update frequency of the display of a display element included in the first display region is different from that of the display of a display element included in the second display region. Specifically, in the example described below, the display is sequentially updated on an entire surface of one of the liquid crystal display region 121 and the light-emitting display region 122, while the display is updated partly in the other thereof. An operation around the tenth row in the shift register circuit 111C and the shift register circuit 111D is shown in the timing chart.

Figure 26B:
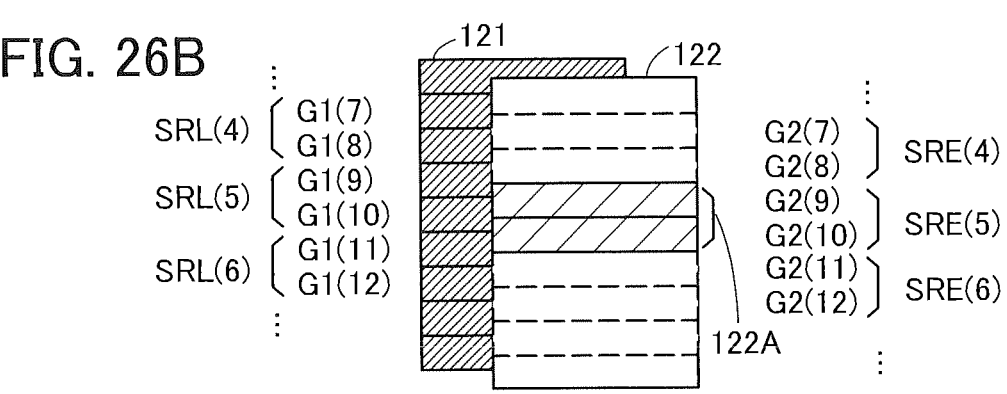
FIG. 26B is a drawing for explaining an operation.

As an example, an operation of the first scan lines G1(7) to G1(12) and the second scan lines G2(7) to G2(12) is shown in FIGS. 26A and 26B.

An operation in the timing chart in a period when the output signals SRL(4), SRL(5), and SRL(6) from the shift register circuit 111C and the output signal SRE(4), SRE(5), and SRE(6) from the shift register circuit 111D are High is described.

An operation of the case where the shift register circuit 111C in FIG. 22 supplies the output signal SRL(4) to the selection circuit 20 is described below. When the selection signal MD_L$_{ODD}$ is High, the scan signal in the first scan line G1(7) is brought to be High by the selection circuit 20, which means that the displayed content in the pixel circuits 750C(1, 7) to 750C(m, 7) is updated by grayscale signals. Furthermore, when the selection signal MD_L$_{EVEN}$ is High, the scan signal in the first scan line G1(8) is brought to be High by the selection circuit 20, which means that the displayed content in the pixel circuits 750C(1, 8) to 750C(m, 8) is updated by grayscale signals.

An operation of the case where the shift register circuit 111D in FIG. 22 supplies the output signal SRE(4) to the selection circuit 20 is described below. When the selection signals MD_E$_{ODD}$ and MD_E$_{EVEN}$ are Low, the scan signal in the second scan line G2(7) is brought to be Low by the selection circuit 20, which means that the displayed content in the pixel circuits 650C(1, 7) to 650C(m, 7) is not updated. Furthermore, the scan signal in the second scan line G2(8) is brought to be Low by the selection circuit 20, which means that the displayed content in the pixel circuits 650C(1, 8) to 650C(m, 8) is not updated.

An operation of the case where the shift register circuit 111C in FIG. 22 supplies the output signal SRL(5) to the selection circuit 20 is described below. When the selection signal MD_L$_{ODD}$ is High, the scan signal in the first scan line G1(9) is brought to be High by the selection circuit 20, which means that the displayed content in the pixel circuits 750C(1, 9) to 750C(m, 9) is updated by grayscale signals. Furthermore, when the selection signal MD_L$_{EVEN}$ is High, the scan signal in the first scan line G1(10) is brought to be High by the selection circuit 20, which means that the displayed content in the pixel circuits 750C(1, 10) to 750C(m, 10) is updated by grayscale signals.

An operation of the case where the shift register circuit 111D in FIG. 22 supplies the output signal SRE(5) to the selection circuit 20 is described below. When the selection signal MD_E$_{ODD}$ is High, the scan signal in the second scan line G2(9) is brought to be High by the selection circuit 20, which means that the displayed content in the pixel circuits 650C(1, 9) to 650C(m, 9) is updated by grayscale signals. Furthermore, when the selection signal MD_E$_{EVEN}$ is High, the scan signal in the second scan line G2(10) is brought to be High by the selection circuit 20, which means that the displayed content in the pixel circuits 650C(1, 10) to 650C(m, 10) is updated by grayscale signals.

An operation of the case where the shift register circuit 111C in FIG. 22 supplies the output signal SRL(6) to the selection circuit 20 is described below. When the selection signal MD_L$_{ODD}$ is High, the scan signal in the first scan line G1(11) is brought to be High by the selection circuit 20, which means that the displayed content in the pixel circuits 750C(1, 11) to 750C(m, 11) is updated by grayscale signals. Furthermore, when the selection signal MD_L$_{EVEN}$ is High, the scan signal in the first scan line G1(12) is brought to be High by the selection circuit 20, which means that the displayed content in the pixel circuits 750C(1, 12) to 750C(m, 12) is updated by grayscale signals.

An operation of the case where the shift register circuit 111D in FIG. 22 supplies the output signal SRE(6) to the selection circuit 20 is described below. When the selection signals MD_E$_{ODD}$ and MD_E$_{EVEN}$ are Low, the scan signal in the second scan line G2(11) is brought to be Low by the selection circuit 20, which means that the displayed content in the pixel circuits 650C(1, 11) to 650C(m, 11) is not updated. Furthermore, the scan signal in the second scan line G2(12) is brought to be Low by the selection circuit 20, which means that the displayed content in the pixel circuits 650C(1, 12) to 650C(m, 12) is not updated.

In FIG. 26B, the displayed content is sequentially updated in the liquid crystal display region 121, but the displayed content only for the output signal SRE(5) is updated in the light-emitting display region 122.

FIG. 26B schematically shows a driving state of the display portion 120. The displayed content in the liquid crystal display region 121 is updated when the scan signals in the first scan lines G1(1) to G1(n) are brought to be High by the output signals SRL(1) to SRL(n/2) and the selection signals MD_L$_{ODD}$ and MD_L$_{EVEN}$. Furthermore, the displayed content in the light-emitting display region 122 is updated when the scan signals in the second scan lines G2(1) to G2(n) are brought to be High by the output signals SRE(1) to SRE(n/2) from the shift register circuit 111D and the selection signals MD_E$_{ODD}$ and MD_E$_{EVEN}$. Thus, the display update order accords with the timing chart in FIG. 26A.

In FIG. 26B, the displayed content only in a particular display region can be updated by the selection signals.

For example, the entire liquid crystal display region 121 can display a still image by the pixel circuit 750C(i, j) and only a particular light-emitting display region 122A can reproduce a moving image by the pixel circuit 650C(i, j). Optimum driving suited for the displayed content can be selected, for example, in such a manner that the update frequency of the displayed content for a still image is set lower than that of the displayed content for a moving image.

Optimizing the update frequency of the displayed content by optimum driving of the high-definition display portion 120 including the pixel circuit 750C(i, j) and the pixel circuit 650C(i, j) can reduce power consumption.

In the circuit illustrated in FIG. 22, the scan signal for the first scan line G1 and the scan signal for the second scan line G2 are brought to be High at different times. Thus, the first grayscale signal and the second grayscale signal supplied to the same signal line do not influence each other.

Although the even-numbered rows and the odd-numbered rows can be selectively controlled by the selection circuits 20 in one embodiment of the present invention, the number of rows that can be selected by one selection circuit may be an integer of 2 or more.

FIGS. 14A to 14D illustrate examples of a display pattern that can be exhibited by the circuits illustrated in FIG. 16, FIG. 20, and FIG. 22. Note that p is an integer of 1 or more, and the update conditions of the display pattern from a (p+1)-th frame to a (p+4)-th frame is shown in FIGS. 14A to 14D.

In the high-definition display portion including the pixel circuit 750C(i, j) and the pixel circuit 650C(i, j), the timing for driving the scan lines can be controlled with the selection signal $MD\_L_{ODD}$, the selection signal $MD\_L_{EVEN}$, the selection signal $MD\_E_{ODD}$, the selection signal $MD\_E_{EVEN}$, and the selection circuit 20. Moreover, the update frequency can be controlled to be optimum value suited for the displayed content. Furthermore, as illustrated in FIGS. 14A to 14D, the update of the displayed content in a particular region in the liquid crystal display region 121 and the light-emitting display region 122 can be freely controlled by selective control of scan lines.

The structures, methods, driving timing described in this embodiment can be combined as appropriate with any of those described in the other embodiments.

Embodiment 7

In this embodiment, structures of the display device 700 of one embodiment of the present invention will be described with reference to FIGS. 27A, 27B1, and 27B2, FIGS. 28A1, 28A2, 28B1, and 28B2, FIGS. 29A to 29C, FIGS. 30A1, 30A2, 30B1, 30B2, and 30B3, and FIGS. 31A and 31B.

FIGS. 27A, 27B1, and 27B2 illustrate a structure of the display device 700 of one embodiment of the present invention. FIG. 27A is a top view of the display device 700 of one embodiment of the present invention. FIG. 27B1 is a bottom view illustrating part of the pixel circuit 710C(i, j) included in the display device 700 in FIG. 27A. FIG. 27B2 is a bottom view omitting some components illustrated in FIG. 27B1.

FIG. 28A1 is a bottom view illustrating part of the pixel circuit 710C(i, j) included in the display device 700 in FIG. 27A. FIG. 28A2 is a bottom view omitting some components illustrated in FIG. 28A1. FIG. 28B1 is a bottom view in which the position of an opening is different from that in FIG. 28A1. FIG. 28B2 is a bottom view omitting some components illustrated in FIG. 28B1.

FIGS. 29A to 29C illustrate the structure of the display device 700 of one embodiment of the present invention. FIG. 29A is a cross-sectional view taken along lines X1-X2, X3-X4, X5-X6, X7-X8, X9-X10, and X11-X12 in FIG. 27A. FIG. 29B is a cross-sectional view illustrating the structure of part of the display device 700 and FIG. 29C is a cross-sectional view illustrating the structure of another part of the display device 700.

FIGS. 30A1 and 30A2 are schematic views illustrating the arrangement of openings 751H which can be used for the display device 700 of one embodiment of the present invention.

Structure Example 1 of Display Device

The display device 700 described in this embodiment includes the signal line S1(i) and the pixel circuit 710C(i, j) (see FIGS. 28A1 and 28A2).

The pixel circuit 710C(i, j) is electrically connected to the signal line S1(i).

The pixel circuit 710C(i, j) includes the pixel circuit 750C(i, j) and the pixel circuit 650C(i, j). The pixel circuit 710C(i, j) includes the display element 750(i, j) included in the pixel circuit 750C(i, j), a first conductive film, a second conductive film, a second insulating film 601C, and the display element 650(i, j) included in the pixel circuit 650C(i, j) (see FIG. 29A).

The first conductive film is electrically connected to the display element 750(i, j) (see FIG. 29A). For example, the first conductive film can be used for the first electrode 751(i, j) of the display element 750(i, j).

The second conductive film has a region overlapping with the first conductive film. For example, the second conductive film can be used as a conductive film 612B serving as a source or a drain of a transistor which can be used as the transistor SW1.

The second insulating film 601C has a region interposed between the second conductive film and the first conductive film.

The pixel circuit 710C(i, j) is electrically connected to the second conductive film. For example, the transistor in which the second conductive film is used as the conductive film 612B serving as a source or a drain can be used as the transistor SW1 of the pixel circuit 710C(i, j) (see FIG. 29A and FIG. 2).

The insulating film 601C includes an opening 691A (see FIG. 29A).

The second conductive film is electrically connected to the first conductive film in the opening 691A. For example, the conductive film 612B is electrically connected to the first electrode 751(i, j).

The pixel circuit 710C(i, j) is electrically connected to the signal line S1(i) (see FIG. 2). Note that the conductive film 612A is electrically connected to the signal line S1(i) (see FIG. 29A and FIG. 2).

The first electrode 751(i, j) has an edge portion embedded in the second insulating film 601C.

Furthermore, the pixel circuit 710C(i, j) of the display device 700 described in this embodiment includes the transistor SW1. The transistor SW1 includes an oxide semiconductor.

Furthermore, the display element 650(i, j) of the display device 700 described in this embodiment has a function of performing display in the same direction as the display direction of the first display element 750(i, j). For example, a dashed arrow in the drawing denotes the direction in which the first display element 750(i, j) performs display by adjusting the intensity of external light reflection. In addition, a solid arrow in the drawing denotes the direction in which the display element 650(i, j) performs display (see FIG. 29A).

In addition, the second display element 650(i, j) of the display device 700 described in this embodiment has a function of displaying in a region surrounded by a region where the first display element 750(i, j) performs display (see FIG. 30A1 or 30A2). Note that the display element 750(i, j) performs display in a region overlapping with the first electrode 751(i, j) and that the display element 650(i, j) performs display in a region overlapping with the opening 751H.

Furthermore, the display element 750(i, j) of the display device 700 described in this embodiment includes a reflective film which reflects incident light and has a function of adjusting the intensity of the reflected light. The reflective film has the opening 751H. Note that for example, the first conductive film, the first electrode 751(i,j), or the like can be used as the reflective film of the display element 750(i, j).

Furthermore, the display element 650(i, j) has a function of emitting light toward the opening 751H.

In addition, the display device 700 described in this embodiment includes the pixel circuit 710C(i, j), one pixel group of pixel circuits 710C(i, 1) to 710C (i, n), another group of pixel circuits 710C (1, j) to 710C (m, j), and a first scan line G1(j) (see FIG. 1). Note that i is an integer greater than or equal to 1 and less than or equal to m, j is an integer greater than or equal to 1 and less than or equal to n, and each of m and n is an integer greater than or equal to 1.

The display device 700 described in this embodiment includes the second scan line G2(j), a wiring CSCOM, and a wiring ANO.

The one group of pixel circuits 710C(i, 1) to 710C(i, n) include the pixel circuit 710C(i, j), and are arranged in a column direction (indicated by an arrow C in the drawing) intersecting with a row direction.

The other group of pixel circuits 710C(1, j) to 710C(m, j) include the pixel circuit 710C(i, j), and are arranged in a row direction (indicated by an arrow R in the drawing).

The first scan line G1(j) is electrically connected to the other group of pixel circuits 710C(1, j) to 710C(m, j) arranged in the row direction.

The one group of pixel circuits 710C(i, 1) to 710C(i, n) arranged in the column direction are electrically connected to the signal line S1(i).

For example, as illustrated in FIGS. 30A1 and 30A2, the position of an opening provided in a pixel is preferably different between adjacent pixels. Here, the adjacent pixels refer to adjacent pixels in either a row direction or a column direction or in both directions. Note that for example, the first electrode 751(i, j) can be used for the reflective film.

FIGS. 30B1 to 30B3 are schematic diagrams each illustrating an arrangement example of openings 751H that can be used in the display device 700 of one embodiment of the present invention.

The bottom view of FIG. 30B1 is shown in FIG. 28B1. In FIG. 28B1, the number of wirings CSCOM can be smaller than that in FIG. 28A1. Accordingly, a display device with high definition can be provided.

The length of a line obtained by connecting centers of the openings of the second display elements in the three pixel circuits in FIGS. 30B2 and 30B3 is longer than that in FIG. 30A1 or 30B1. With this arrangement in which the display area of three pixels for color display is increased, even when the area of the openings of the second display elements is small, color display quality can be improved.

The display device 700 of the above-described one embodiment of the present invention includes a display element 750, a first conductive film electrically connected to the display element 750, a second conductive film having a region overlapping with the first conductive film, an insulating film having a region sandwiched between the second conductive film and the first conductive film, a pixel circuit electrically connected to the second conductive film, and a display element 650 electrically connected to the pixel circuit. The second insulating film has an opening. The second conductive film is electrically connected to the first conductive film in the opening.

Accordingly, the display element 750 and the display element 650 which perform display using a different method from that of the display element 750 can be driven, for example, with the pixel circuit which can be formed in the same process. As a result, a novel display device that is highly convenient or reliable can be provided.

In addition, the display device 700 described in this embodiment includes a terminal 619B and a conductive film 611B (see FIG. 29A).

The second insulating film 601C has a region interposed between the terminal 619B and the conductive film 611B. In addition, the second insulating film 601C includes an opening 691B.

The terminal 619B is electrically connected to the conductive film 611B in the opening 691B. In addition, the conductive film 611B is electrically connected to the pixel circuit 710C(i, j). Note that for example, when the first electrode 751(i, j) or the first conductive film is used as the reflective film, a surface serving as a contact with the terminal 619B is oriented in the same direction as a surface of the first electrode 751(i, j) that light enters in the display element 750(i, j).

Thus, power or signals can be supplied to the pixel circuit through the terminal. As a result, a novel display device that is highly convenient can be provided.

In addition, the display element 750(i, j) of the display device 700 described in this embodiment includes a layer 753 containing a liquid-crystal material, the first electrode 751(i, j), and a second electrode 752. Note that the second electrode 752 is provided so that an electric field for controlling the alignment of the liquid crystal material is generated between the second electrode 752 and the first electrode 751(i, j).

Furthermore, the display device 700 described in this embodiment includes an alignment film AF1 and an alignment film AF2. The alignment film AF2 is provided so that the layer 753 containing a liquid crystal material is interposed between the alignment films AF1 and AF2.

In addition, the display element 650(i, j) of the display device 700 described in this embodiment includes a third electrode 651(i, j), a fourth electrode 652, and a layer 653(i) containing a light-emitting organic compound.

The fourth electrode 652 has a region overlapping with the third electrode 651(i, j). The layer 653(i) containing a light-emitting organic compound is positioned between the third electrode 651 and the fourth electrode 652. The third electrode 651(i, j) is electrically connected to the transistor M in a contact portion 622.

Moreover, the pixel circuit 710C(i, j) of the display device 700 described in this embodiment includes a coloring film CF1, a light-blocking film BM, an insulating film 771, and a functional film 770P.

The coloring film CF1 has a region overlapping with the display element 750(i, j). The light-blocking film BM has an opening in a region overlapping with the display element 750(i, j).

The insulating film 771 is positioned between the coloring film CF1 and the layer 753 containing a liquid crystal material or between the light-blocking film BM and the layer 753 containing a liquid crystal material. Thus, unevenness due to the thickness of the coloring film CF1 can be avoided. Alternatively, impurities can be prevented from being diffused from the light-blocking film BM, the coloring film CF1, or the like to the layer 753 containing a liquid crystal material.

The functional film 770P has a region overlapping with the display element 750(i, j). The functional film 770P is provided so that a substrate 770 is interposed between the functional film 770P and the display element 750(i, j).

In addition, the display device 700 described in this embodiment includes a substrate 670, the substrate 770, and a functional layer 620.

The substrate 770 has a region overlapping with the substrate 670. The functional layer 620 is positioned between the substrates 670 and 770.

The functional layer 620 includes the pixel circuit 710C(i, j), the display element 650(i, j), an insulating film 621, and an insulating film 628. Furthermore, the functional layer 620 includes an insulating film 618 and an insulating film 616.

The insulating film 621 is positioned between the display element 750(i, j) and the display element 650(i, j).

The insulating film 628 is positioned between the insulating film 621 and the substrate 670 and has an opening in a region overlapping with the display element 650(i, j). The insulating film 628 along the edge of the third electrode 651(i, j) can avoid a short circuit between the third electrode 651 and the fourth electrode.

The insulating film 618 has a region positioned between the insulating film 621 and the display element 750(i, j). The insulating film 616 has a region positioned between the insulating film 618 and the display element 750(i, j).

Moreover, the display device 700 described in this embodiment includes a bonding layer 605, a sealant 705, and a structure body KB1.

The bonding layer 605 is positioned between the functional layer 620 and the substrate 670 and has a function of bonding the functional layer 620 and the substrate 670.

The sealant 705 is positioned between the functional layer 620 and the substrate 770 and has a function of bonding the functional layer 620 and the substrate 770.

The structure body KB1 has a function of making a predetermined gap between the functional layer 620 and the substrate 770.

In addition, the display device 700 described in this embodiment includes a terminal 619C, a conductive film 611C, and a conductor CP.

The second insulating film 601C has a region interposed between the terminal 619C and the conductive film 611C. In addition, the second insulating film 601C has an opening 691C.

The terminal 619C is electrically connected to the conductive film 611C in the opening 691C. In addition, the conductive film 611C is electrically connected to the pixel circuit 710C(i, j).

The conductor CP is interposed between the terminal 619C and the second electrode 752 for electrically connecting the terminal 619C and the second electrode 752. For example, a conductive particle can be used as the conductor CP.

Moreover, the display device 700 described in this embodiment includes a driver circuit GD and a driver circuit SD (see FIG. 27A).

The driver circuit GD is electrically connected to the first scan line G1(j). The driver circuit GD includes, for example, a transistor MD. Specifically, a transistor which includes a semiconductor film and can be formed in the same step as the transistor included in the pixel circuit 710C(i, j) can be used as the transistor MD (see FIGS. 29A and 29C).

The driver circuit SD is electrically connected to the signal line S1(j). The driver circuit SD is electrically connected to a terminal using a conductive material, for example. The terminal can be formed in the same step as the terminal 619B or the terminal 619C.

Individual components of the display device will be described below. Note that these components cannot be clearly distinguished and one component serves as another one or includes part of another one in some cases.

For example, the first conductive film can be used as the first electrode 751(i, j). The first conductive film can be used as a reflective film.

In addition, the second conductive film can be used as the conductive film 612B serving as a source or a drain of a transistor.

Structure Example 1

The display device 700 of one embodiment of the present invention includes the substrate 670, the substrate 770, the structure body KB1, the sealant 705, or the bonding layer 605.

In addition, the display device 700 of one embodiment of the present invention includes the functional layer 620, the insulating film 621, and the insulating film 628.

In addition, the display device 700 of one embodiment of the present invention includes the signal line S1(j), the first scan line G1(i), the second scan line G2(i), the wiring CSCOM, and the wiring ANO.

In addition, the display device 700 of one embodiment of the present invention includes the first conductive film or the second conductive film.

In addition, the display device 700 of one embodiment of the present invention includes the terminal 619B, the terminal 619C, the conductive film 611B, or the conductive film 611C.

In addition, the display device 700 of one embodiment of the present invention includes the pixel circuit 710C(i, j) and the transistor SW1.

In addition, the display device 700 of one embodiment of the present invention includes the first display element 750(i, j), the first electrode 751(i, j), the reflective film, the opening 751H, the layer 753 containing a liquid crystal material, and the second electrode 752.

In addition, the display device 700 of one embodiment of the present invention includes the alignment film AF1, the alignment film AF2, the coloring film CF1, the light-blocking film BM, the insulating film 771, and the functional film 770P.

In the display device 700, the coloring film CF1 may be provided between the insulating film 621 and the display element 750(i, j) in a position overlapping with the opening 751H through which light from the display element 650(i, j) passes.

In addition, the display device 700 of one embodiment of the present invention includes the display element 650(i, j), the third electrode 651(i, j), the fourth electrode 652, or the layer 653(i) containing a light-emitting organic compound.

Furthermore, the display device 700 of one embodiment of the present invention includes the second insulating film 601C.

In addition, the display device 700 of one embodiment of the present invention includes the driver circuit GD or the driver circuit SD.

<<Substrate 670>>

The substrate 670 and the like can be formed using a material having heat resistance high enough to withstand heat treatment in the manufacturing process. Specifically, a non-alkali glass with a thickness of 0.7 mm can be used For example, a large-sized glass substrate having any of the following sizes can be used as the substrate 670 and the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 670 and the like, an organic material, an inorganic material, a composite material of an organic material and an inorganic material, or the like can be used. For example, an inorganic material such as glass, ceramic, or a metal can be used for the substrate 670 and the like.

Specifically, non-alkali glass, soda-lime glass, potash glass, crystal glass, quartz, sapphire, or the like can be used for the substrate 670 and the like. Specifically, an inorganic oxide film, an inorganic nitride film, an inorganic oxynitride film, or the like can be used for the substrate 670 and the like. For example, a film of silicon oxide, silicon nitride, silicon oxynitride, alumina, or the like can be used for the substrate 670 and the like. SUS, aluminum, or the like can be used for the substrate 670 and the like.

For example, a single crystal semiconductor substrate or a polycrystalline semiconductor substrate of silicon or silicon carbide, a compound semiconductor substrate of silicon germanium, or an SOI substrate can be used as the substrate 670 and the like. Thus, a semiconductor element can be formed over the substrate 670 and the like.

For example, an organic material such as a resin, a resin film, or plastic can be used for the substrate 670 and the like. Specifically, a resin film or resin plate of polyester, polyolefin, polyamide, polyimide, polycarbonate, an acrylic resin, or the like can be used for the substrate 670 and the like.

For example, a composite material, such as a resin film to which a metal plate, a thin glass plate, or an inorganic film is bonded can be used for the substrate 670 and the like. For example, a composite material formed by dispersing a fibrous or particulate metal, glass, inorganic material, or the like into a resin film can be used for the substrate 670 and the like. For example, a composite material formed by dispersing a fibrous or particulate resin, organic material, or the like into an inorganic material can be used for the substrate 670 and the like.

A single-layer material or a material in which a plurality of layers are stacked can be used for the substrate 670 and the like. For example, a material in which a base, an insulating film that prevents diffusion of impurities contained in the base, and the like are stacked can be used for the substrate 670 and the like. Specifically, a material in which glass and one or a plurality of films that prevent diffusion of impurities contained in the glass and that are selected from a silicon oxide layer, a silicon nitride layer, a silicon oxynitride layer, and the like are stacked can be used for the substrate 670 and the like. Alternatively, a material in which a resin and a film for preventing diffusion of impurities that penetrate the resin, such as a silicon oxide film, a silicon nitride film, and a silicon oxynitride film are stacked can be used for the substrate 670 and the like.

Specifically, a resin film, a resin plate, a stack, or the like of polyester, polyolefin, polyamide, polyimide, polycarbonate, an acrylic resin, or the like can be used for the substrate 670 and the like.

Specifically, a material including polyester, polyolefin, polyamide (e.g., nylon or aramid), polyimide, polycarbonate, polyurethane, an acrylic resin, an epoxy resin, or a resin having a siloxane bond can be used for the substrate 670 and the like.

Specifically, polyethylene terephthalate (PET), polyethylene naphthalate (PEN), polyethersulfone (PES), acrylic, or the like can be used for the substrate 670 and the like.

Alternatively, paper, wood, or the like can be used for the substrate 670 and the like.

For example, a flexible substrate can be used as the substrate 670 and the like.

Note that a transistor, a capacitor, or the like can be directly formed on the substrate. Alternatively, a transistor, a capacitor, or the like can be formed over a substrate that is for use in manufacturing processes and withstands heat applied in the processes, and then can be transferred to the substrate 670 or the like. Accordingly, a transistor, a capacitor, or the like can be formed over a flexible substrate.

<<Substrate 770>>

For example, a light-transmitting material can be used for the substrate 770. Specifically, a material selected from the materials used for the substrate 670 can be used for the substrate 770. Specifically, a non-alkali glass which is polished to a thickness of approximately 0.7 mm or 0.1 mm can be used.

<<Structure Body KB1>>

For example, an organic material, an inorganic material, or a composite material of an organic material and an inorganic material can be used for the structure body KB1 or the like. Thus, components between which the structure body KB1 or the like is interposed can have a predetermined gap.

Specifically, for the structure body KB1 or the like, polyester, polyolefin, polyamide, polyimide, polycarbonate, polysiloxane, an acrylic resin, or the like, or a composite material of a plurality of kinds of resins selected from the above can be used. Alternatively, a photosensitive material may be used.

<<Sealant 705>>

For the sealant 705 or the like, an inorganic material, an organic material, a composite material of an inorganic material and an organic material, or the like can be used.

For example, an organic material such as a thermally fusible resin or a curable resin can be used for the sealant 705 or the like.

For the sealant 705 or the like, an organic material such as a reactive curable adhesive, a photo-curable adhesive, a thermosetting adhesive, and/or an anaerobic adhesive can be used.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealant 705 or the like.

<<Bonding Layer 605>>

For example, a material that can be used for the sealant 705 can be used for the bonding layer 605.

<<Insulating Film 621>>

For example, an insulating inorganic material, an insulating organic material, or an insulating composite material containing an inorganic material and an organic material can be used for the insulating film 621 or the like.

Specifically, an inorganic oxide film, an inorganic nitride film, an inorganic oxynitride film, or a material obtained by stacking any of these films can be used for the insulating film

621 or the like. For example, a film including any of a silicon oxide film, a silicon nitride film, a silicon oxynitride film, and an aluminum oxide film, or a film including a material obtained by stacking any of these films can be used for the insulating film 621 or the like.

Specifically, polyester, polyolefin, polyamide, polyimide, polycarbonate, polysiloxane, an acrylic resin, or a stacked or composite material including resins selected from these, or the like can be used for the insulating film 621 or the like. Alternatively, a photosensitive material may be used.

Thus, for example, steps due to components overlapping with the insulating film 621 can be eliminated.

<<Insulating Film 628>>

For example, a material that can be used for the insulating film 621 can be used for the insulating film 628 or the like. Specifically, a 1-µm-thick film containing polyimide can be used for the insulating film 628.

<<Second Insulating Film 601C>>

For example, the material that can be used for the insulating film 621 can be used for the second insulating film 601C. Specifically, a material containing silicon and oxygen can be used for the second insulating film 601C. Thus, impurity diffusion into the pixel circuit, the display element, or the like can be suppressed.

For example, a 200-nm-thick film containing silicon, oxygen, and nitrogen can be used as the second insulating film 601C.

Note that the second insulating film 601C includes the opening 691A, 691B, or 691C.

<<Wiring, Terminal, Conductive Film>>

A conductive material can be used for a wiring or the like. Specifically, the conductive material can be used for the signal line S1(*i*), the first scan line G1(*j*), the second scan line G2(*j*), the wiring CSCOM, the wiring ANO, the terminal 619B, the terminal 619C, the conductive film 611B, the conductive film 611C, or the like.

For example, an inorganic conductive material, an organic conductive material, a metal material, a conductive ceramic material, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese, or the like can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used for the wiring or the like.

Specifically, a conductive oxide such as indium oxide, indium tin oxide, indium zinc oxide, zinc oxide, or zinc oxide to which gallium is added can be used for the wiring or the like.

Specifically, a film containing graphene or graphite can be used for the wiring or the like.

For example, a film including graphene oxide is formed and is reduced, so that a film including graphene can be formed. As a reducing method, a method using heat, a method using a reducing agent, or the like can be employed.

Specifically, a conductive high molecule can be used for the wiring or the like.

<<First Conductive Film, Second Conductive Film>>

For example, the material that can be used for the wiring or the like can be used for the first conductive film or the second conductive film.

The first electrode 751(*i, j*), the wiring, or the like can be used for the first conductive film.

The conductive film 612B, the wiring, or the like of the transistor that can be used as the transistor SW1 can be used as the second conductive film.

<<Transistor SW1, Transistor SW2, Transistor M>>

For example, a bottom-gate transistor, a top-gate transistor, or the like can be used as the transistor SW1, the transistor SW2, the transistor M, or the like.

For example, a transistor using a semiconductor containing an element of Group 14 for a semiconductor film can be used. Specifically, a semiconductor containing silicon can be used for the semiconductor film. For example, single crystal silicon, polysilicon, microcrystalline silicon, amorphous silicon, or the like can be used for the semiconductor film of the transistor.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used as the transistor SW1, the transistor SW2, the transistor M, or the like. Specifically, a transistor using an oxide semiconductor for a semiconductor film 608 can be used as the transistor SW1, the transistor SW2, the transistor M, or the like.

Thus, a pixel circuit can hold an image signal for a longer time than a pixel circuit including a transistor that uses amorphous silicon for a semiconductor film. Specifically, the selection signal can be supplied with a frequency of lower than 30 Hz, preferably lower than 1 Hz, and further preferably less than once per minute while flickering is suppressed. Consequently, eyestrain on a user of the information processing device can be reduced, and power consumption for driving can be reduced.

The transistor that can be used as the transistor SW1 includes the semiconductor film 608 and the conductive film 604 having a region overlapping with the semiconductor film 608 (see FIG. 29B). Furthermore, the transistor that can be used as the transistor SW1 includes the conductive film 612A and the conductive film 612B.

Note that the conductive film 604 and the insulating film 606 serve as a gate and a gate insulating film, respectively. Furthermore, the conductive film 612A has one of a function as a source and a function as a drain, and the conductive film 612B has the other.

In addition, a transistor that includes the semiconductor film 608 provided between the conductive film 604 and the conductive film 624 can be used as the transistor M (see FIG. 29C).

A conductive film in which a 10-nm-thick film containing tantalum and nitrogen and a 300-nm-thick film containing copper are stacked in this order can be used as the conductive film 604.

A material in which a 400-nm-thick film containing silicon and nitrogen and a 200-nm-thick film containing silicon, oxygen, and nitrogen are stacked can be used for the insulating film 606.

A 25-nm-thick film containing indium, gallium, and zinc can be used as the semiconductor film 608.

A conductive film in which a 50-nm-thick film containing tungsten, a 400-nm-thick film containing aluminum, and a 100-nm-thick film containing titanium are stacked in this order can be used as the conductive film 612A or 612B.

<<Display Element 750($i, j$)>>

For example, a display element having a function of controlling transmission or reflection of light can be used as the display element 750($i, j$) or the like. For example, a combined structure of a liquid crystal element and a polarizing plate or a MEMS shutter display element can be used. The use of a reflective display element can reduce the power consumption of a display device. Specifically, a reflective liquid crystal display element can be used as the display element 750.

Specifically, a liquid crystal element driven in any of the following driving modes can be used: an in-plane-switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

For example, thermotropic liquid crystal, low-molecular liquid crystal, high-molecular liquid crystal, polymer dispersed liquid crystal, ferroelectric liquid crystal, anti-ferroelectric liquid crystal, or the like can be used. A liquid crystal material that exhibits a cholesteric phase, a smectic phase, a cubic phase, a chiral nematic phase, an isotropic phase, or the like can be used. Alternatively, a liquid crystal material that exhibits a blue phase can be used.

<<First Electrode 751($i, j$)>>

For example, the material of the wiring or the like can be used for the first electrode 751($i, j$). Specifically, a reflective film can be used for the first electrode 751($i, j$).

<<Reflective Film>>

For example, a material reflecting visible light can be used for the reflective film. Specifically, a material containing silver can be used for the reflective film. For example, a material containing silver, palladium, and the like or a material containing silver, copper, and the like can be used for the reflective film.

The reflective film reflects, for example, light passing through the layer 753 containing a liquid crystal material. This allows the display element 750($i, j$) to serve as a reflective liquid crystal element. Alternatively, a material with an uneven surface can be used for the reflective film. In that case, incident light can be reflected in various directions so that a white image can be displayed.

Note that one embodiment of the present invention is not limited to the structure in which the first electrode 751($i, j$) is used as the reflective film. For example, a structure in which the reflective film is positioned between the layer 753 containing a liquid crystal material and the first electrode 751($i, j$) can be used. Alternatively, a structure in which the first electrode 751($i, j$) having light-transmitting properties is positioned between the reflective film and the layer 753 containing a liquid crystal material can be used.

<<Opening 751H>>

If the ratio of the total area of the opening 751H to the total area except for the opening is too high, display performed using the display element 750($i, j$) is dark. If the ratio of the total area of the opening 751H to the total area except for the opening is too low, display performed using the display element 650($i, j$) is dark.

Also, if the area of the opening 751H in the reflective film is too small, light emitted from the display element 650 is not efficiently extracted.

The opening 751H may have a polygonal shape, a quadrangular shape, an elliptical shape, a circular shape, a cross-like shape, or the like. The opening 751H may also have a stripe shape, a slit-like shape, or a checkered pattern. The opening 751H may be positioned close to an adjacent pixel. Preferably, the opening 751H is positioned close to another pixel having a function of emitting light of the same color. In that case, a phenomenon in which light emitted from the display element 650 enters a coloring film of the adjacent pixel (also called cross talk), can be suppressed.

<<Second Electrode 752>>

For example, a material having a visible-light transmitting property and conductivity can be used for the second electrode 752.

For example, a conductive oxide, a metal film thin enough to transmit light, or a metal nanowire can be used as the second electrode 752.

Specifically, a conductive oxide containing indium can be used for the second electrode 752. Alternatively, a metal thin film with a thickness more than or equal to 1 nm and less than or equal to 10 nm can be used for the second electrode 752. Further alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

For example, the alignment films AF1 and AF2 can be formed with a material containing polyimide or the like. Specifically, it is possible to use a material formed to be aligned in a predetermined direction by a rubbing process or an optical alignment process.

For example, a film containing soluble polyimide can be used as the alignment film AF1 or AF2.

<<Coloring Film CF1>>

A material transmitting light of a predetermined color can be used for the coloring film CF1. Thus, the coloring film CF1 can be used as, for example, a color filter.

For example, a material transmitting light of blue, green, red, yellow, or white can be used for the coloring film CF1.

<<Light-Blocking Film BM>>

A material that prevents light transmission can be used for the light-blocking film BM. Thus, the light-blocking film BM can be used as, for example, a black matrix.

<<Insulating Film 771>>

For example, polyimide, epoxy resin, acrylic resin, or the like can be used for the insulating film 771.

<<Functional Film 770P>>

For example, a polarizing plate, a retardation plate, a diffusing film, an anti-reflective film, a condensing film, or the like can be used as the functional film 770P. Alternatively, a polarizing plate containing a dichromatic pigment can be used as the functional film 770P.

Alternatively, an antistatic film preventing the attachment of dust, a water repellent film suppressing the attachment of stain, a hard coat film suppressing generation of a scratch in use, or the like can be used as the functional film 770P.

<<Display Element 650(i, j)>>

For example, a light-emitting element can be used as the display element 650(i, j). Specifically, an organic electroluminescence element, an inorganic electroluminescence element, a light-emitting diode, or the like can be used for the display element 650(i, j).

For example, a stack body for emitting blue light, green light, or red light can be used as the layer 653(i) containing a light-emitting organic compound.

For example, a stack body extending linearly in the column direction along the signal line S1(i) can be used as the layer 653(i) containing a light-emitting organic compound. In addition, a stack body that extends linearly in the column direction along the signal line S1(i+1) and emits light of a color different from that of the layer 653(i) containing a light-emitting organic compound can be used as the layer 653(i+1) containing a light-emitting organic compound.

Alternatively, for example, a stack body for emitting white light can be used as the layer 653(i) containing a light-emitting organic compound and the layer 653(i+1) containing a light-emitting organic compound. Specifically, a stack of a layer containing a light-emitting organic compound containing a fluorescent material that emits blue light, and a layer containing a material that is other than the fluorescent material and that emits green light and red light, or a layer containing a material that is other than the fluorescent material and that emits yellow light can be used as the layer 653(i) containing a light-emitting organic compound and the layer 653(i+1) containing a light-emitting organic compound.

For example, a material that can be used for the wiring or the like can be used for the third electrode 651(i, j) or the fourth electrode 652.

For example, a material that transmits visible light and is selected from the materials used for the wiring or the like can be used for the third electrode 651(i, j).

Specifically, conductive oxide, indium-containing conductive oxide, indium oxide, indium tin oxide, indium zinc oxide, zinc oxide, zinc oxide to which gallium is added, or the like can be used for the third electrode 651(i, j). Alternatively, a metal film that is thin enough to transmit light can be used as the third electrode 651(i, j).

For example, a material that reflects visible light and is selected from the materials used for the wiring or the like can be used for the fourth electrode 652.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed at the same step as the transistor M can be used.

The transistor MD can have a structure different from that of the transistor used as the transistor SW1. Specifically, a transistor including the conductive film 624 can be used as the transistor MD (see FIG. 29C).

The semiconductor film 608 is positioned between the conductive film 604 and the conductive film 624, the insulating film 616 is positioned between the conductive film 624 and the semiconductor film 608, and the insulating film 606 is positioned between the semiconductor film 608 and the conductive film 604. For example, the conductive film 624 is electrically connected to a wiring supplying the same voltage as that supplied to the conductive film 604.

Note that the transistor MD can have the same structure as the transistor M.

<<Driver Circuit SD>>

For example, an integrated circuit can be used in the driver circuit SD. Specifically, an integrated circuit formed on a silicon substrate can be used as the driver circuit SD.

For example, a chip on glass (COG) method can be used to mount the driver circuit SD on a pad electrically connected to the pixel circuit 710C(i, j). Specifically, an anisotropic conductive film can be used to mount the integrated circuit on the pad.

Note that the pad can be formed in the same step as the terminal 619B or 619C.

Structure Example 2 of Display Device

Figures 31A, 31B:
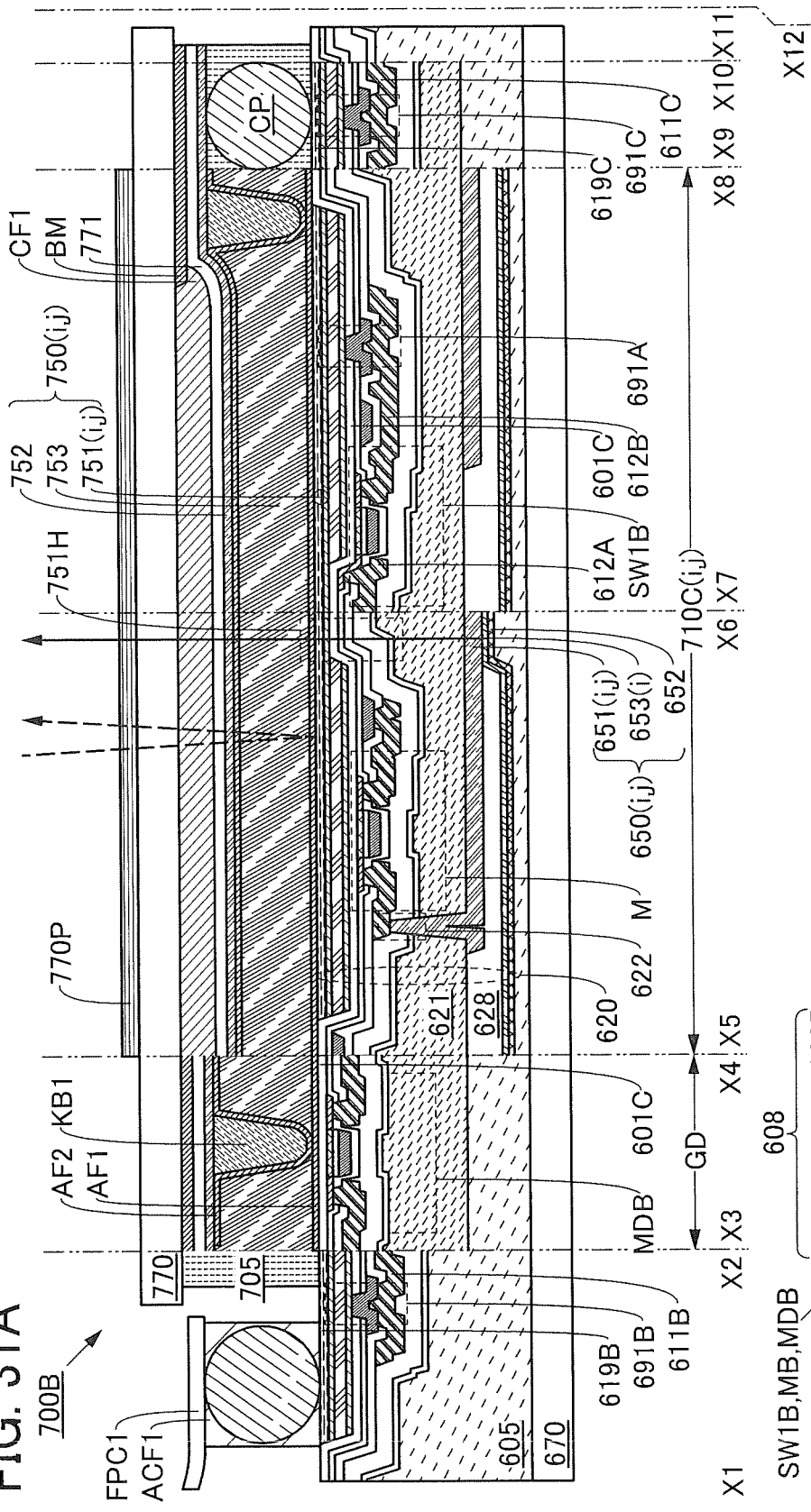
FIGS. 31A and 31B illustrate a structure of a display panel according to an embodiment.

FIGS. 31A and 31B illustrate the structure of a display device 700B of one embodiment of the present invention. FIG. 31A is a cross-sectional view taken along lines X1-X2, X3-X4, X5-X6, X7-X8, X9-X10, and X11-X12 in FIG. 27A. FIG. 31B is a cross-sectional view illustrating part of the display device.

Note that the display device 700B is different from the display device 700 in FIGS. 29A to 29C in including a top-gate transistor instead of the bottom-gate transistor. Described below are different structures, and the above description is referred to for similar structures.

<<Transistor SW1B, Transistor MB, Transistor MDB>>

A transistor that can be used as a transistor SW1B, and transistors MB and MDB include the conductive film 604 having a region overlapping with the insulating film 601C and the semiconductor film 608 having a region positioned between the insulating film 601C and the conductive film 604. Note that the conductive film 604 serves as a gate electrode (see FIG. 31B).

The semiconductor film 608 includes a first region 608A, a second region 608B, and a third region 608C. The first region 608A and the second region 608B do not overlap with the conductive film 604. The third region 608C lies between the first region 608A and the second region 608B and overlaps with the conductive film 604.

The transistor MDB includes the insulating film 606 between the third region 608C and the conductive film 604. Note that the insulating film 606 serves as a gate insulating film.

The first region 608A and the second region 608B have a lower resistivity than the third region 608C, and serve as a source region or a drain region.

Note that the first region 608A and the second region 608B can be formed in the semiconductor film 608 by, for example, a method for controlling the resistivity of the oxide semiconductor, which is described in detail in the end of this embodiment. Specifically, plasma treatment using a gas containing a rare gas can be employed.

Furthermore, for example, the conductive film 604 can be used as a mask, in which case the shape of part of the third region 608C can be the same as the shape of an end portion of the conductive film 604 in a self-aligned manner.

The transistor MDB includes the conductive films 612A and 612B which are in contact with the first region 608A and the second region 608B, respectively. The conductive films 612A and 612B serve as a source or a drain.

The transistor that can be formed in the same process as the transistor MDB can be used as the transistor MB.

<Method for Controlling Resistivity of Oxide Semiconductor>

The method for controlling the resistivity of an oxide semiconductor film will be described.

An oxide semiconductor film with a certain resistivity can be used for the semiconductor film 608 or the conductive film 624.

For example, the resistivity of an oxide semiconductor film can be controlled by a method for controlling the concentration of impurities such as hydrogen and water contained in the oxide semiconductor film and/or the oxygen vacancies in the film.

Specifically, plasma treatment can be used as a method for increasing or decreasing the concentration of impurities such as hydrogen and water and/or the oxygen vacancies in the film.

Specifically, plasma treatment using a gas containing one or more kinds selected from a rare gas (He, Ne, Ar, Kr, Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, an insulating film containing hydrogen is formed in contact with the oxide semiconductor film, and the hydrogen is diffused from the insulating film to the oxide semiconductor film, so that the oxide semiconductor film can have a high carrier density and a low resistivity.

For example, an insulating film with a hydrogen concentration of greater than or equal to $1 \times 10^{22}$ atoms/cm$^3$ is formed in contact with the oxide semiconductor film, in which case hydrogen can be effectively supplied to the oxide semiconductor film. Specifically, a silicon nitride film can be used as the insulating film formed in contact with the oxide semiconductor film.

Hydrogen contained in the oxide semiconductor film reacts with oxygen bonded to a metal atom to be water, and an oxygen vacancy is formed in a lattice from which oxygen is released (or a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Thus, the oxide semiconductor film can have a high carrier density and a low resistivity.

Specifically, an oxide semiconductor with a hydrogen concentration measured by secondary ion mass spectrometry (SIMS) of greater than or equal to $8 \times 10^{19}$ atoms/cm$^3$, preferably greater than or equal to $1 \times 10^{20}$ atoms/cm$^3$, more preferably greater than or equal to $5 \times 10^{20}$ atoms/cm$^3$ can be suitably used for the conductive film 624.

On the other hand, an oxide semiconductor with a high resistivity can be used for a semiconductor film where a channel of a transistor is formed, specifically, for the semiconductor film 608.

For example, an insulating film containing oxygen, i.e., an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8 \times 10^{11}$/cm$^3$, preferably lower than $1 \times 10^{11}$/cm$^3$, further preferably lower than $1 \times 10^{10}$/cm$^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, a transistor including the highly purified intrinsic or substantially highly purified intrinsic oxide semiconductor film has an extremely low off-state current; even when an element has a channel width of $1 \times 10^6$ μm and a channel length L of 10 μm, the off-state current can be lower than or equal to the measurement limit of a semiconductor parameter analyzer, that is, lower than or equal to $1 \times 10^{-13}$ A, at a voltage (drain voltage) between a source and a drain of from 1 V to 10 V.

The transistor including a channel region formed in the oxide semiconductor film that is a highly purified intrinsic or substantially highly purified intrinsic oxide semiconductor film can have a small change in electrical characteristics and high reliability.

Specifically, an oxide semiconductor has a hydrogen concentration which is measured by secondary ion mass spectrometry (SIMS) of lower than or equal to $2 \times 10^{20}$ atoms/cm$^3$, preferably lower than or equal to $5 \times 10^{19}$ atoms/cm$^3$, more preferably lower than or equal to $1 \times 10^{19}$ atoms/cm$^3$, more preferably lower than $5 \times 10^{18}$ atoms/cm$^3$, more preferably lower than or equal to $1 \times 10^{18}$ atoms/cm$^3$, more preferably lower than or equal to $5 \times 10^{17}$ atoms/cm$^3$, more preferably lower than or equal to $1 \times 10^{16}$ atoms/cm$^3$ can be favorably used for a semiconductor where a channel of a transistor is formed.

Note that an oxide semiconductor film that has a higher hydrogen concentration and/or a larger number of oxygen vacancies and that has a lower resistivity than the semiconductor film 608 is used as the conductive film 624.

Furthermore, a film whose hydrogen concentration is twice or more, preferably ten times or more that in the semiconductor film 608 can be used as in the conductive film 624.

Moreover, a film whose resistivity is higher than or equal to $1 \times 10^{-8}$ times and lower than $1 \times 10^{-1}$ times the resistivity of the semiconductor film 608 can be used as the conductive film 624.

Specifically, a film with a resistivity higher than or equal to $1 \times 10^{-3}$ Ωcm and lower than $1 \times 10^4$ Ωcm, preferably higher than or equal to $1 \times 10^{-3}$ Ωcm and lower than $1 \times 10^{-1}$ Ωcm can be used as the conductive film 624.

Embodiment 8

In this embodiment, an IC chip, an electronic component, an electronic device, and the like are described as examples of a semiconductor device.

Example of Manufacturing Method of Electronic Component

Figure 32A:
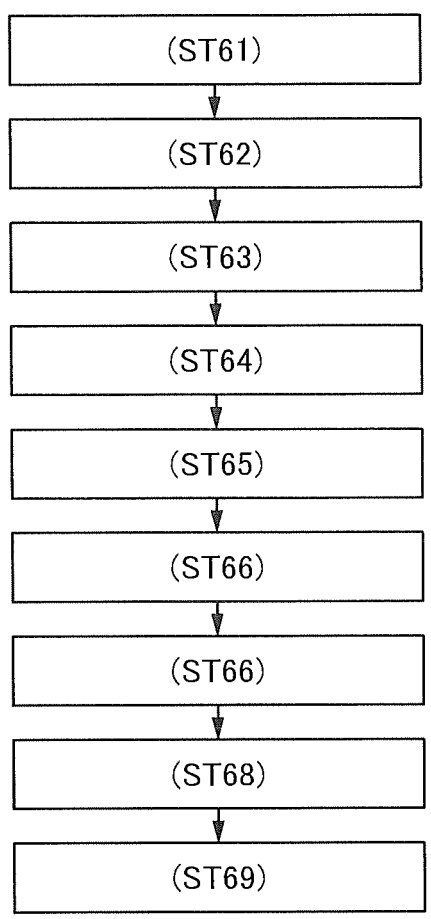
FIG. 32A is a flow chart showing an example of a manufacturing method of an electronic part.

FIG. 32A is a flow chart showing an example of a method for manufacturing an electronic component. The electronic component is also referred to as a semiconductor package or an IC package. This electronic component has a plurality of standards and names depending on a terminal extraction direction and a terminal shape. An example of the electronic component is described in this embodiment.

A semiconductor device including a transistor is completed by integrating detachable components on a printed circuit board through an assembly process (post-process). The post-process can be finished through steps in FIG. 32A. Specifically, after an element substrate obtained in a wafer process is completed (Step ST61), a rear surface of the substrate is ground. The substrate is thinned in this step to reduce warpage or the like of the substrate in the wafer process and to reduce the size of the electronic component. Next, the substrate is divided into a plurality of chips in a dicing step (step ST62).

Figure 32B:
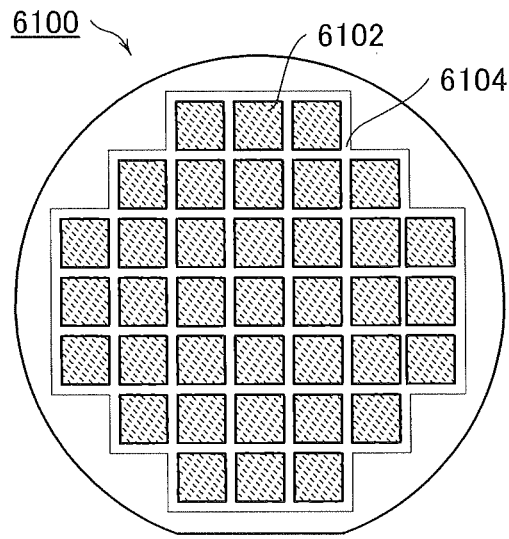
FIG. 32B is a top view of a semiconductor wafer.
Figure 32C:
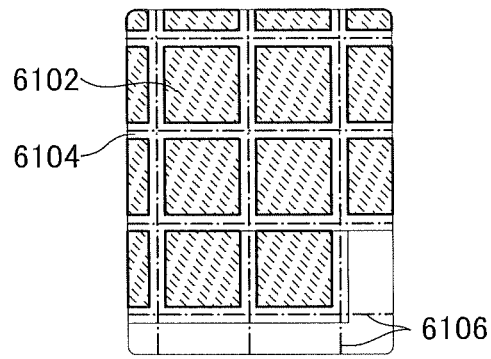
FIG. 32C is an enlarged view of a portion illustrated in FIG. 32B.

FIG. 32B is a top view illustrating a semiconductor wafer 6100 before a dicing process. FIG. 32C is an enlarged view of part of FIG. 32B. A plurality of circuit regions 6102 is provided in the semiconductor wafer 6100. A semiconductor device of one embodiment of the present invention (e.g., a memory, a timer, or a CPU) is provided in the circuit region 6102.

Figure 32D:
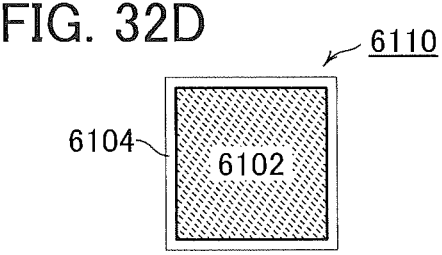
FIG. 32D is a schematic view illustrating a structure example of a chip.

The plurality of circuit regions 6102 are each surrounded by a separation region 6104. Separation lines (also referred to as "dicing lines") 6106 are set at a position overlapping with the separation regions 6104. In the step ST62, the semiconductor wafer 6100 can be cut along the separation lines 6106 into chips 6110 including the circuit regions 6102. FIG. 32D is an enlarged view of the chip 6110.

A conductive layer or a semiconductor layer may be provided in the separation regions 6104. Providing a conductive layer or a semiconductor layer in the separation regions 6104 relieves ESD that might be caused in a dicing step, preventing a decrease in the yield due to the dicing step. A dicing step is generally performed while pure water whose specific resistance is decreased by dissolution of a carbonic acid gas or the like is supplied to a cut portion, in order to cool down a substrate, remove swarf, and prevent electrification, for example. Providing a conductive layer or a semiconductor layer in the separation regions 6104 allows a reduction in the usage of the pure water. Therefore, the cost for manufacturing semiconductor devices can be reduced. Thus, semiconductor devices can be manufactured with improved productivity.

After the step ST62, the divided chips are separately picked up to be mounted on and bonded to a lead frame in a die bonding step (a step ST63). In the die bonding step, the chip is bonded to the lead frame by an appropriate method depending on a product, for example, bonding with a resin or a tape. In the die bonding step, the chip may be mounted on an interposer to be bonded. In a wire bonding step, lead of the lead frame is electrically connected to an electrode on the chip with a metal fine line (wire) (a step ST64). A silver line or a gold line can be used as the metal fine line. Either ball bonding or wedge bonding may be used as wire bonding.

A molding step is performed to seal the wire bonded chip with an epoxy resin or the like (a step ST65). With the molding step, the electronic component is filled with the resin, so that damage to a mounted circuit portion or wire due to mechanical external force can be reduced. Furthermore, degradation in characteristics due to moisture or dust can be reduced. The lead of the lead frame is plated. After that, the lead is cut and processed (a step ST66). This plating step prevents rust of the lead and facilitates soldering at the time of mounting the chip on a printed circuit board in a later step. Printing (marking) is performed on a surface of the package (a step ST67). Through an inspection step (a step ST68), the electronic component is completed (a step ST69). When the electronic component includes the semiconductor device described in the above embodiment, a low-power small electronic component can be provided.

Figure 32E:
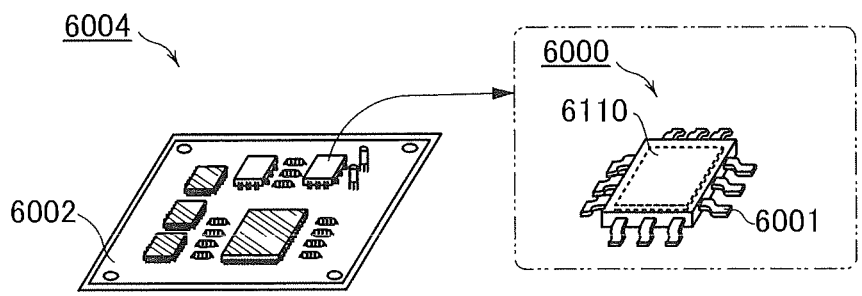
FIG. 32E is a schematic perspective view illustrating a structure example of an electronic part.

FIG. 32E is a schematic perspective view of the completed electronic component. FIG. 32E illustrates a schematic perspective view of a quad flat package (QFP) as an example of the electronic component. As illustrated in FIG. 32E, an electronic component 6000 includes a lead 6001 and a chip 6110.

The electronic component 6000 is mounted on a printed circuit board 6002, for example. When a plurality of electronic components 6000 are used in combination and electrically connected to each other over the printed circuit board 6002, the electronic components 6000 can be mounted on an electronic device. A completed circuit board 6004 is provided in the electronic device or the like. When an electronic device includes the electronic component 6000, the power consumption of the electronic device can be reduced. Alternatively, the electronic device can have smaller size.

Embodiment 9

In this embodiment, an oxide semiconductor transistor and the like are described.

Structure Example 1 of OS Transistor

FIG. 33A is a top view illustrating a structure example of an OS transistor. FIG. 33B is a cross-sectional view taken along line X1-X2 in FIG. 33A. FIG. 33C is a cross-sectional view taken along line Y1-Y2 in FIG. 33A. In some cases, the direction of line X1-X2 is referred to as a channel length direction, and the direction of line Y1-Y2 is referred to as a channel width direction. Accordingly, FIG. 33B illustrates a cross-sectional structure of the OS transistor in the channel length direction, and FIG. 33C illustrates a cross-sectional structure of the OS transistor in the channel width direction. Note that to clarify the device structure, FIG. 33A does not illustrate some components.

An OS transistor 501 is formed over an insulating surface, here, over an insulating layer 521. The OS transistor 501 is covered with insulating layers 528 and 529. The OS transistor 501 includes insulating layers 522 to 527, metal oxide layers 511 to 513, and conductive layers 550 to 553.

Note that an insulating layer, a metal oxide layer, a conductor, and the like in a drawing may have a single-layer structure or a stacked-layer structure. These layers can be formed by any of a variety of deposition methods such as a sputtering method, a molecular beam epitaxy (MBE) method, a pulsed laser ablation (PLA) method, a CVD method, and an atomic layer deposition (ALD) method. Examples of a CVD method include a plasma CVD method, a thermal CVD method, and a metal organic CVD method.

The metal oxide layers 511 to 513 are collectively referred to as an oxide layer 510. As illustrated in FIGS. 33B and 33C, the oxide layer 510 includes a portion where the metal oxide layer 511, the metal oxide layer 512, and the metal oxide layer 513 are stacked in that order. When the OS transistor 501 is on, a channel is mainly formed in the metal oxide layer 512 of the oxide layer 510.

A gate electrode of the OS transistor 501 is formed using the conductive layer 550. A pair of electrodes that functions as a source electrode and a drain electrode of the OS transistor 501 is formed using the conductive layers 551 and 552. A back gate electrode of the OS transistor 501 is formed using the conductive layer 553. The conductive layer 553 includes conductive layers 553a and 553b. Note that the OS transistor 501 does not necessarily include a back gate electrode. The same applies to an OS transistor 502 to be described later.

A gate insulating layer on a gate (front gate) side is formed using the insulating layer 527. A gate insulating layer on a back gate side is formed using a stack of the insulating layers 524 to 526. The insulating layer 528 is an interlayer insulating layer. The insulating layer 529 is a barrier layer.

The metal oxide layer 513 covers a stack of the metal oxide layers 511 and 512 and the conductive layers 551 and 552. The insulating layer 527 covers the metal oxide layer 513. The conductive layers 551 and 552 each include a region that overlaps with the conductive layer 550 with the metal oxide layer 513 and the insulating layer 527 positioned therebetween.

The conductive layers 551 and 552 are formed using a hard mask used for forming the stack of the metal oxide layers 511 and 512. For example, the metal oxide layers 511 and 512 and the conductive layers 551 and 552 can be formed through the following steps. A two-layer metal oxide film is formed. A conductive film is formed over the metal oxide film. This conductive film is etched, so that a hard mask is formed. With the use of this hard mask, the two-layer metal oxide film is etched to form the stack of the metal oxide layers 511 and 512. Then, the hard mask is etched to form the conductive layers 551 and 552. Since the conductive layers 551 and 552 are formed through these steps, the conductive layers 551 and 552 do not include regions that are in contact with side surfaces of the metal oxide layers 511 and 512.

<Conductive Layer>

Examples of a conductive material used for the conductive layers 550 to 553 include a semiconductor typified by polycrystalline silicon doped with an impurity element such as phosphorus; silicide such as nickel silicide; a metal such as molybdenum, titanium, tantalum, tungsten, aluminum, copper, chromium, neodymium, or scandium; and a metal nitride containing any of the above metals as its component (tantalum nitride, titanium nitride, molybdenum nitride, or tungsten nitride). A conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can be used.

With the use of a conductive material with a high work function for the conductive layer 550, it is possible to increase Vth of the OS transistor 501 and reduce cutoff current. For the conductive layer 550, a conductive material whose work function is preferably higher than or equal to 4.8 eV, further preferably higher than or equal to 5.0 eV, still further preferably higher than or equal to 5.2 eV, yet further preferably higher than or equal to 5.4 eV, still further preferably higher than or equal to 5.6 eV can be used. Examples of the conductive material with a high work function include molybdenum, molybdenum oxide, Pt, Pt silicide, Ni silicide, indium tin oxide, and an In—Ga—Zn oxide to which nitrogen is added.

Note that the cutoff current refers to drain current at a gate-source voltage of 0 V.

For example, the conductive layer 550 is a single layer of tantalum nitride or tungsten. Alternatively, in the case where the conductive layer 550 has a two-layer structure or a three-layer structure, the following combinations can be used: aluminum and titanium; titanium nitride and titanium; titanium nitride and tungsten; tantalum nitride and tungsten; tungsten nitride and tungsten; titanium, aluminum, and titanium; titanium nitride, aluminum, and titanium; and titanium nitride, aluminum, and titanium nitride. The conductor written first is used as a layer on the insulating layer 527 side.

The conductive layers 551 and 552 have the same layer structure. For example, in the case where the conductive layer 551 is a single layer, any of metals such as aluminum, titanium, chromium, nickel, copper, yttrium, zirconium, molybdenum, silver, tantalum, and tungsten, or an alloy containing any of these metals as its main component may be used. Alternatively, in the case where the conductive layer 551 has a two-layer structure or a three-layer structure layer, the following combinations can be used: titanium and aluminum; tungsten and aluminum; tungsten and copper; a copper-magnesium-aluminum alloy and copper; titanium and copper; titanium or titanium nitride, aluminum or copper, and titanium or titanium nitride; and molybdenum or molybdenum nitride, aluminum or copper, and molybdenum or molybdenum nitride. The conductor written first is used as a layer on the insulating layer 527 side.

For example, it is preferable that the conductive layer 553a be a conductive layer that has a hydrogen barrier property (e.g., a tantalum nitride layer) and that the conductive layer 553b be a conductive layer that has higher conductivity than the conductive layer 553a (e.g., tungsten). With such a structure, the conductive layer 553 functions as a wiring and has a function of preventing diffusion of hydrogen into the oxide layer 510.

<Insulator>

Examples of insulating materials used for the insulating layers 521 to 529 include aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, and aluminum silicate. The insulating layers 521 to 529 are formed using a single-layer structure or a stacked-layer structure of these insulating materials. The layers used for the insulating layers 521 to 529 may include a plurality of insulating materials.

Note that in this specification and the like, an oxynitride refers to a compound that contains more oxygen than nitrogen, and a nitride oxide refers to a compound that contains more nitrogen than oxygen.

In order to suppress the increase in oxygen vacancies in the oxide layer 510, the insulating layers 526 to 528 preferably include oxygen. Further preferably, at least one of the insulating layers 526 to 528 is formed using an insulating film from which oxygen is released by heating (hereinafter such an insulating film is referred to as an insulating film containing excess oxygen). When oxygen is supplied from the insulating film containing excess oxygen to the oxide layer 510, the oxygen vacancies in the oxide layer 510 can be compensated. Thus, reliability and electrical characteristics of the OS transistor 501 can be improved.

The insulating film containing excess oxygen is a film from which oxygen molecules at more than or equal to $1.0\times10^{18}$ molecules/cm$^3$ are released in thermal desorption spectroscopy (TDS) at a surface temperature of the film of higher than or equal to 100° C. and lower than or equal to 700° C., or higher than or equal to 100° C. and lower than or equal to 500° C. The amount of released oxygen molecules is preferably more than or equal to $3.0\times10^{20}$ molecules/cm$^3$.

The insulating film containing excess oxygen can be formed by performing treatment for adding oxygen to an insulating film. The treatment for adding oxygen can be performed by heat treatment in an oxygen atmosphere, ion implantation, ion doping, plasma immersion ion implantation, plasma treatment, or the like. As a gas for adding oxygen, an oxygen gas of $^{16}O_2$, $^{18}O_2$, or the like, a nitrous oxide gas, an ozone gas, or the like can be used.

The concentration of hydrogen in the insulating layers 521 to 529 is preferably low in order to prevent the increase in the concentration of hydrogen in the oxide layer 510. In particular, the concentration of hydrogen in the insulating layers 523 to 528 is preferably low. Specifically, the concentration of hydrogen is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$.

The concentration of nitrogen in the insulating layers 523 to 528 is preferably low in order to prevent the increase in the concentration of nitrogen in the oxide layer 510. Specifically, the concentration of nitrogen is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

The hydrogen concentration and the nitrogen concentration are measured by secondary ion mass spectrometry (SIMS).

In the OS transistor 501, the oxide layer 510 is preferably surrounded by an insulating layer with oxygen and hydrogen barrier properties (hereinafter such an insulating layer is referred to as a barrier layer). With such a structure, it is possible to suppress the release of oxygen from the oxide layer 510 and entry of hydrogen into the oxide layer 510; thus, the reliability and electrical characteristics of the OS transistor 501 can be improved.

For example, the insulating layer 529 functions as a barrier layer and at least one of the insulating layers 521, 522, and 524 functions as a barrier layer. The barrier layer can be formed using a material such as aluminum oxide, aluminum oxynitride, gallium oxide, gallium oxynitride, yttrium oxide, yttrium oxynitride, hafnium oxide, hafnium oxynitride, or silicon nitride.

In addition, a barrier layer may be provided between the oxide layer 510 and the conductive layer 550. Alternatively, a metal oxide layer that has oxygen and hydrogen barrier properties may be provided as the metal oxide layer 513.

The film thicknesses of the insulating layer 524, the insulating layer 525, and the insulating layer 526 are preferably reduced so that the threshold voltage of the OS transistor can be easily controlled with the voltage of the conductive layer 550. For example, the film thicknesses of the insulating layers 524 to 526 are each smaller than or equal to 50 nm. The film thicknesses of the insulating layers 524 to 526 are each preferably smaller than or equal to 30 nm, further preferably smaller than or equal to 10 nm, still further preferably smaller than or equal to 5 nm.

A structure example of the insulating layers 521 to 529 is described. In this example, each of the insulating layers 521, 522, 525, and 529 functions as a barrier layer. The insulating layers 526 to 528 are oxide layers containing excess oxygen. The insulating layer 521 is formed using silicon nitride. The insulating layer 522 is formed using aluminum oxide. The insulating layer 523 is formed using silicon oxynitride. The gate insulating layers (524 to 526) on the back gate side are formed using a stack of silicon oxide, aluminum oxide, and silicon oxide. The gate insulating layer (527) on the front gate side is formed using silicon oxynitride. The interlayer insulating layer (528) is formed using silicon oxide. The insulating layer 529 is formed using aluminum oxide.

<Metal Oxide Layer>

The thickness of each of the metal oxide layers 511 to 513 is larger than or equal to 3 nm and smaller than or equal to 500 nm, preferably larger than or equal to 3 nm and smaller than or equal to 100 nm, further preferably larger than or equal to 3 nm and smaller than or equal to 60 nm.

In order to reduce the off-state current of the OS transistor 501, for example, the energy gap of the metal oxide layer 512 is preferably large. The energy gap of the metal oxide layer 512 is greater than or equal to 2.5 eV and less than or equal to 4.2 eV, preferably greater than or equal to 2.8 eV and less than or equal to 3.8 eV, further preferably greater than or equal to 3 eV and less than or equal to 3.5 eV.

The oxide layer 510 is preferably a crystalline metal oxide layer, where at least the metal oxide layer 512 is preferably a crystalline metal oxide layer. The OS transistor 501 can have high reliability and favorable electrical characteristics.

As the oxide of the metal oxide layer 512, typically, an In—Ga oxide, an In—Zn oxide, or an In-M-Zn oxide (M is Al, Ga, Y, or Sn) can be used. The metal oxide layer 512 is not limited to the oxide layer containing indium. The metal oxide layer 512 can be formed using a Zn—Sn oxide, a Ga—Sn oxide, or a Zn—Mg oxide, for example. The metal oxide layers 511 and 513 can be formed using an oxide that is similar to the oxide of the metal oxide layer 512. The metal oxide layers 511 and 513 can be formed using a Ga oxide. In that case, the metal oxide layer 512 is preferably a metal oxide layer containing Ga.

When an interface level is formed at an interface between the metal oxide layer 512 and the metal oxide layer 511, a channel region is also formed in a region close to the interface; thus, the threshold voltage of the OS transistor 501 varies. It is preferable that the metal oxide layer 511 contain at least one of the metal elements contained in the metal oxide layer 512. Accordingly, an interface state is hardly formed at the interface between the metal oxide layer 512 and the metal oxide layer 511, and variations in the electrical characteristics of the OS transistor 501, such as the threshold voltage, can be reduced.

The metal oxide layer 513 preferably contains at least one of the metal elements contained in the metal oxide layer 512 because interface scattering is unlikely to occur at the interface between the metal oxide layer 512 and the metal oxide layer 513, and carrier transfer is not inhibited. Thus, the field-effect mobility of the OS transistor 501 can be increased.

It is preferable that the metal oxide layer 512 have the highest carrier mobility among the metal oxide layers 511 to 513. Accordingly, a channel can be formed in the metal oxide layer 512 that is apart from the insulating layers 526 and 527.

For example, in a metal oxide containing In such as an In-M-Zn oxide, carrier mobility can be increased by an increase in the In content. In the In-M-Zn oxide, the s orbital of heavy metal mainly contributes to carrier transfer, and when the indium content is increased, overlaps of the s orbitals of In atoms are increased; therefore, an oxide having a high content of indium has higher mobility than an oxide having a low content of indium. Therefore, an oxide having a high content of indium is used as an oxide semiconductor film, so that carrier mobility can be increased.

For example, the metal oxide layer 512 is formed using an In—Ga—Zn oxide, and the metal oxide layers 511 and 513 are formed using a Ga oxide. For example, in the case where the metal oxide layers 511 to 513 are formed using an In-M-Zn oxide, the metal oxide layer 511 is formed to have the highest In content among the metal oxide layers 511 to 513. In the case where the In-M-Zn oxide is formed by sputtering, the In content can be changed by a change in the atomic ratio of metal elements of a target.

For example, it is preferable that the atomic ratio of metal elements of a target used for depositing the metal oxide layer 512 be In:M:Zn=1:1:1, 3:1:2, or 4:2:4.1. For example, it is preferable that the atomic ratio of metal elements of a target used for depositing the metal oxide layers 511 and 513 be In:M:Zn=1:3:2 or 1:3:4. The atomic ratio of an In-M-Zn oxide deposited using a target of In:M:Zn=4:2:4.1 is approximately In:M:Zn=4:2:3.

In order that the OS transistor 501 have stable electrical characteristics, it is preferable to reduce the concentration of impurities in the oxide layer 510. In the metal oxide, hydrogen, nitrogen, carbon, silicon, and a metal element other than a main component are impurities. For example, hydrogen and nitrogen form donor levels to increase the carrier density, and silicon and carbon form impurity levels in the oxide semiconductor. The impurity levels serve as traps and might cause deterioration in the electric characteristics of the transistor.

For example, the oxide layer 510 includes a region where the concentration of silicon is lower than or equal to $2 \times 10^{18}$ atoms/cm$^3$, preferably lower than or equal to $2 \times 10^{17}$ atoms/cm$^3$. The same applies to the concentration of carbon in the oxide layer 510.

The oxide layer 510 includes a region where the concentration of alkali metal is lower than or equal to $1 \times 10^{18}$ atoms/cm$^3$, preferably lower than or equal to $2 \times 10^{16}$ atoms/cm$^3$. The same applies to the concentration of alkaline earth metal.

The oxide layer 510 includes a region where the concentration of nitrogen is lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, still further preferably lower than or equal to $5 \times 10^{17}$ atoms/cm$^3$.

The oxide layer 510 includes a region where the concentration of hydrogen is lower than $1 \times 10^{20}$ atoms/cm$^3$, preferably lower than $1 \times 10^{19}$ atoms/cm$^3$, further preferably lower than $5 \times 10^{18}$ atoms/cm$^3$, still further preferably lower than $1 \times 10^{18}$ atoms/cm$^3$.

The above-described concentrations of the impurities in the oxide layer 510 are measured by SIMS.

In the case where the metal oxide layer 512 contains oxygen vacancies, donor levels are formed by entry of hydrogen into sites of oxygen vacancies in some cases. As a result, the on-state current of the OS transistor 501 is decreased. Sites of oxygen vacancies become more stable by entry of oxygen than by entry of hydrogen. Thus, by decreasing oxygen vacancies in metal oxide layer 512, the on-state current of the OS transistor 501 can be increased in some cases. Consequently, preventing entry of hydrogen into sites of oxygen vacancies by a reduction in hydrogen in the metal oxide layer 512 is effective in improving on-state current characteristics.

Hydrogen contained in a metal oxide reacts with oxygen bonded to a metal atom to be water, and thus causes an oxygen vacancy, in some cases. Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, the OS transistor 501 is likely to be normally-on when the metal oxide layer 512 contains hydrogen because the metal oxide layer 512 includes a channel formation region. Accordingly, it is preferable that hydrogen in the metal oxide layer 512 be reduced as much as possible.

FIGS. 33A to 33C illustrate an example in which the oxide layer 510 has a three-layer structure; however, one embodiment of the present invention is not limited thereto. For example, the oxide layer 510 may have a two-layer structure without the metal oxide layer 511 or 513. Alternatively, the oxide layer 510 may have a four-layer structure in which any one of the oxide semiconductor layers described as the metal oxide layers 511 to 513 is provided below or over the metal oxide layer 511 or below or over the metal oxide layer 513. Alternatively, the oxide layer 510 may include one or more metal oxide layers that are similar to the metal oxide layers 511 to 513 at two or more of the following positions: between given layers in the oxide layer 510, over the oxide layer 510, and below the oxide layer 510.

<Energy Band Structure>

Figure 35:
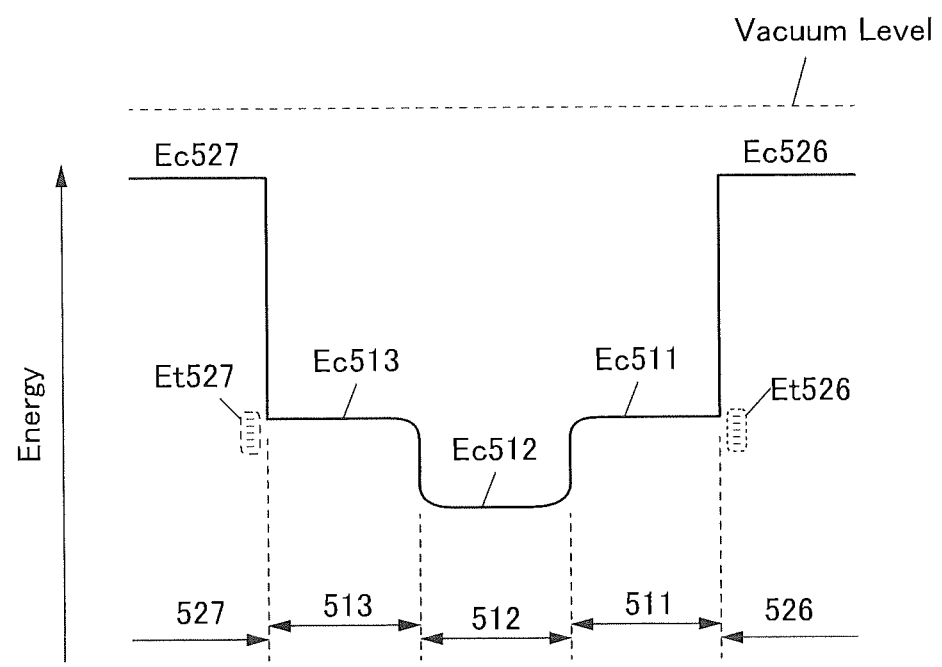
FIG. 35 is a schematic diagram of an energy band structure.

Effects of the stack of the metal oxide layers 511 to 513 are described with reference to FIG. 35. FIG. 35 is a schematic diagram showing the energy band structure of a channel formation region of the OS transistor 501. Although the OS transistor 501 is described here as an example, effects of the stack of the metal oxide layers 511 to 513 in the OS transistor 502 to be described later are similar to those in the OS transistor 501.

Here, Ec526, Ec511, Ec512, Ec513, and Ec527 indicate the energy at the conduction band minimum of the insulating layer 526, the metal oxide layer 511, the metal oxide layer 512, the metal oxide layer 513, and the insulating layer 527, respectively.

Here, a difference in energy between the vacuum level and the conduction band minimum (the difference is also referred to as electron affinity) corresponds to a value obtained by subtracting an energy gap from a difference in energy between the vacuum level and the valence band maximum (the difference is also referred to as an ionization potential). The energy gap can be measured using a spectroscopic ellipsometer (UT-300 manufactured by HORIBA JOBIN YVON S.A.S.). The difference in energy between the vacuum level and the valence band maximum can be measured using an ultraviolet photoelectron spectroscopy (UPS) device (VersaProbe manufactured by ULVAC-PHI, Inc.).

Since the insulating layers 526 and 527 are insulators, Ec526 and Ec527 are closer to the vacuum level than Ec511, Ec512, and Ec513 (i.e., the insulating layers 526 and 527 have lower electron affinities than the metal oxide layers 511 to 513).

The metal oxide layer 512 has a higher electron affinity than the metal oxide layers 511 and 513. For example, the difference in electron affinity between the metal oxide layers 511 and 512 and the difference in electron affinity between the metal oxide layers 512 and 513 are each greater than or equal to 0.07 eV and less than or equal to 1.3 eV. The difference in electron affinity between the metal oxide layers 511 and 512 and the difference in electron affinity between the metal oxide layers 512 and 513 are each preferably greater than or equal to 0.1 eV and less than or equal to 0.7 eV, further preferably greater than or equal to 0.15 eV and less than or equal to 0.4 eV. Note that the electron affinity is a difference in energy between the vacuum level and the conduction band minimum.

When voltage is applied to the gate electrode (the conductive layer 550) of the OS transistor 501, a channel is mainly formed in the metal oxide layer 512 having the highest electron affinity among the metal oxide layers 511 to 513.

An indium gallium oxide has low electron affinity and a high oxygen-blocking property. Therefore, the metal oxide layer 513 preferably includes an indium gallium oxide. The gallium atomic ratio [Ga/(In+Ga)] is, for example, higher than or equal to 70%, preferably higher than or equal to 80%, further preferably higher than or equal to 90%.

In some cases, there is a mixed region of the metal oxide layers 511 and 512 between the metal oxide layers 511 and 512. Furthermore, in some cases, there is a mixed region of the metal oxide layers 512 and 513 between the metal oxide layers 512 and 513. Because the mixed region has low interface state density, a stack of the metal oxide layers 511 to 513 (the oxide layer 510) has a band structure where energy at each interface and in the vicinity of the interface is changed continuously (continuous junction).

Electrons transfer mainly through the metal oxide layer 512 in the oxide layer 510 having such an energy band structure. Therefore, even when an interface state exists at an interface between the metal oxide layer 511 and the insulating layer 526 or an interface between the metal oxide layer 513 and the insulating layer 527, electron movement in the oxide layer 510 is less likely to be inhibited and the on-state current of the OS transistor 501 can be increased.

Although trap states Et526 and Et527 due to impurities or defects might be formed in the vicinity of the interface between the metal oxide layer 511 and the insulating layer 526 and the vicinity of the interface between the metal oxide layer 513 and the insulating layer 527 as illustrated in FIG. 35, the metal oxide layer 512 can be separated from the trap states Et526 and Et527 owing to the existence of the metal oxide layers 511 and 513.

Note that when a difference between Ec511 and Ec512 is small, an electron in the metal oxide layer 512 might reach the trap state Et526 by passing over the difference in energy. Since the electron is trapped at the trap state Et526, negative fixed charge is generated at the interface with the insulating film, causing the threshold voltage of the transistor to be shifted in a positive direction. The same applies to the case where a difference between Ec512 and Ec513 is small.

Each of the difference between Ec511 and Ec512 and the difference between Ec512 and Ec513 is preferably greater than or equal to 0.1 eV, further preferably greater than or equal to 0.15 eV so that a change in the threshold voltage of the OS transistor 501 can be reduced and the OS transistor 501 can have favorable electrical characteristics.

Structure Example 2 of OS Transistor

Figure 34A:
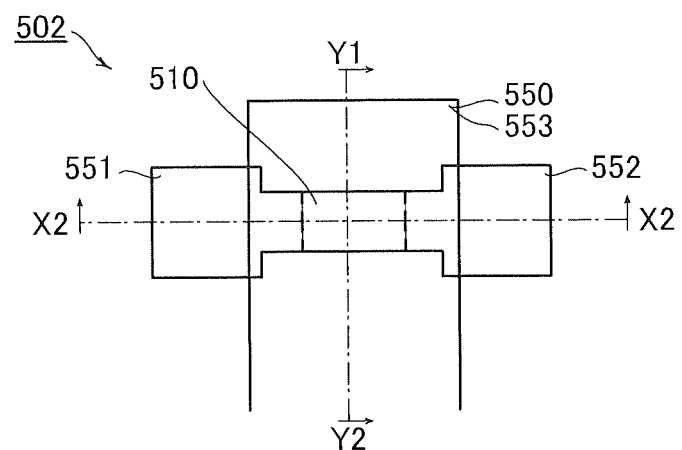
FIGS. 34A to 34C are a top view and cross-sectional views illustrating a structure example of an OS transistor.
Figures 34B, 34C:
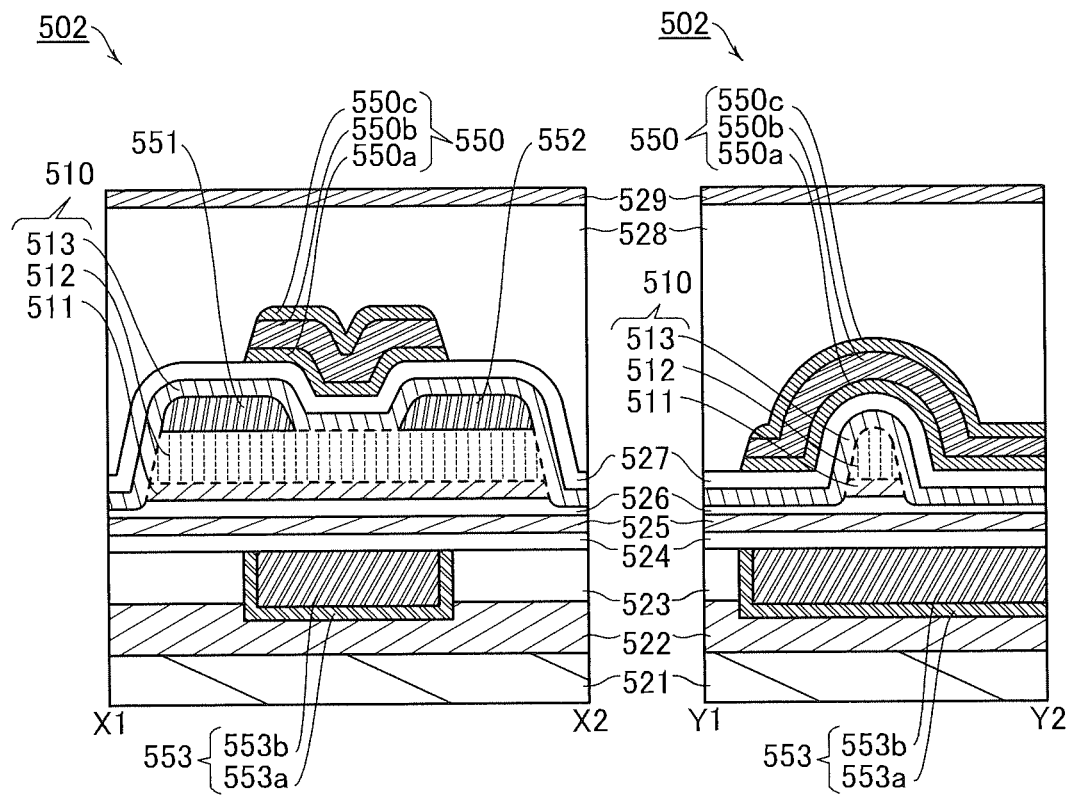

The OS transistor 502 in FIGS. 34A to 34C is a modification example of the OS transistor 501. The conductive layer 550 of the OS transistor 502 includes a conductive layer 550*a*, a conductive layer 550*b*, and a conductive layer 550*c*.

The conductive layer 550*a* is preferably formed by a thermal CVD method, an MOCVD method, or an ALD method. In particular, the conductive layer 550*a* is preferably formed by an ALD method. When the conductive layer 550*a* is formed by an ALD method or the like, plasma damage to the insulating layer 527 can be reduced. In addition, the conductive layer 550*a* is preferably formed by ALD or the like because coverage thereof can be improved. Therefore, it is possible to provide the highly reliable OS transistor 502.

The conductive layer 550*b* is formed using a material that has high conductivity, such as tantalum, tungsten, copper, or aluminum. The conductive layer 550*c* formed over the conductive layer 550*b* is preferably formed using a conductor that is unlikely to be oxidized, such as tungsten nitride. In the case where an oxide material from which oxygen is released is used for the insulating layer 528, the conductive layer 550 can be prevented from being oxidized by released oxygen. Thus, it is possible to suppress oxidation of the conductive layer 550 and efficiently supply oxygen released from the insulating layer 528 to the oxide layer 510.

When a conductor that is unlikely to be oxidized is used for the conductive layer 550*c* having a large contact area with the insulating layer 528 including an excess oxygen region, it is possible to suppress absorption of excess oxygen in the insulating layer 528 by the conductive layer 550. In addition, when a conductor with high conductivity is used for the conductive layer 550*b*, it is possible to provide the OS transistor 502 with low power consumption.

Embodiment 10

An application example of a display module including the display panel described in the above embodiments is described with reference to FIG. 36.

Figure 36:
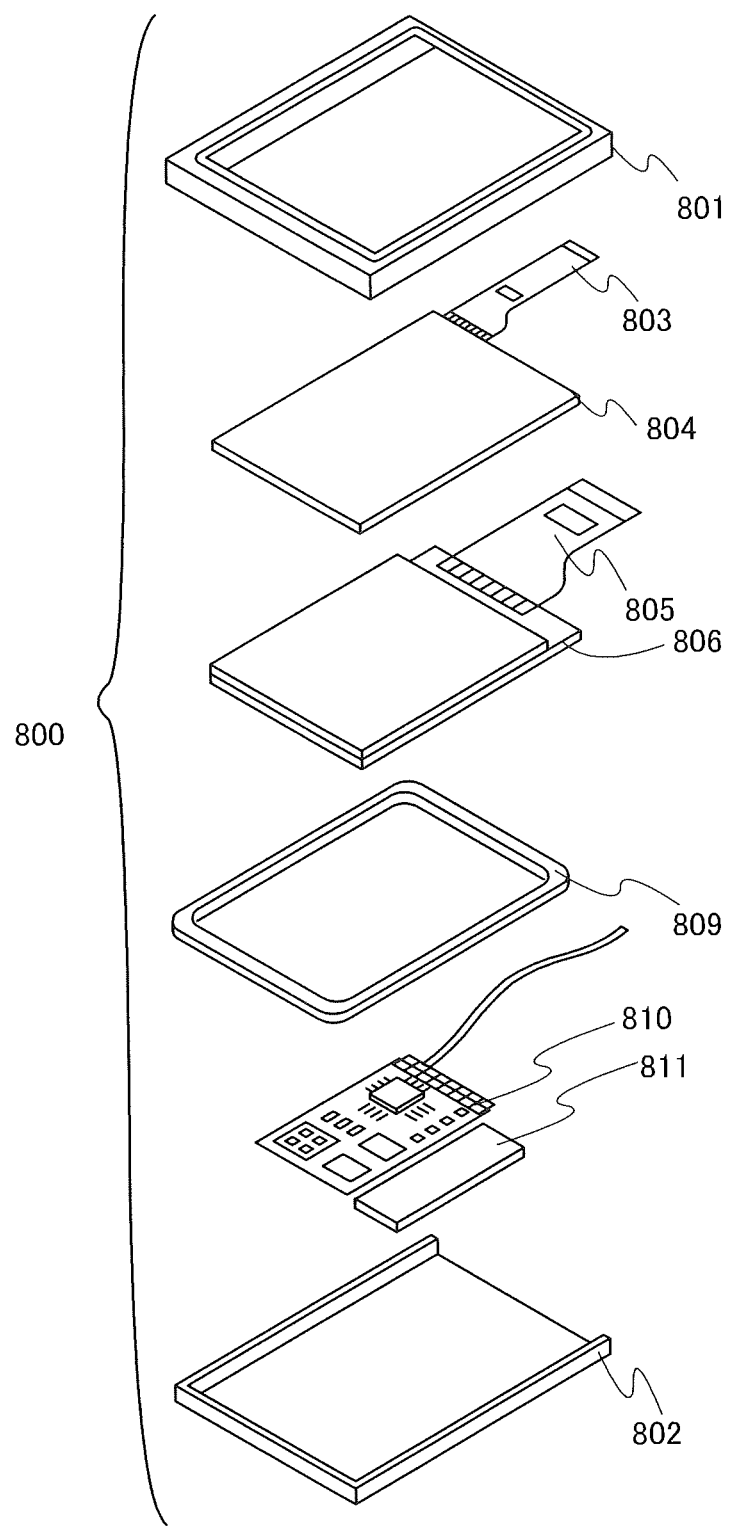
FIG. 36 illustrates an example of a display module.

In a display module 800 illustrated in FIG. 36, a touch panel 804 connected to an FPC 803, a display panel 806 connected to an FPC 805, a frame 809, a printed circuit board 810, and a battery 811 are provided between an upper cover 801 and a lower cover 802. Note that the battery 811, the touch panel 804, and the like are not provided in some cases.

The display panel described in the above embodiments can be used as the display panel 806 in FIG. 36.

The shapes and sizes of the upper cover 801 and the lower cover 802 can be changed as appropriate in accordance with the sizes of the touch panel 804 and the display panel 806.

The touch panel 804 can be a resistive touch panel or a capacitive touch panel and can be formed to overlap with the display panel 806. It is also possible to provide a touch panel function for a counter substrate (sealing substrate) of the display panel 806. Alternatively, a photosensor may be provided in each pixel of the display panel 806 so that an optical touch panel is obtained. Further alternatively, an electrode for a touch sensor may be provided in each pixel of the display panel 806 so that a capacitive touch panel is obtained. In such cases, the touch panel 804 can be omitted.

The upper cover 801 may include an optical path. Light generated from a light source mounted on the printed circuit board 810 passes through the optical path of the upper cover 801 and is emitted from one side of the upper cover. Then, whether there is light incident on the optical path of another side of the upper cover is determined by a photosensor mounted on the printed circuit board 810. Thus, the touch of a screen with a finger or a pen can be sensed. In this case, the display panel 806 or the counter substrate of the display panel 806 does not have to have a touch panel function; furthermore, the touch panel 804 can be omitted.

Figure 37A:
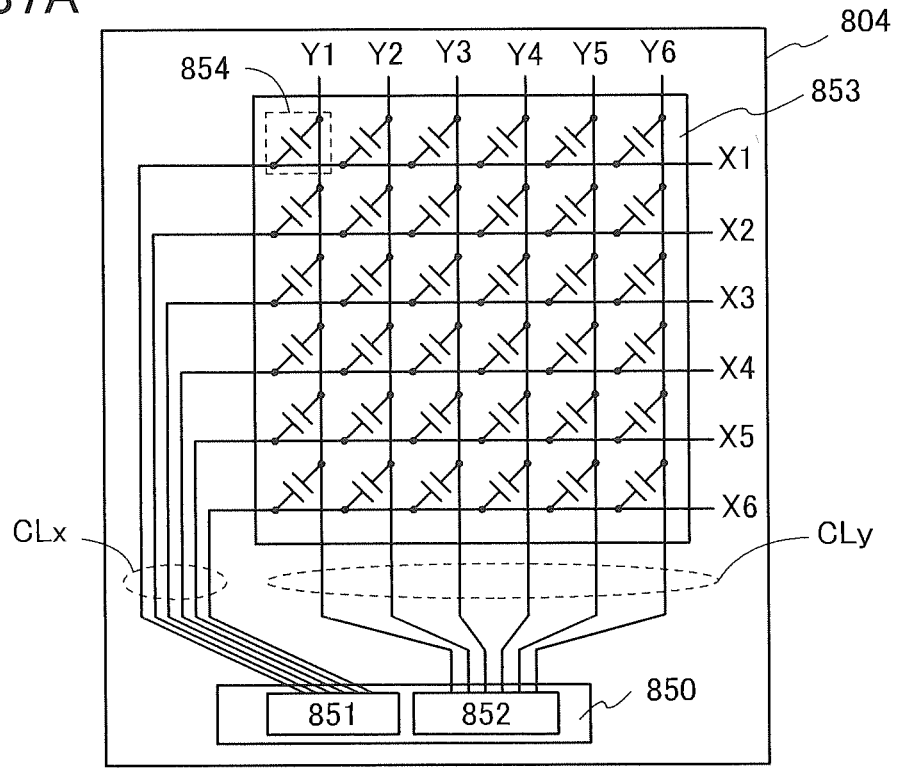
FIGS. 37A and 37B are schematic views each illustrating a structure example of a touch panel.

FIG. 37A is a schematic diagram illustrating a structure example where the touch panel 804 is a mutual capacitive touch sensor. In FIG. 37A, as an example, six wirings X1 to X6 represent wirings CLx to which a pulse voltage is applied, and six wirings Y1 to Y6 represent wirings CLy which detect changes in current. The number of wirings is not limited to those illustrated in FIG. 37A. FIG. 37A also illustrates a capacitor 854 that is formed with the wiring CLx and the wiring CLy overlapping with each other or being provided close to each other.

The wirings CLx and the wirings CLy are electrically connected to an IC 850. The IC 850 includes a driver circuit 851 and a detecting circuit 852.

The driver circuit 851 is, for example, a circuit for sequentially applying a pulse voltage to the wirings X1 to X6. By applying a pulse voltage to the wirings X1 to X6, an electric field is generated between the wirings CLx and CLy of the capacitors 854. With a pulse voltage, current flows through the capacitor 854. An electric field generated between the wirings is changed by being blocked, for example, when a finger or a stylus touches the touch sensor. That is, for example, by touch with a finger or a stylus, the capacitance of the capacitor 854 is changed. By utilizing the change in capacitance caused by touch with a finger or a stylus as described above, the approach or contact of an object can be detected.

The detecting circuit 852 is a circuit for detecting changes in current flowing through the wirings Y1 to Y6 that are caused by the changes in capacitance of the capacitors 854. No change in the current values of the wirings Y1 to Y6 is detected when there is no approach or contact of an object, whereas a decrease in the current value is detected when capacitance is decreased owing to the approach or contact of an object. In order to detect a change in current, the total amount of current may be detected. In that case, an integrator circuit or the like may be used to detect the total amount of current. Alternatively, the peak value of current may be detected. In that case, current may be converted into voltage, and the peak value of voltage may be detected.

Although the driver circuit 851 and the detecting circuit 852 are formed in the same IC in FIG. 37A, the driver circuit 851 and the detecting circuit 852 may be formed in separate ICs. The detecting circuit 852 easily malfunctions due to the influence of noise, while the driver circuit 851 might be a generation source of noise. The detecting circuit 852 can be prevented from malfunctioning by being formed in an IC different from an IC in which the driver circuit 851 is formed.

The driver circuit 851, the detecting circuit 852, and a driver circuit of the display panel 806 may be formed in one IC, which results in reduction in proportion of cost of an IC in the cost of the whole display module.

Figure 37B:
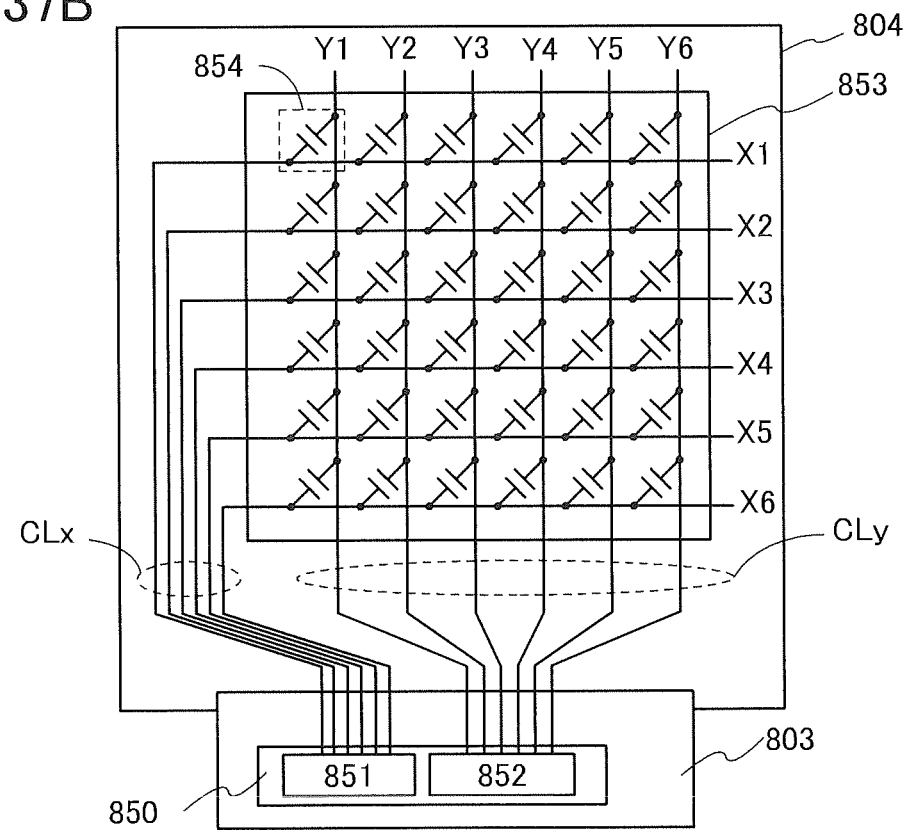

The IC 850 is provided in the touch panel 804 in FIG. 37A; however, the IC 850 may be provided in the FPC 803. FIG. 37B is a schematic view illustrating the case.

Description is continued with reference to FIG. 36.

The frame 809 protects the display panel 806 and functions as an electromagnetic shield for blocking electromagnetic waves generated by the operation of the printed circuit board 810. The frame 809 may also function as a radiator plate.

The printed circuit board 810 is provided with a power supply circuit and a signal processing circuit for outputting a video signal and a clock signal. Furthermore, the printed circuit board 810 may be provided with a light source and a photosensor for touch sensing. The wavelength of light from the light source is preferably longer than 780 nm, further preferably longer than 1.6 µm. The photosensor is configured to sense light having a wavelength in a particular range. As a power source for supplying power to the power supply circuit, an external commercial power source or a separate power source using the battery 811 may be used. The battery 811 can be omitted in the case of using a commercial power source.

The display module 800 may be additionally provided with a polarizing plate, a retardation plate, a prism sheet, or the like.

Embodiment 11

In this embodiment, electronic devices and lighting devices of one embodiment of the present invention will be described with reference to drawings.

A light-emitting device, a display device, a semiconductor device, or the like which is thin and lightweight and has a curved surface or flexibility can be manufactured by using a high-definition display portion including subpixels according to one embodiment of the present invention. By using the light-emitting device, the display device, the semiconductor device, or the like to which one embodiment of the present invention is applied, an electronic device or a lighting device which is thin and lightweight and has a curved surface or flexibility can be manufactured.

Examples of electronic devices include a television set (also referred to as a television or a television receiver), a monitor of a computer or the like, a camera such as a digital camera or a digital video camera, a digital photo frame, a mobile phone (also referred to as a cellular phone or a mobile phone device), a portable game console, a portable information terminal, an audio reproducing device, and a large-sized game machine such as a pachinko machine.

The electronic device or the lighting device of one embodiment of the present invention has flexibility and therefore can be incorporated along a curved inside/outside wall surface of a house or a building or a curved interior/exterior surface of a car.

The electronic device of one embodiment of the present invention may include a secondary battery. It is preferable that the secondary battery be capable of being charged by contactless power transmission.

Examples of the secondary battery include a lithium ion secondary battery such as a lithium polymer battery using a gel electrolyte (lithium ion polymer battery), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display an image, data, or the like on a display portion. When the electronic device includes the antenna and a secondary battery, the antenna may be used for contactless power transmission.

FIGS. 38A, 38B, 38C1, 38C2, 38D, and 38E illustrate examples of electronic devices each including a display portion 7000 with a curved surface. The display surface of the display portion 7000 is curved, and images can be displayed on the curved display surface. The display portion 7000 may be flexible.

The display portion 7000 includes the light-emitting device, display device, or input/output device manufactured using the high-resolution display portion including subpixels of one embodiment of the present invention.

One embodiment of the present invention makes it possible to provide an electronic device having a curved display portion.

FIG. 38A illustrates an example of a mobile phone. A mobile phone 7100 includes a housing 7101, the display portion 7000, operation buttons 7103, an external connection port 7104, a speaker 7105, a microphone 7106, and the like.

The mobile phone 7100 illustrated in FIG. 38A includes a touch sensor in the display portion 7000. Operations such as making a call and inputting a letter can be performed by touch on the display portion 7000 with a finger, a stylus, or the like.

With the operation buttons 7103, power ON or OFF can be switched. In addition, types of images displayed on the display portion 7000 can be switched; for example, switching images from a mail creation screen to a main menu screen is performed with the operation button 7103.

FIG. 38B illustrates an example of a television set. In a television set 7200, the display portion 7000 is incorporated in a housing 7201. Here, the housing 7201 is supported by a stand 7203.

The television set 7200 illustrated in FIG. 38B can be operated with an operation switch of the housing 7201 or a separate remote controller 7211. The display portion 7000 may include a touch sensor, and can be operated by touch on the display portion 7000 with a finger or the like. The remote controller 7211 may be provided with a display portion for displaying data output from the remote controller 7211. With operation keys or a touch panel of the remote controller 7211, channels and volume can be controlled and images displayed on the display portion 7000 can be controlled.

Note that the television set 7200 is provided with a receiver, a modem, or the like. A general television broadcast can be received with the receiver. When the television set is connected to a communication network with or without wires via the modem, one-way (from a transmitter to a receiver) or two-way (between a transmitter and a receiver or between receivers) data communication can be performed.

FIGS. 38C1, 38C2, 38D, and 38E illustrate examples of portable information terminals. Each of the portable information terminals includes a housing 7301 and the display portion 7000. Each of the portable information terminals may also include an operation button, an external connection port, a speaker, a microphone, an antenna, a battery, or the like. The display portion 7000 is provided with a touch sensor. An operation of the portable information terminal can be performed by touch on the display portion 7000 with a finger, a stylus, or the like.

FIG. 38C1 is a perspective view of a portable information terminal 7300. FIG. 38C2 is a top view of the portable information terminal 7300. FIG. 38D is a perspective view of a portable information terminal 7310. FIG. 38E is a perspective view of a portable information terminal 7320.

Each of the portable information terminals illustrated in this embodiment functions as, for example, one or more of a telephone set, a notebook, and an information browsing system. Specifically, each of the portable information terminals can be used as a smartphone. Each of the portable information terminals illustrated in this embodiment is capable of executing, for example, a variety of applications such as mobile phone calls, e-mailing, reading and editing texts, music reproduction, Internet communication, and a computer game.

The portable information terminals 7300, 7310, and 7320 can each display characters, image information, and the like on its plurality of surfaces. For example, as illustrated in FIGS. 38C1 and 38D, three operation buttons 7302 can be displayed on one surface, and information 7303 indicated by a rectangle can be displayed on another surface. FIGS. 38C1 and 38C2 illustrate an example in which information is displayed at the top of the portable information terminal. FIG. 38D illustrates an example in which information is displayed on the side of the portable information terminal. Information may be displayed on three or more surfaces of the portable information terminal. FIG. 38E illustrates an example in which information 7304, information 7305, and information 7306 are displayed on different surfaces.

Examples of the information include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed instead of the information.

For example, a user of the portable information terminal 7300 can see the display (here, the information 7303) with the portable information terminal 7300 put in a breast pocket of his/her clothes.

Specifically, a caller's phone number, name, or the like of an incoming call is displayed in the position that can be seen from above the portable information terminal 7300. Thus, the user can see the display without taking out the portable information terminal 7300 from the pocket and decide whether to answer the call.

FIGS. 38F to 38H each illustrate an example of a lighting device having a curved light-emitting portion.

The light-emitting portion included in the lighting device illustrated in each of FIGS. 38F to 38H includes the light-emitting device manufactured using one embodiment of the present invention.

One embodiment of the present invention makes it possible to provide a lighting device having a curved light-emitting portion.

A lighting device 7400 illustrated in FIG. 38F includes a light-emitting portion 7402 with a wave-shaped light-emitting surface and thus is a good-design lighting device.

A light-emitting portion 7412 included in a lighting device 7410 illustrated in FIG. 38G has two convex-curved light-emitting portions symmetrically placed. Thus, all directions can be illuminated with the lighting device 7410 as a center.

A lighting device 7420 illustrated in FIG. 38H includes a concave-curved light-emitting portion 7422. This is suitable for illuminating a specific range because light emitted from the light-emitting portion 7422 is collected to the front of the lighting device 7420. In addition, with this structure, a shadow is less likely to be produced, for example.

The light-emitting portion included in each of the lighting devices 7400, 7410, and 7420 may be flexible. The light-emitting portion may be fixed on a plastic member, a movable frame, or the like so that a light-emitting surface of the light-emitting portion can be bent freely depending on the intended use.

The lighting devices 7400, 7410, and 7420 each include a stage 7401 provided with an operation switch 7403 and a light-emitting portion supported by the stage 7401.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a concave shape, whereby a particular area can be brightly illuminated, or the light-emitting surface is curved to have a convex shape, whereby a whole room can be brightly illuminated.

FIGS. 39A1, 39A2, 39B, 39C, 39D, 39E, 39F, 39G, 39H, and 39I each illustrate an example of a portable information terminal including a display portion 7001 having flexibility.

The display portion 7001 includes the light-emitting device, display device, or input/output device manufactured using the high-resolution display portion including subpixels of one embodiment of the present invention. For example, a light-emitting device, a display device, or an input/output device that can be bent with a radius of curvature of greater than or equal to 0.01 mm and less than or equal to 150 mm can be used. The display portion 7001 may include a touch sensor so that the portable information terminal can be operated by touch on the display portion 7001 with a finger or the like.

One embodiment of the present invention makes it possible to provide an electronic device including a display portion having flexibility.

FIGS. 39A1 and 39A2 are a perspective view and a side view, respectively, illustrating an example of the portable information terminal. A portable information terminal 7500 includes a housing 7501, the display portion 7001, a display portion tab 7502, operation buttons 7503, and the like.

The portable information terminal 7500 includes a rolled flexible display portion 7001 in the housing 7501. The display portion 7001 can be pulled out by using the display portion tab 7502.

The portable information terminal 7500 can receive a video signal with a control portion incorporated therein and can display the received video on the display portion 7001. The portable information terminal 7500 incorporates a battery. A terminal portion for connecting a connector may be included in the housing 7501 so that a video signal and power can be directly supplied from the outside with a wiring.

By pressing the operation buttons 7503, power ON/OFF, switching of displayed videos, and the like can be performed. Although FIGS. 39A1, 39A2, and 39B illustrate an example in which the operation buttons 7503 are positioned on a side surface of the portable information terminal 7500, one embodiment of the present invention is not limited thereto. The operation buttons 7503 may be placed on a display surface (a front surface) or a rear surface of the portable information terminal 7500.

FIG. 39B illustrates the portable information terminal 7500 in a state where the display portion 7001 is pulled out. Images can be displayed on the display portion 7001 in this state. In addition, the portable information terminal 7500 may perform different displays in the state where part of the display portion 7001 is rolled as illustrated in FIG. 39A1 and in the state where the display portion 7001 is pulled out as illustrated in FIG. 39B. For example, in the state illustrated in FIG. 39A1, the rolled portion of the display portion 7001 is put in a non-display state, which results in a reduction in power consumption of the portable information terminal 7500.

Note that a reinforcement frame may be provided for a side portion of the display portion 7001 so that the display portion 7001 has a flat display surface when pulled out.

Note that in addition to this structure, a speaker may be provided for the housing so that sound is output with an audio signal received together with a video signal.

FIGS. 39C to 39E illustrate an example of a foldable portable information terminal. FIG. 39C illustrates a portable information terminal 7600 that is opened. FIG. 39D illustrates the portable information terminal 7600 that is being opened or being folded. FIG. 39E illustrates the portable information terminal 7600 that is folded. The portable information terminal 7600 is highly portable when folded, and is highly browsable when opened because of a seamless large display area.

The display portion 7001 is supported by three housings 7601 joined together by hinges 7602. By folding the portable information terminal 7600 at a connection portion between two housings 7601 with the hinges 7602, the portable information terminal 7600 can be reversibly changed in shape from an opened state to a folded state.

FIGS. 39F and 39G illustrate an example of a foldable portable information terminal. FIG. 39F illustrates a portable information terminal 7650 that is folded so that the display portion 7001 is on the inside. FIG. 39G illustrates the portable information terminal 7650 that is folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated and damaged.

FIG. 39H illustrates an example of a flexible portable information terminal. A portable information terminal 7700 includes a housing 7701 and the display portion 7001. The portable information terminal 7700 may further include buttons 7703a and 7703b which serve as input means, speakers 7704a and 7704b which serve as sound output means, an external connection port 7705, a microphone 7706, or the like. A flexible battery 7709 can be included in the portable information terminal 7700. The battery 7709 may be provided to overlap with the display portion 7001, for example.

The housing 7701, the display portion 7001, and the battery 7709 are flexible. Thus, it is easy to curve the portable information terminal 7700 into a desired shape and to twist the portable information terminal 7700. For example, the portable information terminal 7700 can be folded so that the display portion 7001 is on the inside or on the outside. The portable information terminal 7700 can be used in a rolled state. Since the housing 7701 and the display portion 7001 can be transformed freely in this manner, the portable information terminal 7700 is less likely to be broken even when the portable information terminal 7700 falls down or external stress is applied to the portable information terminal 7700.

The portable information terminal 7700 is lightweight and therefore can be used conveniently in various situations. For example, the portable information terminal 7700 can be used in the state where the upper portion of the housing 7701 is suspended by a clip or the like, or in the state where the housing 7701 is fixed to a wall by magnets or the like.

FIG. 39I illustrates an example of a wrist-watch-type portable information terminal. A portable information terminal 7800 includes a band 7801, the display portion 7001, an input/output terminal 7802, operation buttons 7803, and the like. The band 7801 has a function as a housing. A flexible battery 7805 can be included in the portable information terminal 7800. The battery 7805 may be provided to overlap with the display portion 7001 or the band 7801, for example.

The band 7801, the display portion 7001, and the battery 7805 have flexibility. Thus, the portable information terminal 7800 can be easily curved to have a desired shape.

With the operation buttons 7803, a variety of functions such as time setting, ON/OFF of the power, ON/OFF of wireless communication, setting and cancellation of silent mode, and setting and cancellation of power saving mode can be performed. For example, the functions of the operation buttons 7803 can be set freely by the operating system incorporated in the portable information terminal 7800.

By touch on an icon 7804 displayed on the display portion 7001 with a finger or the like, application can be started.

The portable information terminal 7800 can employ near field communication that is a communication method based on an existing communication standard. In that case, for example, mutual communication between the portable information terminal 7800 and a headset capable of wireless communication can be performed, and thus hands-free calling is possible.

The portable information terminal 7800 may include the input/output terminal 7802. In the case where the input/output terminal 7802 is included in the portable information terminal 7800, data can be directly transmitted to and received from another information terminal via a connector. Charging through the input/output terminal 7802 is also possible. Note that charging of the portable information terminal described as an example in this embodiment can be performed by contactless power transmission without using the input/output terminal.

Figure 40A:
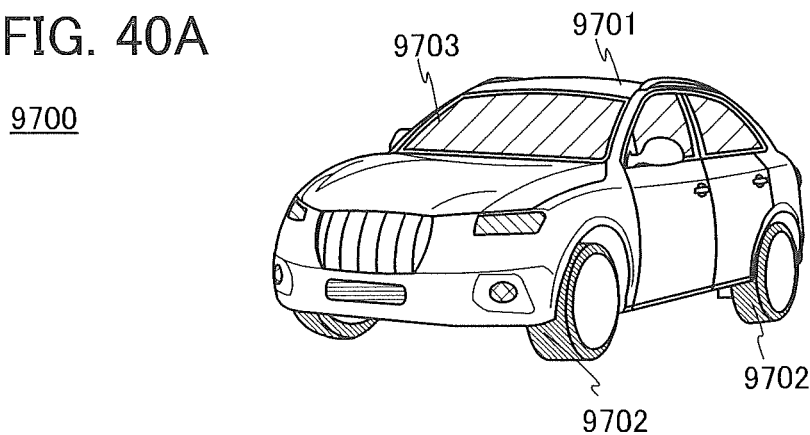
FIGS. 40A to 40E illustrate examples of an electronic device.
Figure 40B:
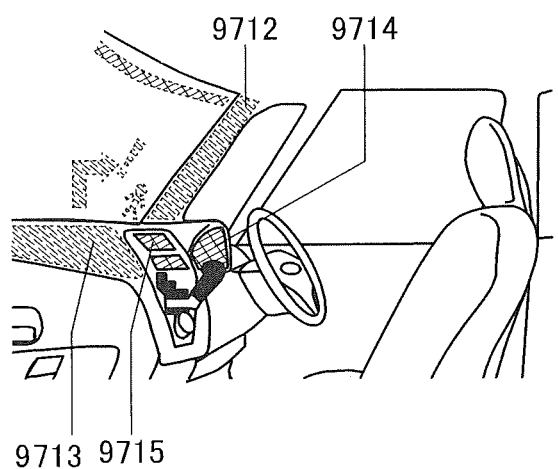

FIG. 40A is an external view of an automobile 9700. FIG. 40B illustrates a driver's seat of the automobile 9700. The automobile 9700 includes a car body 9701, wheels 9702, a windshield 9703, and the like. The light-emitting device, display device, input/output device, or the like manufactured using one embodiment of the present invention can be used in a display portion or the like of the automobile 9700. For example, the light-emitting device or the like to which one embodiment of the present invention is applied can be used in display portions 9710 to 9715 illustrated in FIG. 40B.

The display portion 9712 is a display device provided on a pillar portion. For example, the display portion 9712 can compensate for the view hindered by the pillar portion by showing an image taken by an imaging unit provided on the car body. The display portion 9713 is a display device provided on the dashboard. For example, the display portion 9713 can compensate for the view hindered by the dashboard portion by showing an image taken by an imaging unit provided on the car body. That is, showing an image taken by an imaging unit provided on the outside of the car body leads to elimination of blind areas and enhancement of safety. In addition, showing an image so as to compensate for the area which a driver cannot see makes it possible for the driver to confirm safety easily and comfortably.

Figure 40C:
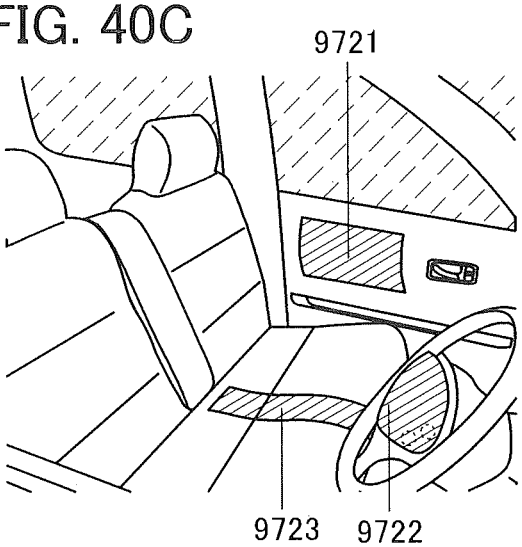

FIG. 40C illustrates the inside of an automobile in which a bench seat is used as a driver seat and a front passenger seat. A display portion 9721 is a display device provided in a door portion. For example, the display portion 9721 can compensate for the view hindered by the door portion by showing an image taken by an imaging unit provided on the car body. A display portion 9722 is a display device provided in a steering wheel. A display portion 9723 is a display device provided in the middle of a seating face of the bench seat. Note that the display device can be used as a seat heater by providing the display device on the seating face or backrest and by using heat generated by the display device as a heat source.

The display portion 9714, the display portion 9715, and the display portion 9722 can provide a variety of kinds of information such as navigation data, a speedometer, a tachometer, a mileage, a fuel meter, a gearshift indicator, and air-condition setting. The content, layout, or the like of the display on the display portions can be changed freely by a user as appropriate. The information listed above can also be displayed on the display portions 9712, 9713, 9721, and 9723. The display portions 9713 to 9715 and 9721 to 9723 can also be used as lighting devices.

A flat display portion may include the light-emitting device, display device, or input/output device manufactured using one embodiment of the present invention.

Figure 40D:
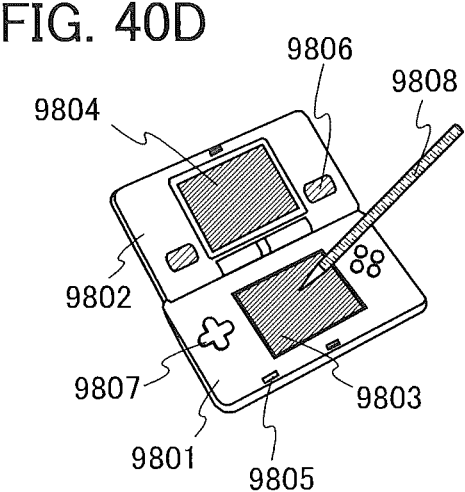

FIG. 40D illustrates a portable game console including a housing 9801, a housing 9802, a display portion 9803, a display portion 9804, a microphone 9805, a speaker 9806, an operation key 9807, a stylus 9808, and the like.

The portable game console illustrated in FIG. 40D includes two display portions 9803 and 9804. Note that the number of display portions in an electronic device of one embodiment of the present invention is not limited to two and can be one or three or more. In the case where an electronic device includes a plurality of display portions, the electronic device includes a light-emitting device, a display device, or an input/output device, in which one embodiment of the present invention is applied to at least one display portion, or the like.

Figure 40E:
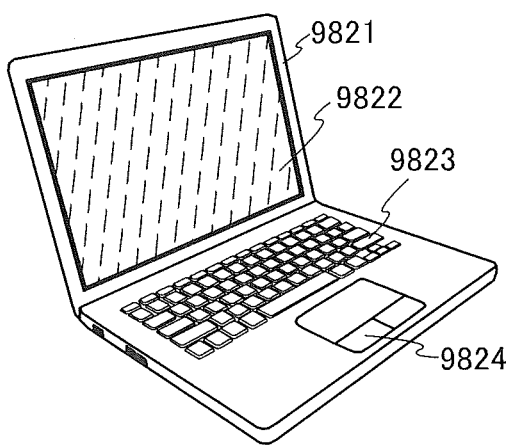

FIG. 40E illustrates a laptop personal computer including a housing 9821, a display portion 9822, a keyboard 9823, a pointing device 9824, and the like.

The structures, methods, driving timing described in this embodiment can be combined as appropriate with any of those described in the other embodiments.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path." Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2016-074956 filed with Japan Patent Office on Apr. 4, 2016 and Japanese Patent Application serial no. 2016-087359 filed with Japan Patent Office on Apr. 25, 2016, the entire contents of which are hereby incorporated by reference.

What is claimed is:

1. A display device comprising:
a signal line;
a first scan line;
a second scan line;
a first pixel circuit; and
a second pixel circuit,
wherein:
the signal line is configured to supply a first grayscale signal to the first pixel circuit and a second grayscale signal to the second pixel circuit,
the first pixel circuit comprises a first display element exhibiting a first grayscale level,
the second pixel circuit comprises a second display element exhibiting a second grayscale level,
the first display element is updated entirely during one frame, the second display element is updated partly during one frame, the first scan line is configured to output a first voltage and a second voltage to the first pixel circuit, the second voltage is lower than the first voltage, the second scan line is configured to output a third voltage and a fourth voltage to the second pixel circuit, the fourth voltage is lower than the third voltage, a first maximum voltage generated by the first grayscale signal is lower than the first voltage, a first minimum voltage generated by the first grayscale signal is higher than the second voltage, a second maximum voltage generated by the second grayscale signal is lower than the third voltage, a second minimum voltage generated by the second grayscale signal is higher than the fourth voltage, the first maximum voltage is higher than the second maximum voltage, and the first minimum voltage is lower than the second minimum voltage.

2. The display device according to claim 1, wherein the first display element and the second display element are configured to compose an image at a display portion using the first grayscale signal and the second grayscale signal.

3. The display device according to claim 1, wherein:

the display device further comprises a first power supply line, and a shift register, the shift register is electrically connected to the first scan line and the second scan line, the first pixel circuit further comprises a first transistor and a first capacitor, the second pixel circuit further comprises a second transistor, a third transistor, and a fourth transistor, the first display element comprises a first pixel electrode and a first counter electrode, the second display element comprises a second pixel electrode and a second counter electrode, the signal line is electrically connected to one of a source and a drain of the first transistor, the other of the source and the drain of the first transistor is electrically connected to the first pixel electrode and one electrode of the first capacitor, the other electrode of the first capacitor is electrically connected to the first power supply line, the first scan line is electrically connected to a gate of the first transistor, the signal line is electrically connected to one of a source and a drain of the second transistor, the other of the source and the drain of the second transistor is electrically connected to a gate of the third transistor, one of a source and a drain of the third transistor is electrically connected to the second pixel electrode and one of a source and a drain of the fourth transistor, the second scan line is electrically connected to a gate of the second transistor, the first power supply line is electrically connected to the other of the source and the drain of the fourth transistor, and a voltage supplied to the first power supply line is supplied to the second pixel electrode through the fourth transistor in a period when the first grayscale signal is supplied to the one electrode of the first capacitor through the first transistor.

4. The display device according to claim 1, wherein:

the first display element comprises a liquid crystal element, and the second display element comprises a self-luminous element.

5. The display device according to claim 3, wherein each of the first transistor, the second transistor, the third transistor, and the fourth transistor comprises an oxide semiconductor in a channel formation region thereof.

6. A display module comprising the display device according to claim 1 and a touch sensor.

7. An electronic device comprising the display module according to claim 6, an operation key, and a battery.

8. The display device according to claim 1, wherein the first region is configured to be updated entirely during one frame, and the second region is configured to be updated partly during the one frame.

9. The display device according to claim 3, wherein the first pixel circuit is configured to apply the first voltage between the first pixel electrode and the first counter electrode.

10. The display device according to claim 3, wherein the second pixel circuit is configured to apply the second voltage between the gate of the third transistor and the second pixel electrode.

11. A display device comprising:

a display portion comprising a first region and a second region; and a circuit configured to output a first scan signal, a second scan signal, a third scan signal, and a fourth scan signal; and the first region comprising:

a first pixel circuit and a first scan line electrically connected to each other; and a third pixel circuit and a third scan line electrically connected to each other, the second region comprising:

a second pixel circuit and a second scan line electrically connected to each other; and a fourth pixel circuit and a fourth scan line electrically connected to each other, wherein:

the second scan line is a scan line next to the first scan line, the third scan line is a scan line next to the second scan line, the fourth scan line is a scan line next to the third scan line, the first pixel circuit comprises a first display element, the second pixel circuit comprises a second display element, the third pixel circuit comprises a third display element, the fourth pixel circuit comprises a fourth display element, the first scan line is configured to receive the first scan signal, the second scan line is configured to receive the second scan signal, the third scan line is configured to receive the third scan signal, the fourth scan line is configured to receive the fourth scan signal, the first scan line is configured to output a first voltage and a second voltage to the first pixel circuit, the third scan line is configured to output the first voltage and the second voltage to the first pixel circuit, the second voltage is lower than the first voltage, the second scan line is configured to output a third voltage and a fourth voltage to the second pixel circuit, the fourth scan line is configured to output the third voltage and the fourth voltage to the fourth pixel circuit, the fourth voltage is lower than the third voltage, the third voltage is lower than the first voltage, the first display element and the second display element overlap each other, the third display element and the fourth display element overlap each other, the first display element and the fourth display element are configured to update display in one of a first frame period and a second frame period, and the second display element and the third display element are configured to update display in the other of the first frame period and the second frame period.

12. The display device according to claim 11, wherein the first display element, the second display element, the third display element and the fourth display element are configured to compose an image at the display portion using the first scan signal, the second scan signal, the third scan signal and the fourth scan signal.

13. The display device according to claim 11, wherein each of the first display element, the second display element, the third display element and the fourth display element comprises one of a liquid crystal element and a self-luminous element.

14. A display module comprising the display device according to claim 11 and a touch sensor.

15. An electronic device comprising the display module according to claim 14, an operation key, and a battery.

16. The display device according to claim 11, wherein:

the first display element is configured to update display with a first frequency using the first scan signal, and the second display element is configured to update display with a second frequency using the second scan signal.

17. A display device comprising:

a display portion comprising a first region and a second region, wherein:

the first region comprises a first pixel circuit and a first scan line electrically connected to each other, the second region comprises a second pixel circuit and a second scan line electrically connected to each other, the first pixel circuit comprises a first display element, the second pixel circuit comprises a second display element, the first scan line is configured to receive a first scan signal, the second scan line is configured to receive a second scan signal, the first display element is configured to update display, the second display element is configured to update display at the same time as the first display element, the first display element and the second display element overlap each other, the first scan line is configured to output a first voltage and a second voltage to the first pixel circuit, the second voltage is lower than the first voltage, the second scan line is configured to output a third voltage and a fourth voltage to the second pixel circuit, the fourth voltage is lower than the third voltage, and the third voltage is lower than the first voltage.

18. The display device according to claim 17, wherein each of the first display element and the second display element comprises one of a liquid crystal element and a self-luminous element.

19. A display module comprising the display device according to claim 17 and a touch sensor.

20. An electronic device comprising the display module according to claim 19, an operation key, and a battery.

* * * * *